US012514428B2

(12) United States Patent
Higgins et al.

(10) Patent No.: US 12,514,428 B2
(45) Date of Patent: Jan. 6, 2026

(54) METHODS FOR PLANNING AND GUIDING ENDOSCOPIC PROCEDURES THAT INCORPORATE IMAGE-TO-BODY DIVERGENCE REDUCTION

(71) Applicant: The Penn State Research Foundation, University Park, PA (US)

(72) Inventors: William E. Higgins, State College, PA (US); Yuxuan He, State College, PA (US)

(73) Assignee: The Penn State Research Foundation, University Park (PA)

( * ) Notice: Subject to any disclaimer, the term of this patent is extended or adjusted under 35 U.S.C. 154(b) by 0 days.

(21) Appl. No.: 18/958,829

(22) Filed: Nov. 25, 2024

(65) Prior Publication Data

US 2025/0143539 A1    May 8, 2025

Related U.S. Application Data

(63) Continuation of application No. PCT/US2024/036761, filed on Jul. 3, 2024.
(Continued)

(51) Int. Cl.
*A61B 1/00* (2006.01)
*A61B 1/267* (2006.01)

(52) U.S. Cl.
CPC ........ *A61B 1/00006* (2013.01); *A61B 1/2676* (2013.01)

(58) Field of Classification Search
CPC ... A61B 1/00006; A61B 1/2676; A61B 34/20; A61B 2034/107; A61B 34/30;
(Continued)

(56) References Cited

U.S. PATENT DOCUMENTS

| 7,379,790 B2 * | 5/2008 | Toth .................. A61B 34/30 901/33 |
| 9,037,215 B2 | 5/2015 | Higgins et al. |

(Continued)

OTHER PUBLICATIONS

Journal of Clinical Medicine, MDPI, A Review of Robotic-Assisted Bronchoscopy Platforms in the Sampling of Peripheral Pulmonary Lesions, Michael Lu, et all, J. Clin, Med. 2021, 10, 5678: https://doi.org/10.3390/jcm10235678; https://www.mdpi.com/journal/jcm, 2021, 7 pages.
(Continued)

*Primary Examiner* — Sanjay Cattungal
(74) *Attorney, Agent, or Firm* — Dinsmore & Shohl LLP

(57) ABSTRACT

A method for planning and guiding an endoscopic procedure, taking place in a hollow structure inside of a multi-organ cavity, that compensates for image-to-body divergence, first derives a procedure plan based on two scans of the multi-organ cavity at different volumes, which includes computing anatomical models for each scan, defining a region of interest (ROI) in the in the first scan, determining a route leading through the hollow structure to the ROI, deriving guidance cues that instruct how to maneuver the endoscope along the route toward the ROI, computing a 3D transformation that maps points in the first scan to corresponding points in the second scan, using the transformation to convert the route for the first scan into a corresponding route in the space of the second scan, and deriving guidance cues for the second scan that instruct how to maneuver the endoscope along the route toward the ROI.

24 Claims, 30 Drawing Sheets

Related U.S. Application Data

(60) Provisional application No. 63/512,355, filed on Jul. 7, 2023.

(58) Field of Classification Search
CPC .... A61B 2017/00809; A61B 2034/105; A61B 2034/2051; A61B 2034/2061; A61B 1/0005; A61B 1/00055
See application file for complete search history.

(56) References Cited

U.S. PATENT DOCUMENTS

| | | | | |
|---|---|---|---|---|
| 10,182,704 | B2* | 1/2019 | Popovic | A61B 1/0005 |
| 10,426,560 | B2* | 10/2019 | Bowling | B25J 13/00 |
| 10,463,440 | B2* | 11/2019 | Bowling | A61B 34/37 |
| 10,507,063 | B2* | 12/2019 | Zuhars | A61B 34/20 |
| 10,758,310 | B2* | 9/2020 | Shelton, IV | G16H 40/63 |
| 10,944,728 | B2* | 3/2021 | Wiener | G16H 20/40 |
| 11,058,494 | B2* | 7/2021 | Bueno | A61B 17/3205 |
| 11,147,635 | B1* | 10/2021 | Sganga | G16H 40/63 |
| 11,490,826 | B2* | 11/2022 | Tearney | A61B 5/02 |
| 2005/0182295 | A1* | 8/2005 | Soper | A61B 1/2676 600/117 |
| 2014/0022250 | A1* | 1/2014 | Mansi | G06T 7/149 345/420 |
| 2015/0305650 | A1 | 10/2015 | Hunter et al. | |
| 2017/0018079 | A1* | 1/2017 | Li | A61B 6/504 |
| 2017/0035514 | A1* | 2/2017 | Fox | G06Q 10/10 |
| 2018/0060524 | A1 | 3/2018 | Covidien | |
| 2019/0038357 | A1* | 2/2019 | Adler | A61B 34/10 |
| 2019/0038363 | A1* | 2/2019 | Adler | A61B 5/339 |
| 2020/0383734 | A1* | 12/2020 | Dahdouh | A61B 34/30 |
| 2021/0236773 | A1* | 8/2021 | Dupont | A61B 1/000096 |
| 2021/0369246 | A1* | 12/2021 | Baba | A61B 8/58 |
| 2022/0139029 | A1* | 5/2022 | Birenbaum | G06F 3/0485 715/784 |
| 2022/0156925 | A1* | 5/2022 | Bydlon | G06T 15/08 |
| 2023/0044399 | A1* | 2/2023 | Shochat | A61B 5/1073 |
| 2024/0071022 | A1* | 2/2024 | Graveley | A61B 34/20 |

OTHER PUBLICATIONS

Review, Current Opinion, Robotic bronchoscopy for peripheral pulmonary lesions: a convergence of technologies, Julie Lin and David E. Ost, Walters Kluwer Health, Inc., www.co-pulmonarymedicine. com, vol. 27, No. 4, Jul. 2021, 11 pages.

[Orignial Research Pulmonary Procedures], CHEST 2015; 147(5): 1275-1281, The Effect of Respiratory Motion on Pulmonary Nodule Location During Electromagnetic Navigation Bronchoscopy, Alexander Chen, MD, et al, journal.publications.chestnet.org, 7 pages.

Orignial Research Pulmonary Procedures], CHEST Comparing Pulmonary Nodule Location During Electromagnetic Bronchoscopy With Predicted Location on the Basis of Two Virtual Airway Maps at Different Phases of Respiration,, Brian S. Furukawa, MD, et al., chestjournal.org, 181-186 [153 # 1 CHEST Jan. 2018], 6 pages.

PCT Recordation of Search History, Case/PCT Application No. PCT/US24/36761, Oct. 25, 2024, 12 pages.

International Search Report, International Application No. PCT/US2024/036761, Oct. 25, 2024, 3 pages.

Written Opinion of the International Searching Authority, International Application No. PCT/US2024/036761, Oct. 25, 2024, 8 pages.

* cited by examiner $V = \{v_1, v_2, \ldots, v_{13}\}$
$B = \{b_1, b_2, \ldots, b_5\}$
$P = \{p_1, p_2, p_3\}$ $b_1 = \{v_1, v_2, v_3, v_4\}$
$b_2 = \{v_4, v_5, v_6, v_7\}$
$\vdots$
$b_5 = \{v_9, v_{12}, v_{13}\}$ $p_1 = \{b_1, b_2\}$
$\vdots$
$p_3 = \{b_1, b_3, b_5\}$

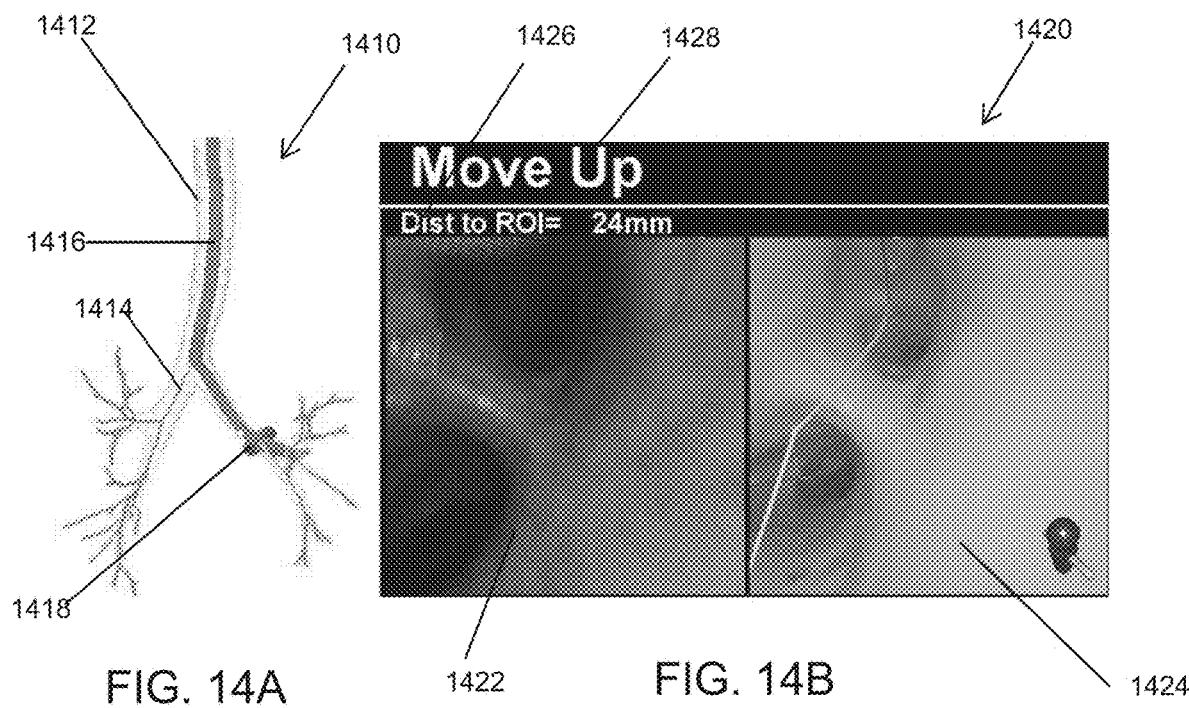
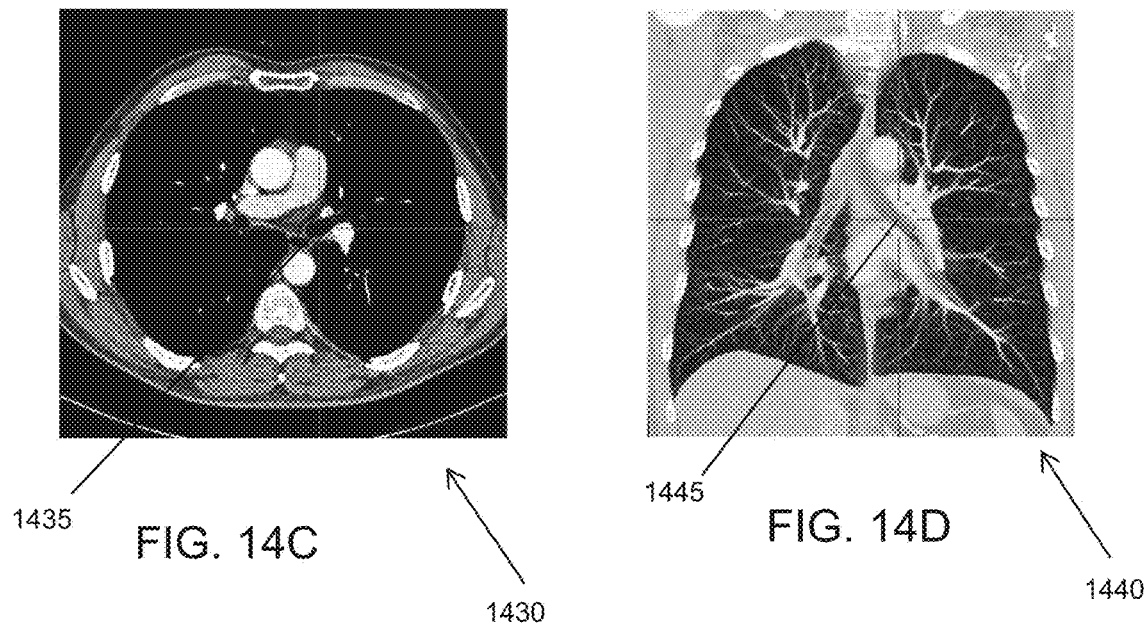
FIG. 14A
FIG. 14B
FIG. 14C
FIG. 14D

METHODS FOR PLANNING AND GUIDING ENDOSCOPIC PROCEDURES THAT INCORPORATE IMAGE-TO-BODY DIVERGENCE REDUCTION

CROSS-REFERENCE TO RELATED APPLICATIONS

This application is a bypass continuation of PCT/US24/36761, filed Jul. 3, 2024, which claims the priority benefit of U.S. Provisional Application No. 63/512,355, entitled METHODS FOR THE PLANNING AND GUIDANCE OF ENDOSCOPIC PROCEDURES THAT INCORPORATE IMAGE-TO-BODY DIVERGENCE REDUCTION, filed on Jul. 7, 2023, the entirety of which is hereby incorporated by reference.

GOVERNMENT SPONSORSHIP

This invention was made with government support under Grant No. CA151433 awarded by the National Institutes of Health. The Government has certain rights in the invention.

FIELD OF THE INVENTION

This disclosure relates generally to surgical procedure planning and guiding and, in particular, to a planning and/or guiding methodology that is robust to image-to-body divergence, as applicable to endoscopy.

BACKGROUND OF THE INVENTION

Many surgical procedures use an endoscope to navigate through hollow tubular structures, such as airways, and/or hollow regions, such as a stomach, situated within the confines of a multi-organ cavity. Such multi-organ cavities are made up of soft tissues and, hence, are subject to dynamic shape changes over time. Various challenges are associated with performing endoscopic procedures in such environments. As such, assisted endoscopy systems are utilized to improve procedure outcomes, and sometimes preferred over standard, unassisted endoscopy procedures. Assisted endoscopy systems draw on computer-based guidance information to facilitate faster and more accurate endoscope navigation to surgical sites of interest. Such systems can develop at least a part of the guidance information from a procedure plan derived off-line prior to a live procedure. The procedure plan can be at least partially derived using a subject's radiologic imaging scan.

However, the real cavity space encountered during the live procedure is typically different than the state reflected in a virtual three dimensional (3D) cavity space. Differences between the real cavity space and the virtual 3D cavity space define the phenomenon referred to as CT-to-body divergence (CTBD), or, more generically, image-to-body divergence. CTBD can be described as the differences between static CT images used for planning and an actual procedure site during a live endoscopy intervention that lead to discrepancies between the actual and expected location of target lesions. Stated another way, CTBD is the difference between a predicted location of a target region of interest during navigation procedure planning (e.g., virtual reality) and an actual target location during endoscopy.

Image-to-body divergence (CTBD) encountered by assisted endoscopy systems limits an ability to localize particular lesions. As such, while performing an endoscopy, the clinician may believe he or she has localized a target based on the assisted endoscopy system's feedback, and, hence, proclaim a navigation success. In reality, however, because of CTBD, the endoscopy misses the target, resulting in a nondiagnostic biopsy.

Endoscopic procedures that take place inside hollow regions located within a multi-organ cavity made up of flexible soft tissues have a performance in confirming, localizing, and/or conducting a biopsy of clinical sites of interest degraded by image-to-body divergence. In particular, substantial errors can arise because of a multi-organ cavity's volume differences observed between an imaging scan, used for planning a procedure, and the actual anatomy, observed during the live procedure. As such, there is a need for a method and/or system that effectively compensates for these differences in assisted endoscopy systems.

SUMMARY OF THE INVENTION

According to a first aspect of the disclosure, a method for planning and guiding an endoscopic procedure that compensates for image-to-body divergence is disclosed. The method first derives a procedure plan based on two scans of the multi-organ cavity at different volumes, which includes computing anatomical models for each scan, defining a region of interest (ROI) in the in the first scan, determining a route leading through the hollow structure to the ROI, deriving guidance cues that instruct how to maneuver the endoscope along the route toward the ROI, computing a 3D transformation that maps points in the first scan to corresponding points in the second scan, using the transformation to convert the route for the first scan into a corresponding route in the space of the second scan, and deriving guidance cues for the second scan that instruct how to maneuver the endoscope along the route toward the ROI. The method next provides a guidance protocol based on the procedure plan, which includes presenting graphical views and guidance cues along the preplanned route for the first scan that instruct the endoscope operator on how to maneuver the endoscope along the route through the hollow structure toward the predefined ROI, switching the presentation of the graphical views and guidance cues to those corresponding to the second scan upon reaching the vicinity of the ROI that instruct the endoscope operator on how to make final maneuvers along the route through the hollow structure to reach a final destination pose near the ROI location.

According to a second aspect of the disclosure, a method of planning and guiding an endoscopic procedure that compensates for image-to-body divergence is disclosed that recognizes that dynamic shape changes to the hollow structure within the multi-organ cavity can cause downstream (higher-generation) branches along a guidance route to become impassable (i.e., they become narrowed or collapsed. To do this, the method first derives a procedure plan based on two scans of the multi-organ cavity at different volumes, which includes computing anatomical models for each scan, defining a region of interest (ROI) in the in the first scan, determining a route leading through the hollow structure to the ROI, deriving guidance cues that instruct how to maneuver the endoscope along the route toward the ROI, computing a 3D transformation that maps points in the first scan to corresponding points in the second scan, using the transformation to convert the route for the first scan into a corresponding route in the space of the second scan, deriving guidance cues for the second scan that instruct how to maneuver the endoscope along the route toward the ROI, and deriving back-up guidance routes to account for possible impassable branches. The method next provides a guidance protocol based on the procedure plan, which includes presenting graphical views and guidance cues along the preplanned route for the first scan that instruct the endoscope operator on how to maneuver the endoscope along the route through the hollow structure toward the predefined ROI, providing the option of switching guidance to an alternate back-up route while navigating toward the ROI, and switching the presentation of the graphical views and guidance cues to those corresponding to the second scan upon reaching the vicinity of the ROI that instruct the endoscope operator on how to make final maneuvers along the route through the hollow structure to reach a final destination pose near the ROI location.

According to a third aspect of the disclosure, a method of planning and guiding an endoscopic procedure that compensates for image-to-body divergence is disclosed that assumes that that the endoscopic procedure is carried out by a robotics assisted endoscopy system. The method first derives a procedure plan based on two scans of the multi-organ cavity at different volumes, which includes computing anatomical models for each scan, defining a region of interest (ROI) in the in the first scan, determining a route leading through the hollow structure to the ROI, deriving guidance cues that instruct how to maneuver the endoscope along the route toward the ROI, computing a 3D transformation that maps points in the first scan to corresponding points in the second scan, using the transformation to convert the route for the first scan into a corresponding route in the space of the second scan, and deriving guidance cues for the second scan that instruct how to maneuver the endoscope along the route toward the ROI. The method next provides a guidance protocol based on the procedure plan, which includes presenting graphical views and guidance cues along the preplanned route for the first scan that instruct the endoscope operator on how to maneuver the endoscope along the route through the hollow structure toward the predefined ROI, switching the presentation of the graphical views and guidance cues to those corresponding to the second scan upon reaching the vicinity of the ROI that instruct the endoscope operator on how to make final maneuvers along the route through the hollow structure to reach a final destination pose near the ROI location, whereby all guidance instructions are followed by a robotics assisted endoscopy system driven by a, endoscope shape sensor that measures the shape of the device during the live procedure.

According to a fourth aspect of the disclosure, an integrated planning and guidance software system for assisted endoscopy is disclosed. The system integrates the methodologies for the three embodiments and can be interfaced to an image-guided or robotics-assisted endoscopy system. The guidance system consists of graphical tools that aide in deciding when to switch guidance routes as needed, signal the expected feasibility of moving forward on a route, and offer flexibility in visualizing the changing state of the multi-organ cavity during a live procedure. According to a fifth aspect of the disclosure, an integrated planning and guidance software system for assisted endoscopy is disclosed. The system integrates the methodologies for the three embodiments and can be interfaced to an image-guided or robotics-assisted endoscopy system. The guidance system consists of graphical tools that aide in deciding when to switch guidance routes as needed, signal the expected feasibility of moving forward on a route, and offer flexibility in visualizing the changing state of the multi-organ cavity during a live procedure. The system includes an additional mechanism that presents separate linked guidance display information from both imaging scans simultaneously during the live procedure.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

FIG. 14A is a 3D surface rendering of an airway tree for depicting on a guidance computer display according to one or more aspects shown and described herein;

FIG. 14B is an integrated view depicting a live bronchoscopic video for depicting on a guidance computer display according to one or more aspects shown and described herein;

FIG. 14C is a 2D axial-plane CT section for depicting on a guidance computer display according to one or more aspects shown and described herein;

FIG. 14D is a coronal slab rendering for depicting on a guidance computer display according to one or more aspects shown and described herein;

DETAILED DESCRIPTION OF THE INVENTION

Figure 1A:
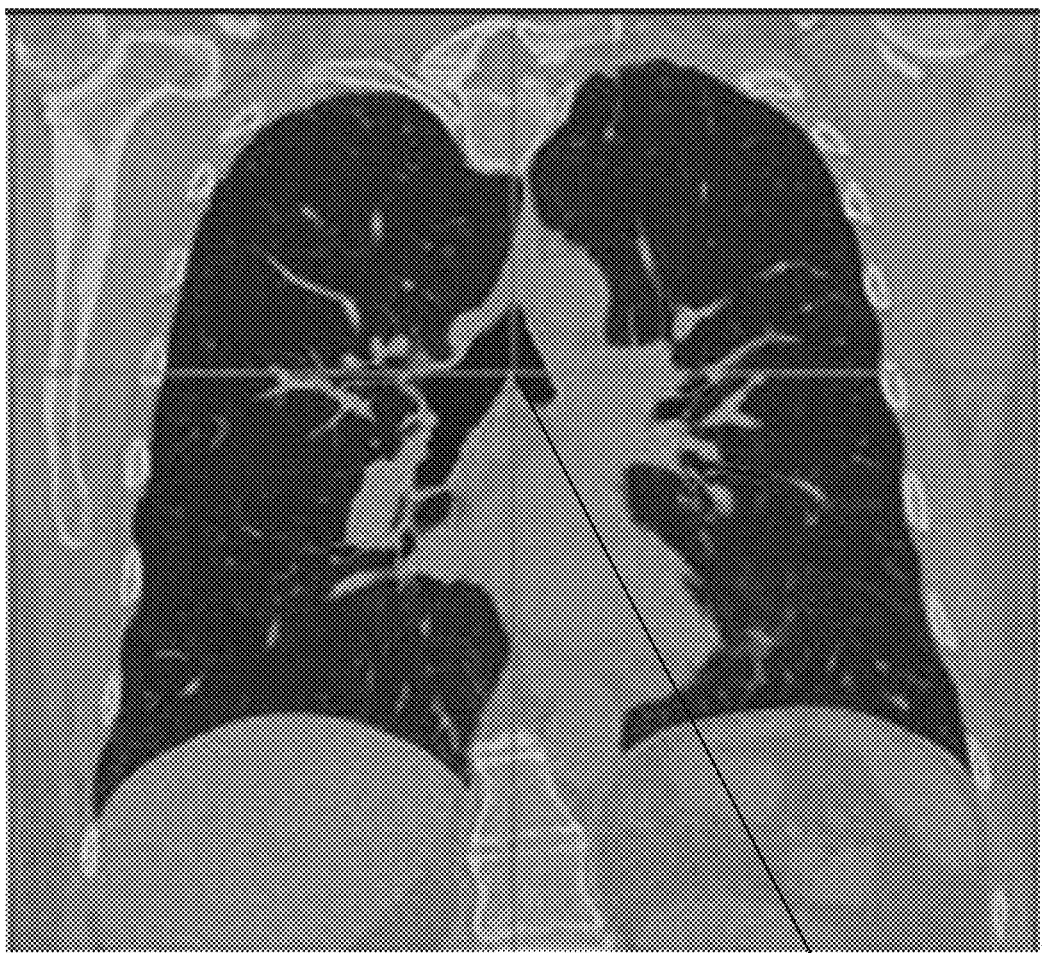
FIG. 1A is a CT scan of a chest cavity of a subject reflecting a chest volume near TLC according to one or more aspects shown and described herein.

The present disclosure, in at least one form, is related to methods and/or systems for planning and guiding an endoscopic procedure. Such methods and/or systems assist a clinician in navigating an endoscope through hollow regions defined inside a multi-organ cavity, where the objective of the endoscopic procedure is to examine a predetermined regions of interest (ROI). As the multi-organ cavity may change in shape over time, the described methods and/or systems compensate for image-to-body differences that can arise between how the multi-organ cavity appears in imaging scans used to plan the procedure and how the same multi-organ cavity appears during a live endoscopic procedure.

The present disclosure has many advantages and unique attributes relative to other assisted endoscopy systems. Notably, the described methods and/or systems rely on computer-based software methods, without the need for extra hardware to make body measurements or for sensors attached to the endoscopic devices or to the human body, as needed by ENB systems. Hence, the described methods and/or systems are not subject to errors in the sensor/body location measurements made by these devices during a live procedure and require less hardware. Additionally, the described methods and/or systems make more exhaustive use of the known subject-specific airway tree structure and branch hierarchy, thereby enabling extra location certainty during a procedure. Related to this point for lung applications, the described methods and/or systems also make better use of the available knowledge of the local airway tree's branch structure. The described methods and/or systems do not rely on the global overall shape and absolute size of the thoracic cavity and its constituent organs. Instead, the described methods and/or systems rely on the anatomy's fundamental top-level invariant 3D topology, which does not change as a subject inhales and exhales. Pre-operative procedure planning enables the derivation of alternate back-up routes prior to the live procedure to account for possible blocked, narrowed airways, and other unexpected events during the live procedure. During live guidance, the described guidance system automatically suggests alternate guidance routes, thereby facilitating on-the-fly route changes during the live procedure. The described methods and/or systems can work in tandem with existing robotics assisted bronchoscopy systems, thereby enabling automatic navigation assistance. The described methods and/or systems provide a high-quality mechanism, geared toward the subject's live FRC-based lung state for final target confirmation/localization, as the system's guidance information seamlessly switches from a TLC-based thoracic model to a more realistic FRC-based model when the target ROI becomes close. More detailed local graphical information is also provided to assist with final ROI examination and/or rEBUS analysis. The described methods and/or systems simultaneously provide augmented reality-based graphical information on procedure progress for both the TLC and FRC spaces, where the current guidance state is synchronized to both spaces. Furthermore, the described methods and/or systems enable rapid guidance and deployment of rEBUS probe placement to enable live confirmation of extraluminal targets.

In various instances, the hollow regions can be lung airways, a colon, a stomach, vasculature in the heart, lungs, a brain, a liver, a kidney, or any other hollow areas situated inside a multi-organ cavity. The multi-organ cavity can be a thoracic cavity, including the mediastinum, an abdominal cavity, a pelvic cavity, or a cranial cavity, for example. Exemplary ROIs include a suspect tumor, a cancer nodule, a suspicious airway wall site, or an anatomic location of interest for general visual examination, tissue biopsy, and/or treatment delivery. Examination of the ROI by the endoscope may include collecting anatomical tissue from the ROI, performing a visual assessment of the ROI, and/or delivering treatment to the ROI.

According to aspects of the present disclosure, coordinated planning and guidance methodologies, incorporated into a unique assisted endoscopy system that facilitates pre-operative procedure planning and subsequent live intra-operative guidance of endoscopy for the purpose of examining a target region of interest (ROI), are described.

The disclosure focuses on assisted bronchoscopy systems, as they apply to applications in the chest, or thoracic cavity, and to lung cancer management including diagnosis, staging, monitoring, follow up, and/or treatment, for example. In particular, the present disclosure describes a unique approach for overcoming anatomical volume differences observed in a subject's imaging scan (a virtual space) as compared to the anatomy's appearance and/or shape during a live bronchoscopy procedure (a real space). However, it is envisioned that the disclosed systems and methods can be used for any surgical procedure involving a surgical instrument, such as an endoscope. In various instances, the endoscope can be a bronchoscope, colonoscope, laparoscope, angioscope, catheter, or cystoscope, for example.

The disclosed systems and methods are envisioned for use during surgical procedures such as a bronchoscopy performed in an airway tree, which is within a thoracic cavity, a laparoscopy performed in the stomach, which is within an abdominal cavity, a colonoscopy performed in a colon, which is within the abdominal cavity, a cystoscopy performed in a bladder, which is within a pelvic cavity, and/or a cardiac catheterization performed in a heart, which is within the thoracic cavity, for example.

Lung cancer remains the world's largest cause of cancer death, being responsible for over 30% of all cancer deaths. Notably, lung cancer currently has a poor 5-year survival rate on the order of 15%. Hence, early detection of lung nodules, such as tumors and/or lesions, has been recognized by the medical community as being vital for diagnosing curable lung cancer. In 2011, the National Lung Screening Trial (NLST) showed that screening via low-dose computed tomography (CT) scans significantly increases early detection and reduces mortality from malignant tumors. This effort has spurred a major paradigm shift in early lung cancer detection, manifested by an ongoing global roll-out of CT-based lung cancer screening programs.

With this shift, tens of millions of subjects at high risk for lung cancer now have the opportunity for early disease detection and, in turn, a greater likelihood of survival. However, tumor detection via image-based CT screening only raises the suspicion that a subject may have lung cancer. Therefore, further follow-up clinical steps involving tissue diagnosis are required. These steps can include, for example: 1) peripheral nodule diagnosis to confirm the disease; and 2) central chest lymph node staging, to determine disease extent and treatability. In addition, some subjects may require additional follow-up disease monitoring/follow-up and cancer treatment.

Notably, the NLST reported that nearly 40% of CT-screened subjects had at least one detected lesion, with nearly 80% of these lesions being peripheral nodules. Such subjects often require tissue biopsy to confirm their disease state. Percutaneous nodule biopsy is the long-standing de facto approach for sampling peripheral nodules. However, such approach is associated with an unfavorable profile. As such, clinicians now often prefer to use minimally invasive bronchoscopy for conducting a biopsy of many peripheral lung nodules. The recent introduction of lung cancer screening is greatly increasing the number of subjects presenting a suspect nodule, which in turn is greatly increasing the volume of bronchoscopies required to manage these subjects.

It is known, however, that a high percentage of observed nodules do not evolve into malignant cancer. Hence, it is vital that bronchoscopy-based peripheral nodule biopsy be accurate. Unfortunately, an unacceptable number of bronchoscopies, without any other assisting guidance aides, are known to be unsuccessful, with yields below 50% commonly reported. Such a shortcoming delays early disease detection and can seriously affect a subject's long-term prognosis.

In an effort to address this shortcoming, assisted bronchoscopy systems have been developed, drawing on CT-based virtual bronchoscopy (VB). Previously, image-guided bronchoscopy systems were introduced, with FDA-approved systems now readily available. More recently, new robotics-assisted bronchoscopy systems also began to become feasible, especially for examining distant peripheral sites and for performing more complex chest procedures.

Assisted endoscopy systems can be classified into two forms. Image-guided endoscopy systems involve a user, such as a clinician, navigating the endoscope. Robotics-assisted endoscopy systems involve a machine, or robot, navigating the endoscope under user control. Stated another way, the robot navigates the endoscope under user supervision and/or in response to a user input, for example.

As described herein, for any type of assisted endoscopy system, two phases of operation occur: (1) off-line procedure planning; and (2) live guided endoscopy. During phase 1 off-line procedure planning, a clinician first creates a procedure plan off-line prior to the live endoscopy. To create the procedure plan, the clinician first selects one or more diagnostic regions of interest (ROIs), such as a suspect nodule and/or any other anatomical site of interest located inside a cavity, such as a thoracic cavity. The one or more diagnostic ROIs are selected using the subject's three-dimensional (3D) chest computed tomography (CT) scan and/or the subject's positron emission tomography (PET) scan, if available, such as in a co-registered PET/CT study.

Next, the subject's CT scan is used to create an airway route leading through the lung airways to a particular ROI. Such an airway route can be derived automatically via computer analysis and/or manually via visual inspection. The created airway route provides a virtual pathway through the lung airways leading to the ROI in a 3D CT-based virtual chest space. Assisted bronchoscopy systems in general have a computer-based software system that helps in the derivation of the procedure plan.

During phase 2 live guided bronchoscopy, the assisted bronchoscopy system is actuated, or otherwise engaged, in a procedure room, such as an operating room. As discussed in greater detail herein, the assisted bronchoscopy system can be an image-guided system and/or a robotics-assisted system. The assisted bronchoscopy system can be interfaced to bronchoscopy hardware to be able to tap off live video sources, for example.

Based at least in part by a display and/or the assisted bronchoscopy system's procedure plan, the clinician navigates a bronchoscope along the preplanned, route, such as along the suggested airways, leading to the ROI. Fundamentally, this entails synchronizing the bronchoscope's actual position within the subject, which is in a real, physical chest space, to the information driving the procedure plan, which is in a CT-based virtual chest space.

Upon navigating close to, and/or reaching, the ROI near the terminus of the preplanned route, a precise position of the site of the ROI is confirmed, or localized. As most nodules tend to be external to the airway and, hence, not visible in the endoluminal field of view of the bronchoscope the clinician relies on a second complementary imaging device that gives live 2D extraluminal views. The second complementary imaging device provides information regarding an opposing, external side of the airway lumen to make a final confirmation of the target lesion, for example. Exemplary secondary imaging devices include radial probe endobronchial ultrasound (EBUS), often referred to as rEBUS or RP-EBUS, CT fluoroscopy, and cone beam CT (CBCT).

After confirming the precise position, or location, of the particular ROI, the clinician can perform a desired examination, such as a tissue biopsy, for example.

As described, considerable progress has been made in the development of assisted bronchoscopy systems and the supplemental confirming imaging devices. As such, it is well-recognized that guiding bronchoscope navigation to a particular ROI to within approximately 2-4 cm of the final target location is essentially a solved problem. Unfortunately, however, final target ROI confirmation and/or localization, performed over the final 2-4 cm along an ROI's airway route, still poses considerable difficulty for assisted bronchoscopy systems. As an example, the multi-center NAVIGATE study found a 12-month diagnostic yield of 73% using assisted bronchoscopy systems, implying a nearly 30% failure in properly localizing desired biopsy sites. Pertaining to assisted bronchoscopy systems, it has been acknowledged that in the past two decades, multiple bronchoscopy techniques focused on the diagnosis of peripheral lung nodules have been developed. Although peripheral bronchoscopy has been established as an effective procedure, its diagnostic yield seems to have plateaued at about 70%.

One factor that affects final target ROI confirmation and/or localization is that all of the aforementioned supplemental imaging devices have deficiencies.

More specifically, while rEBUS provides views within a risk of exposure to radiation, rEBUS can provide false-positive confirmation images of ghost "nodules," arising from a common phenomenon known as atelectasis. Atelectasis is the partial regional collapse of a lung caused by the closing of bronchioles or pressure outside of the lung. Atelectasis (and the production of false rEBUS views) was observed in over 70% of considered subjects, with atelectasis becoming more likely for subjects having a higher BMI (body mass index) and/or under general anesthesia for a longer period of time (>30 min).

CT fluoroscopy uses X-ray radiation for garnering confirmation images. Unfortunately, this subjects the subject and clinicians to extra radiation. Further, CT fluoroscopy only gives 2D projection views of the target ROI region. Such 2D projection views are well-known to be potentially misleading.

While a portable CBCT scanner, which entails performing a small local CT scan near the target site, can give helpful confirmation views, the portable CBCT scanner also entails exposure to considerable radiation and/or a significant hardware expense.

Another disadvantage to using the above-discussed secondary imaging devices is that such imaging devices are not directly linked to the assisted bronchoscopy's system guidance or display protocol in any way. As such, an onus is on the clinician to deploy a particular device accurately about the target ROI confirmation and/or localization site.

An additional factor contributing to the relating to the low success rates associated with the use of current assisted bronchoscopy systems relates to the changing dynamic nature of the thoracic cavity. Such a dynamic nature perhaps has the greatest impact on final target ROI confirmation and/or localization. More specifically, all assisted bronchoscopy systems depend on the fundamental principle of synchronizing, or registering, the preplanned airway route information derived with respect to the virtual chest space to the bronchoscope's mal-time position in the subject's chest space.

As discussed herein, a subject's 3D chest CT scan and optional PET/CT study delineate the virtual 3D chest space. A subject's real, or actual, chest space encountered during the live procedure can be defined by one or more bronchoscope/EBUS video streams and/or acquired live body shape/position measurements as done by so-called electromagnetic navigation bronchoscopy (ENB) systems. Such live body shape and/or position measurements can be derived by airway landmark/fiducial locations and/or sensors mounted on a chest or attached to an instrument.

To delineate the virtual 3D chest space, it is standard radiology protocol for the chest CT scan to be generated by having a subject perform a short breath hold. As such, the imaged lungs are near full inspiration, or near total lung capacity (TLC)—a state where the lungs are near their largest total volume.

However, the real chest space encountered during the live procedure is typically in a different state than the state reflected in the virtual 3D chest space. Notably, during the live procedure the subject breathes freely with his or her lungs staying at a relatively low volume, also referred to as tidal breathing. In other words, the lung volume of the subject generally stays near a functional residual capacity (FRC), or near end expiration, reflective of the smallest total lung volume at all times during the procedure. As such, all live procedural data relating to the subject's chest, which defines the real chest space, is derived from a state near FRC.

Such differences between the information used to derive the virtual and real chest spaces highlight a fundamental issue giving rise to the performance limitation highlighted. For peripheral nodule biopsy, this limitation is also present in the "TLC-mapped" ENB systems for assisted bronchoscopy. More specifically, the movement of lesions has been observed in a subject's joint pair of inspiratory (near TLC) and expiratory (near FRC) CT scans. Such a lesion's position differed on average by 17.6 mm between the scans, with the average difference ≥23.6 mm for the left/right lower lung lobes lesions. Considering that typical nodules tend to be on the order of 10 mm in diameter, this large error indicates that many nodules could easily be missed during bronchoscopy, depending on how the imaging scan used for procedure planning relates to the chest volume encountered during the live procedure.

Figure 1B:
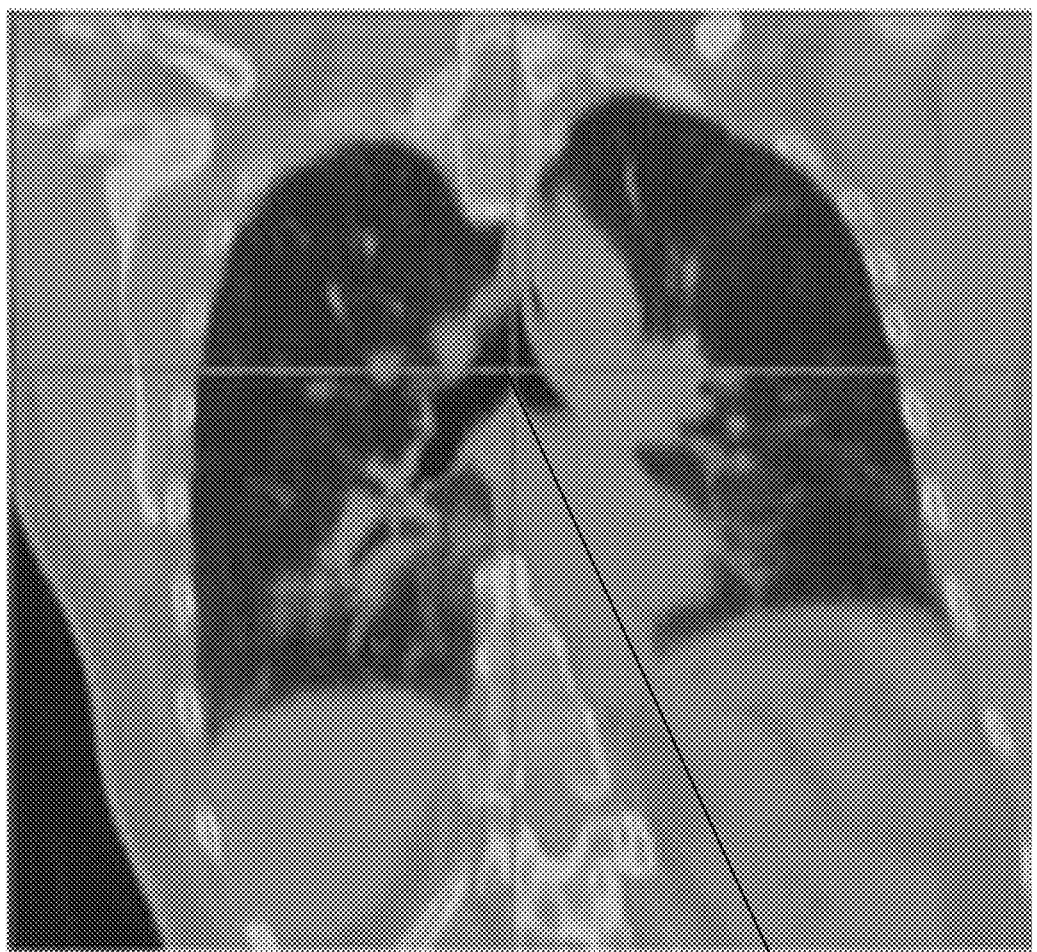
FIG. 1B is a CT scan of the chest cavity of the subject of FIG. 1A reflecting a chest volume near FRC according to one or more aspects shown and described herein.
Figure 2A:
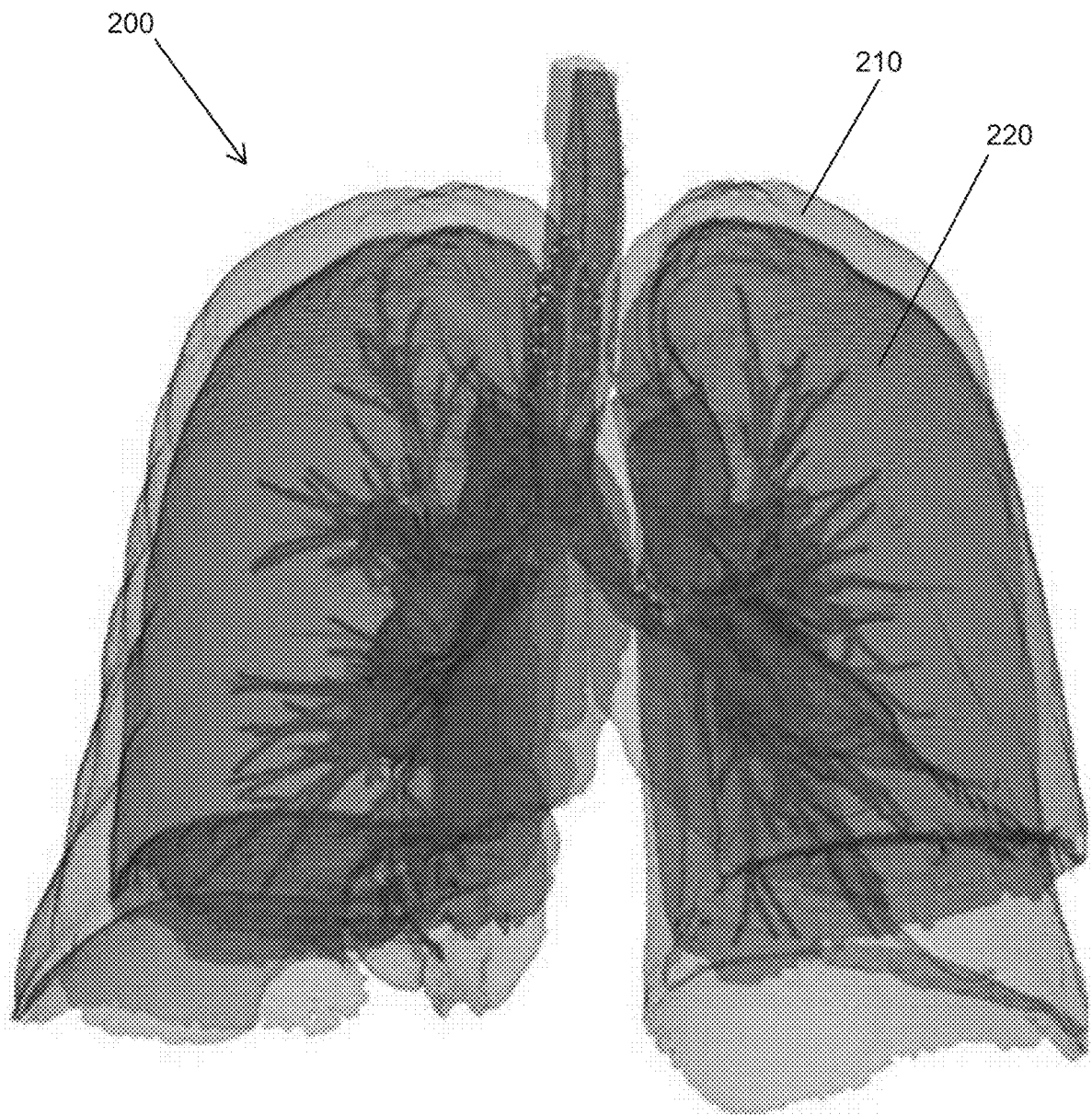
FIG. 2A is a rendering of the chest volume near TLC captured in FIG. 1A superimposed over a rendering of the chest volume near FRC captured in FIG. 1B according to one or more aspects shown and described herein.
Figure 2B:
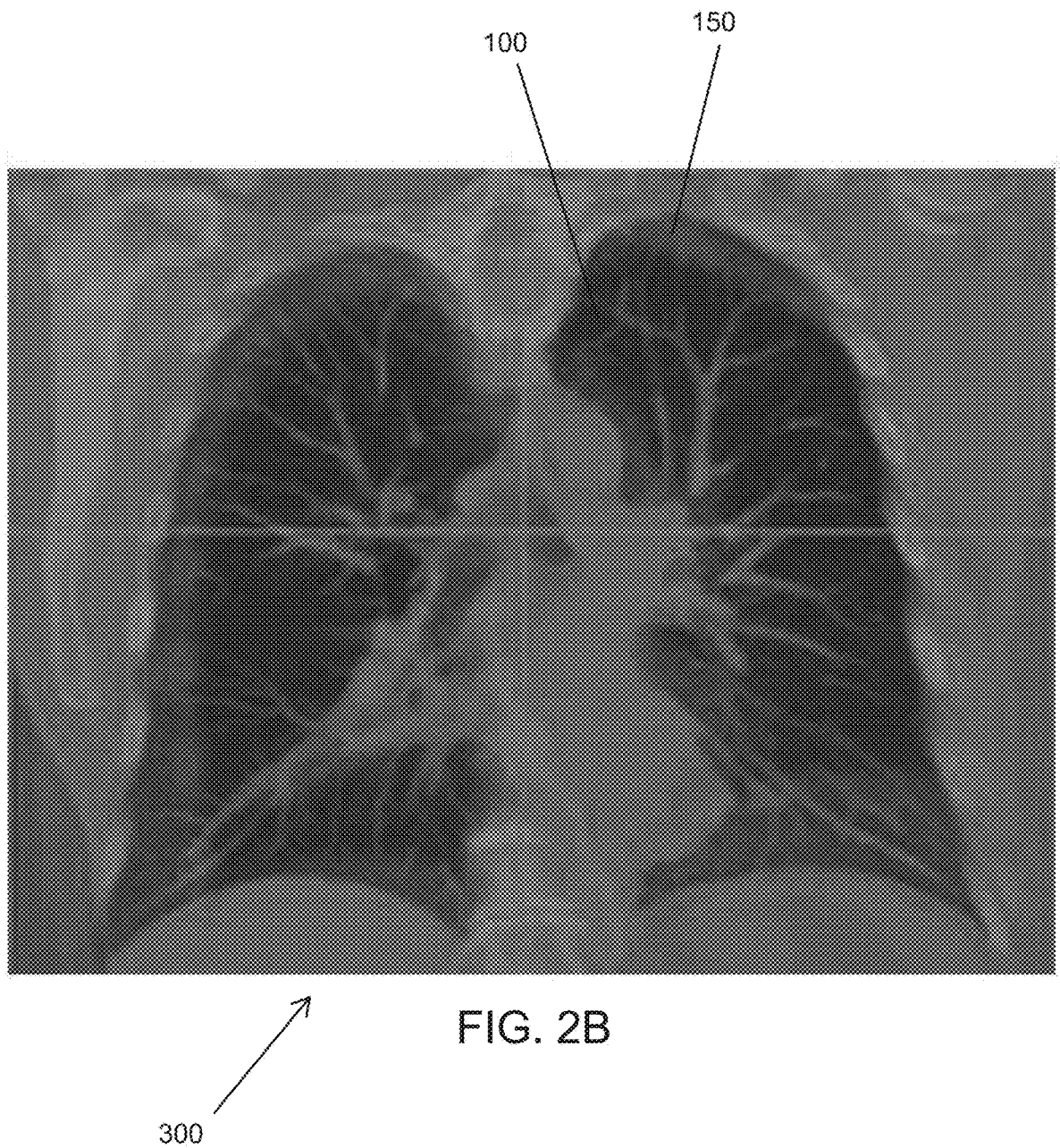
FIG. 2B is an image reflective of the CT scans of FIGS. 1A and 1B superimposed on one another according to one or more aspects shown and described herein.

FIGS. 1A and 1B depict CT scan differences of imaged chest volumes between TLC and FRC. More specifically, FIG. 1A is a 2D coronal CT scan section 100 of a TLC chest cavity while FIG. 1B is a 2D coronal CT scan section 150 of a FRC chest cavity. Both sections 100, 150 shown in FIGS. 1A and 1B reflect sections aligned at a same landmark near a main carina, as noted by a cross-hair 110 extending through the sections 100, 150. A difference in the imaged chest volumes represents how the total lung volumes perceived by the virtual (near TLC) and real (near FRC) chest spaces can differ. FIGS. 2A and 2B further demonstrate that this difference is typically substantial, or large—being a 52% lung volume difference from TLC to FRC for this depicted example—with the largest difference noted in a lower lung periphery. FIG. 2A depicts volume renderings 200 of the imaged organs at a TLC state 210 and an FRC state 220, whereas FIG. 2B depicts an image 300 of the sections 100, 150 of FIGS. 1A and 1B superimposed on one another. These differences define the phenomenon referred to as CT-to-body divergence (CTBD), or, more generically, image-to-body divergence. CTBD can be described as the differences between the static CT images used for planning and the dynamic airways during intervention live bronchoscopy that lead to discrepancies between the actual and expected location of target lesions. CTBD can also be described as the difference between the predicted location of the peripheral target during navigation procedure planning (e.g., virtual reality) and the actual target location during bronchoscopy.

It is well-recognized that the image-to-body divergence (CTBD) encountered by assisted bronchoscopy systems is, in some sense, a "fatal flaw" that limits an ability to localize peripheral lung lesions. In particular, while performing a bronchoscopy, the clinician may believe he or she has localized a target based on the assisted bronchoscopy system's feedback, and, hence, proclaim a "navigation success". In reality, because of CTBD, the bronchoscopy misses the target, resulting in a nondiagnostic biopsy.

The methods and systems described herein present a solution that accommodates, or otherwise compensates, for image-to-body divergence. Stated differently, the methodologies described herein account for the dynamic shape-changing behavior of the thoracic cavity and its constituent organs, including the lungs and/or major airways, to enable robust and accurate bronchoscopy in the face of image-to-body divergence. As a result, the methodologies and systems described herein help to reduce observed bronchoscope position errors (on the order of approximately 20 mm)

commonly encountered while trying to localize and/or position the bronchoscope and supplemental confirming imaging devices (e.g., rEBUS) to localize, examine, biopsy, and/or treat a region of interest.

To begin, a method of planning and guiding an endoscopic procedure assumes that the subject has two distinct 3D CT scans available, each depicting a thoracic cavity of the subject at different states. One 3D CT scan showing the thoracic cavity at near TLC and one 3D CT scan showing the thoracic cavity at near FRC. In various instances, the method includes capturing the two distinct scans.

The two CT scans depicting the thoracic cavity are acquired pre-operatively. $I_{TLC}$ is used herein to refer to the CT scan showing the thoracic cavity near TLC, or near full inspiration. $I_{FRC}$ is used herein to refer to the CT scan showing the thoracic cavity near FRC, or near full expiration.

The CT scan $I_{TLC}$ focuses on the chest and thoracic cavity, is generated via the standard radiologic protocol, whereby the subject performs a short breath-hold during the scan, and has high spatial resolution, with both the axial-plane resolutions ($\Delta x$, $\Delta y$) and 2D section spacing $\Delta z$ being <1 mm. $I_{TLC}$, which exhibits the airways at their fullest volume during the breathing cycle, captures the truest attainable representation of the physical airway tree's intrinsic topology. As such, $I_{TLC}$ serves as the reference scan for CT-based virtual space throughout, including during live guidance. In particular, $I_{TLC}$ is the least likely volume to exhibit deviations, such as blocked airways, from the physical airway tree's true intrinsic topology.

CT scan $I_{FRC}$ is also generated pre-operatively. In various instances, the CT scan $I_{FRC}$ is generated in the same scan session that $I_{TLC}$ is generated, as is done for instance for the SpinDrive assisted bronchoscopy system. As such, $I_{FRC}$ also can be a 3D high-resolution volume of the chest, similar to $I_{TLC}$. In various instances, the CT scan $I_{FRC}$ is obtained by the subject undergoing a separate whole-body PET/CT study, as often prescribed for lung cancer subjects. In such instances, both the PET and CT scans are co-registered, span the whole body (typically knees to nose), and both the PET and CT scans are collected as the subject breathes freely, i.e., tidal breathing. The resulting $I_{FRC}$ typically has adequate axial-plane resolution ($\Delta x$, $\Delta y$)≈1 mm or less, but the slice thickness $\Delta z$ is generally >1 mm. Thus, the spatial resolution is generally lower than $I_{TLC}$. Furthermore, additional blurring artifact arises, because of the free-breathing scanning protocol usually employed for PET/CT studies.

Research has shown that the elasticity of the lungs during the breathing cycle from inspiration to expiration causes regional expansion and contraction to the shapes of the lungs without changing the underlying anatomical structure of the lungs or the airway tree. Thus, a 3D spatially displacement field can readily be derived to relate the constituent elements of TLC and FRC chest CT scans, as discussed herein.

This has led to recent research, whereby a supervised deep-learning-based generative adversarial network (GAN) and a biomechanical model capturing the deformation vector field representing the lung tissue elasticity model could be used to generate acceptable end-inspiration (FRC) CT images very rapidly. A related work also describes a deep learning approach to generate 3D cone beam CT lung images from single 2D projection views. Such approaches could conceivably obviate the need for a precise FRC-based CT scan, as the reference TLC scan is available to give an accurate topological model. As described further herein, navigation is linked between the FRC space and the gold-standard TLC space. Hence, the FRC-based image need not be "perfect."

Figures 3A, 3B:
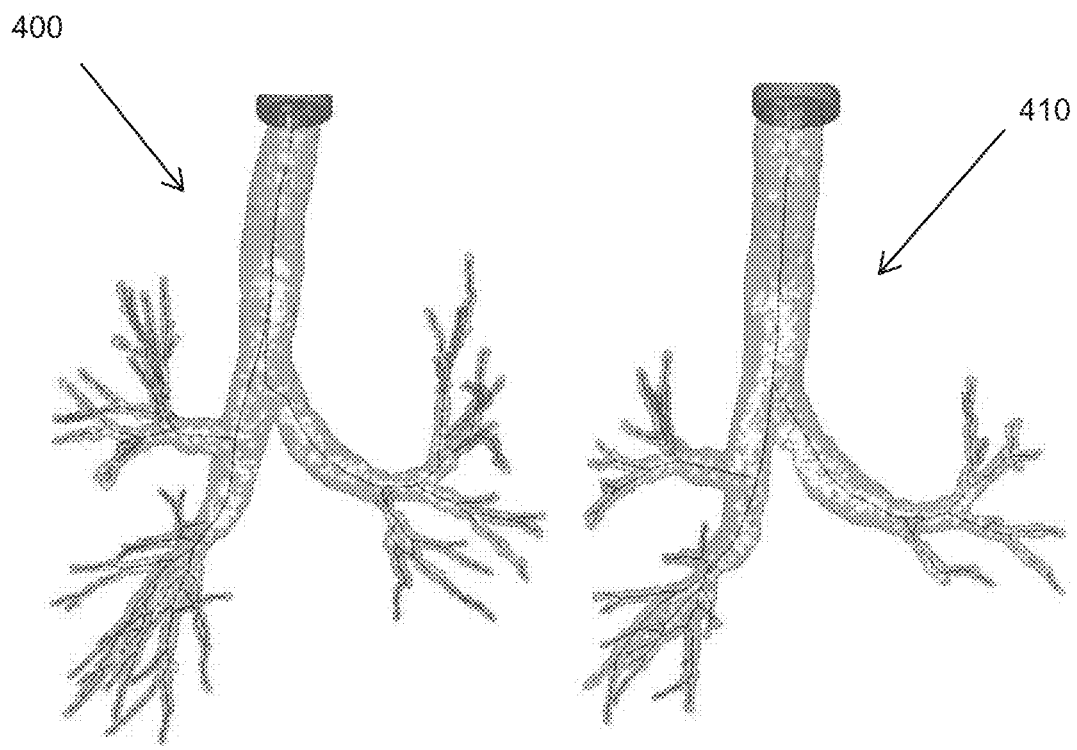
FIG. 3A is a 3D surface rendering of a segmented airway tree reflecting a chest volume near TLC according to one or more aspects shown and described herein.
FIG. 3B is a 3D surface rendering of a segmented airway tree reflecting a chest volume near FRC according to one or more aspects shown and described herein.
Figure 3C:
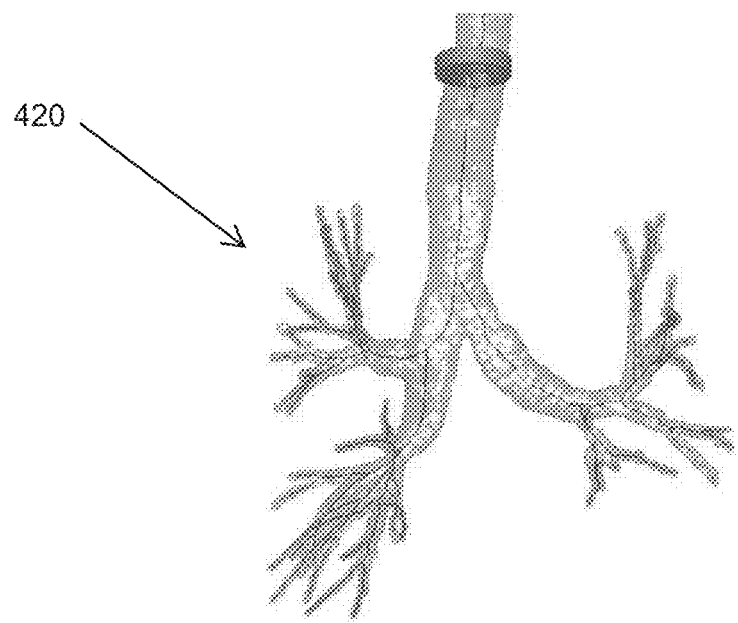
FIG. 3C is a 3D surface rendering of a segmented airway tree after transforming the rendering of FIG. 3A into an FRC space according to one or more aspects shown and described herein.

As stated earlier, $I_{FRC}$ depicts the airway tree in a state that is closer in shape/volume to the subject's physical airway tree during live bronchoscopy. This point might suggest that the TLC scan is unnecessary for planning and guiding the live procedure. However, several reasons work against this notion. For instance, a major consequence of imaging the airway tree during the low-volume FRC state is that small-diameter peripheral airways often appear narrowed, compressed, or blocked in $I_{FRC}$. Thus, certain airways, which appear in $I_{TLC}$, will appear narrowed or blocked in $I_{FRC}$. This can in turn result in successor downstream higher-generation airways, which appear in $I_{TLC}$, to not appear at all in $I_{FRC}$. These missing airways, however, might still be needed for planning a guidance route for live bronchoscopic navigation toward the ROI. Thus, the FRC scan $I_{FRC}$ often captures an airway tree that has a reduced hierarchy of airway branches; i.e., airways and airway subsegments can appear pruned from the full tree. The airway trees depicted in FIGS. 3A-3C illustrate this phenomenon. The airway trees depicted in FIGS. 3A-3C are the result of CT scans collected at different lung volumes. FIGS. 3A-3C each illustrate a 3D surface rendering of a segmented airway tree and extracted airway centerlines. More specifically, FIG. 3A depicts a result 400 of a subject's TLC CT scan $I_{TLC}$. The segmented airway tree includes 129 branches b and 65 paths p. FIG. 3B depicts a result 410 of the subject's FRC CT scan $I_{FRC}$. The segmented airway tree includes 75 branches band 38 paths p. FIG. 3C depicts a result 420 after transforming the subject's TLC CT scan $I_{TLC}$ into the FRC space. The segmented airway includes 95 branches b and 48 paths p. Both scans $I_{TLC}$ and $I_{FRC}$ are high-resolution breath-hold 2D CT scans, with axial-plane resolution $\Delta x = \Delta y = 0.566$ mm and splice spacing $\Delta z = 0.60$ mm. The TLC and FRC scans include 475 and 448 2D axial-plane sections, respectively, with each 2D section including 512×512 voxels.

Figure 4A:
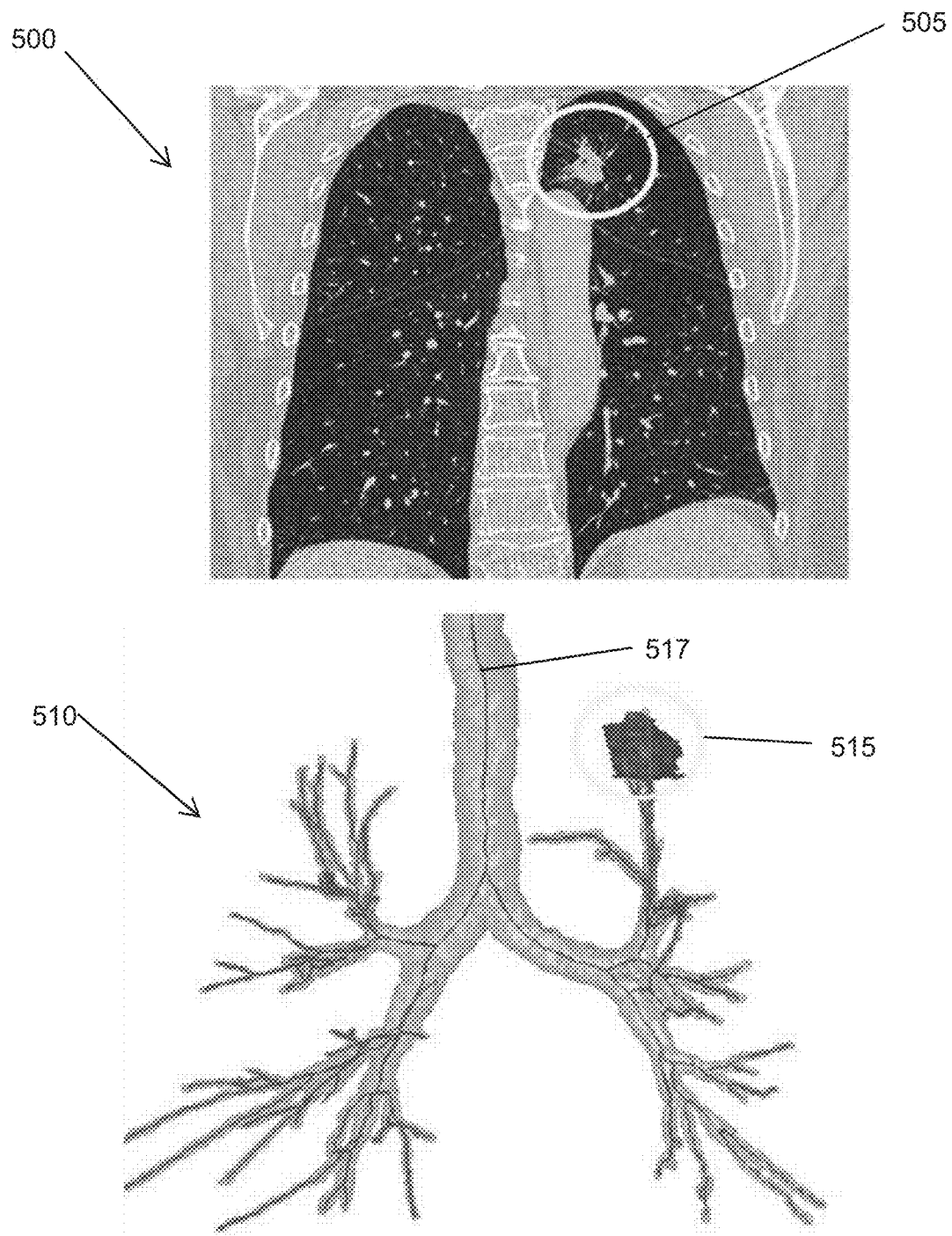
FIG. 4A is a two dimensional (2D) coronal CT section and segmented airway tree for a subject's TLC CT scan according to one or more aspects shown and described herein.
Figure 4B:
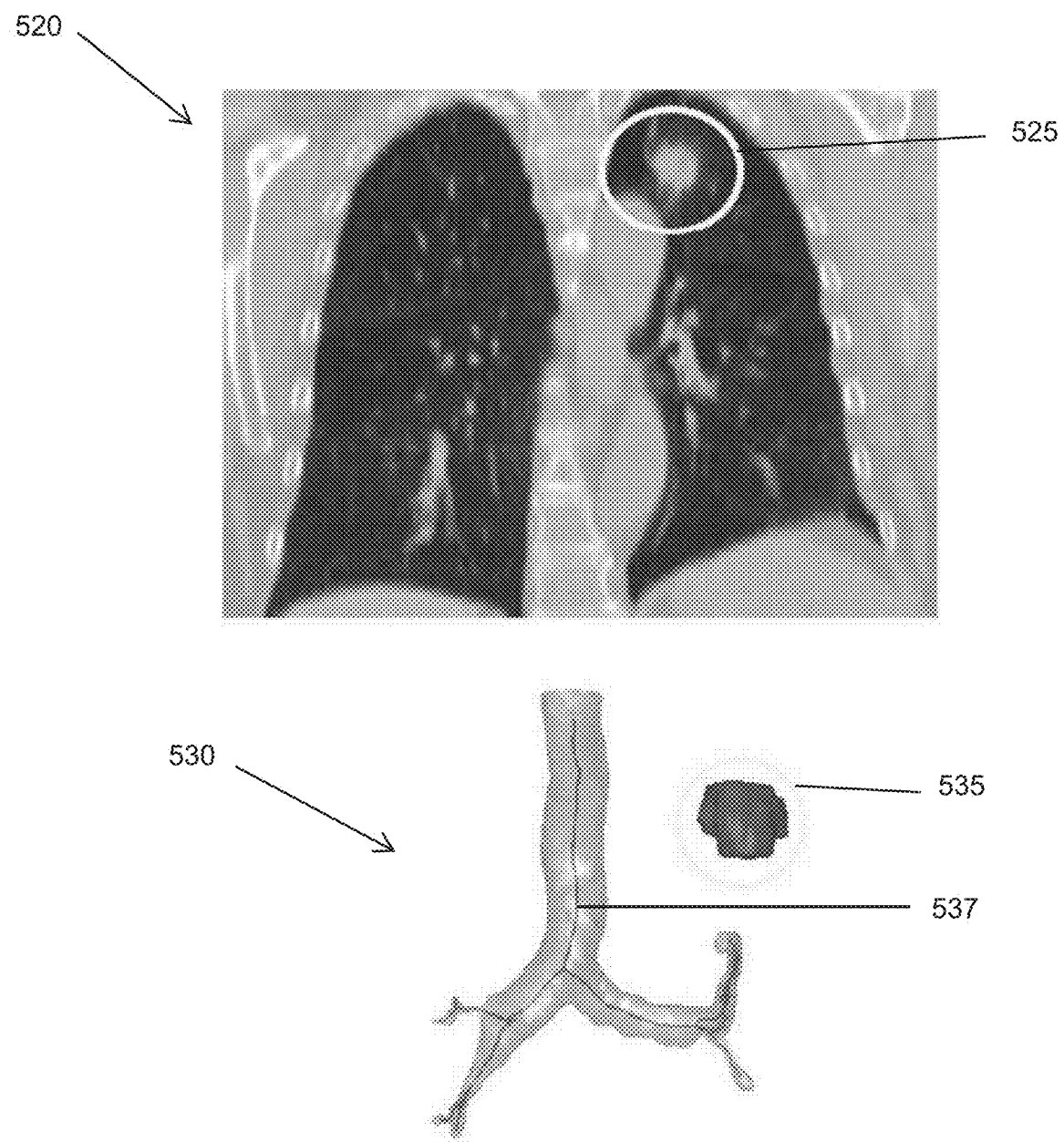
FIG. 4B is a 2D coronal CT section and segmented airway tree for a subject's FRC CT scan according to one or more aspects shown and described herein.
Figure 5A:
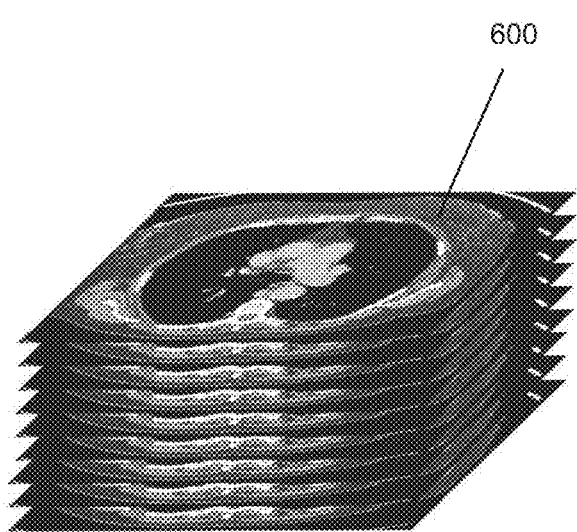
FIG. 5A is a 3D chest CT scan according to one or more aspects shown and described herein.
Figure 5B:
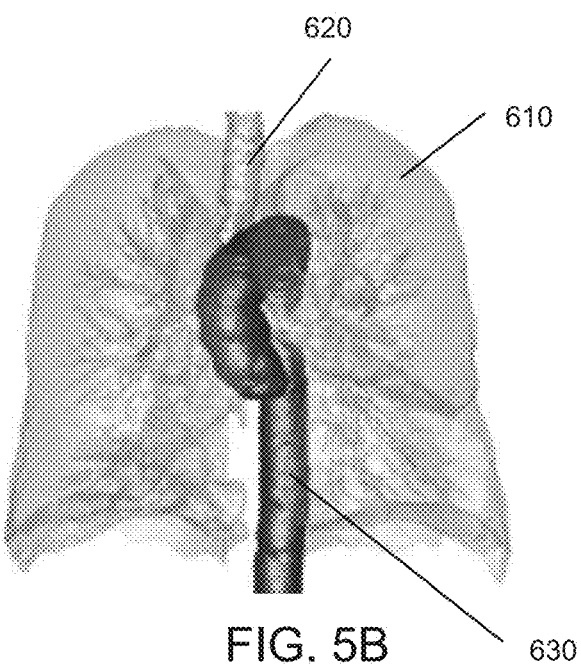
FIG. 5B is a rendering of segmented lungs, an airway tree, and an aorta derived from the 3D chest CT scan of FIG. 5A according to one or more aspects shown and described herein.
Figure 5C:
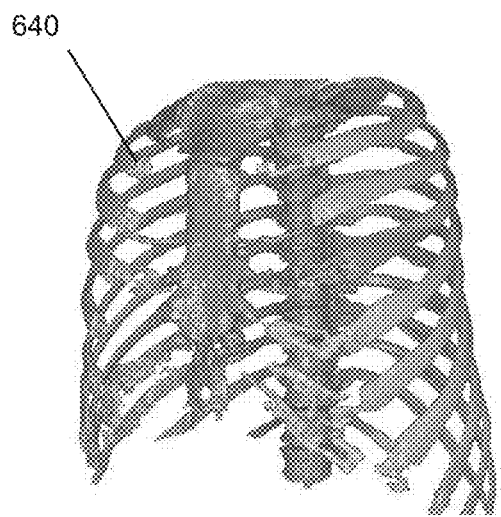
FIG. 5C is a rendering of segmented bones derived from the 3D chest CT scan of FIG. 5A according to one or more aspects shown and described herein.
Figure 5D:
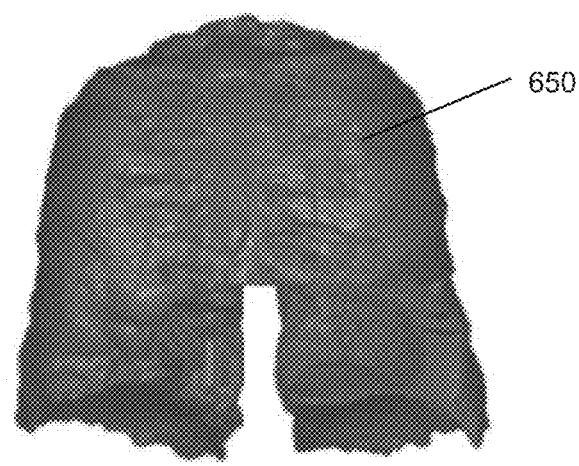
FIG. 5D is a rendering of a segmented thoracic cavity derived from the 3D chest CT scan of FIG. 5A according to one or more aspects shown and described herein.

Moreover, if $I_{FRC}$ is derived from a PET/CT study, the given scan is likely to have lower resolution and added motion blur artifact—factors that degrade the quality of the imaged airway tree and airway endoluminal surfaces. This may preclude the possibility of finding a feasible airway pathway (guidance route) leading to a peripheral ROI. FIGS. 4A and 4B illustrate these factors for an example CT scan derived from a PET/CT study. More specifically, FIGS. 4A and 4B illustrate differences between $I_{TLC}$ and $I_{FRC}$ brought about by changes in lung volume, image resolution, and/or breathing motion of a subject. $I_{FRC}$ is derived from a whole-body PET/CT study. FIG. 4A depicts a 2D coronal CT section 500 and a segmented airway tree 510 for the subject's TLC CT scan. FIG. 4B depicts a 2D coronal CT section 520 and a segmented airway tree 530 for the subject's FRC CT scan. For both FIGS. 4A and 4B, circled regions 505, 525 denote a suspect left upper lung (LUL) tumor in the 2D coronal CT sections 500, 520, respectively. Circled regions 515, 535 denote the suspect LUL tumor in the rendered airway trees 510, 530, respectively. Extracted airway centerlines 517, 537 are further highlighted in the rendered airway trees 510, 530, respectively.

In instances where a deep learning approach is used to produce $I_{FRC}$, it will require a high-resolution input, such as $I_{TLC}$. In addition, the generated image could have internal artifacts as it is not strictly speaking "the real thing." Lastly, the generated FRC CT scan will have the same issues as those depicted in and described with respect to FIGS. 3A-3C.

Hence, $I_{TLC}$ is required and serves throughout as the "best" case reference-standard 3D scan. In particular, $I_{TLC}$ gives the most complete delineation of 3D CT-based virtual space in that it depicts the fullest available airway tree. In addition, $I_{TLC}$ serves as the best case basis for the planning and guidance processes.

Upon acquiring $I_{TLC}$ and $I_{FRC}$, the method continues by developing a plan for a particular procedure. As shown in FIGS. 5A-5D, to begin, for each scan 600, existing methods are used to compute a chest model, which includes a 3D segmented airway tree 620, airway endoluminal surfaces, and airway-tree centerlines. In addition, segmentations of the thoracic cavity 650, lungs 610, aorta 630, pulmonary artery, bones 640, and other pulmonary vasculature are computed. These structures along with the associated CT scan define a 3D CT-based virtual space. Next, the clinician defines the desired ROI R, be it a peripheral nodule or any other relevant clinical site of interest, using existing semi-automatic techniques such as the interactive live wire, region growing, and others.

The airway tree 620 serves as a natural navigation space for image-guided bronchoscopy, with airway centerlines acting as the 3D virtual representation of the physical "road network" for the navigation space. Therefore, the airway centerlines, act as a major element in the described methodology. As such, the mathematical underpinnings of this structure are discussed.

The airway tree's hierarchical branching structure can be represented by the data structure given by T=(V, B, P), where for integers vmax, bmax, and pmax≥1. $V=\{v_1, \ldots, v_{vmax}\}$ represents a set of view sites, $B=\{b_1, \ldots, b_{bmax}\}$ represents a set of branches, with bi=generation-1 root branch of tree T, and $P=\{p_1, \ldots, p_{pmax}\}$ represents a set of all possible airway paths starting at branch $b_1$ and ending at a terminal branch.

A view site v=(x, d) specifies a single discrete point within the airway tree, where x signifies the 3D location/coordinates (x, y, z) of v within the 3D volume delineated by the CT scan it is defined within, be it $I_{TLC}$ or $I_{FRC}$, while d specifies the view direction and orientation. The quantity d includes a vector specifying the view direction and an up vector that denotes an observer's orientation when viewing the scene from view site v. During the process of computing the centerlines, neighboring view sites are discretely spaced nearly an equidistant amount from each other, where their spacing Δv is a function of the CT scan's 3D resolution (Δx, Δy, Δz). In addition, while deriving the centerlines, the airway branch diameter and branch angle for each constituent view site is also computed; hence, this information is also associated with each view site. The view site v can also be referred to as a pose in a virtual space.

A branch $$b = \{v_a, v_b, \ldots, v_l\} \quad (1)$$

is made up of an ordered set of neighboring connected view sites $v_a, v_b, \ldots, v_l \in V$. The first view site $v_a$ of root, or parent, branch $b_1$ is the root site $v_1$, which starts the entire tree, while $b_1$'s final view site $v_l$ is a bifurcation point, which spawns, or otherwise begins, successor child branches constituting the tree. For the lungs, the two child branches of $b_1$ are the right main bronchus (RMB) and the left main bronchus (LMB). For all other branches b≠$b_1$, $v_a$ is a bifurcation point, thereby implying that b has a parent branch, while $v_l$ can be either a bifurcation point or an end point. Branch b is a terminal branch if $v_l$ is an end point, implying that b has no child branches. If branch b is not a terminal branch, then $v_l$ is a bifurcation point and b spawns child branches.

Lastly, a path $$p = \{b_1, \ldots, b_m\} \quad (2)$$

includes an ordered hierarchal set of branches $b_1, \ldots, b_m \in B$. All paths start with root branch $b_1$, continue with a series of child/ancestor branches, and end with a terminal branch $b_m$. For the lungs, a path represents an airway pathway starting in the trachea (root branch $b_1$) and ending at some terminal airway branch.

For the described methodology, it is necessary to better specify branch equation (1) for a branch $b_j$ as the following ordered set of $\omega_j$ view sites:

$$b_j = \{v_{j,1}, v_{j,2}, \ldots, v_{j,\omega_j}\} \quad (3)$$

where $v_{j,i} \in V$ is the $i^{th}$ view site constituting $b_j$. With definition (3), the branch length $l_j$ of $b_j$ can now be defined as the accumulated Euclidean distance $$\Delta v = |v_{j,i} - v_{j,i+1}| \quad (4)$$

between each connected pair of view sites ($v_{j,i}$, $v_{j,i+1}$), i=1, ..., $\omega_j$−1.

Figure 6:
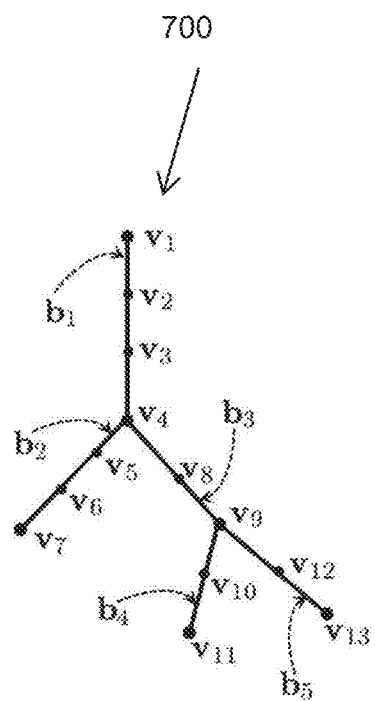
FIG. 6 is a schematic of a tree data structure according to one or more aspects shown and described herein.

FIG. 6 provides an example of the many tree data structure concepts discussed above. For example, a tree data structure 700 is depicted that is defined by T={V, B, P}, where the set of view sites V includes thirteen (13) view sites, the set of branches B includes five (5) branches, and the set of paths P includes three (3) complete paths through the tree. View sites $v_4$ and $v_9$ are bifurcation, or branch, points, while $v_4$, $v_7$, $v_9$, $v_{11}$, and $v_{13}$ are endpoints.

Given this development, the related concepts of the virtual/real spaces and the airway guidance route are now introduced. As is standard for assisted bronchoscopy systems, a subject's high-resolution 3D CT scan delineates the virtual (chest) space, while the subject's actual chest anatomy defines the real (chest) space. As an ancillary concept, the airway guidance route is defined as a continuous connected pathway through the airway tree interior that leads to ROI R.

As used herein, r is used to denote an airway guidance route delineating a connected pathway through the airway tree leading to ROI R. Route r consists of an ordered hierarchical set of branches leading from the trachea (branch bi) to a final destination near the ROI:

$$r = \{b_1, b_2, \ldots, b_j, \ldots, b_a, s\} \quad (5)$$

$$= \{v_1, \ldots, v_{1,\omega_1}, v_{2,2}, \ldots, v_{2,\omega_2}, v_{3,2}, \ldots, v_{3,\omega_3}, \ldots, v_{a,\omega_a}, v_{a+1,2}, \ldots, v_D\} \quad (6)$$

where each branch $b_j \in B$, $j=1, 2, \ldots, a$, is made up of view sites per (3) and $$s = \{v_{a,\omega_a}, v_{a+1,2}, \ldots, v_{a+1,v}, v_{a+1,v+1}, \ldots, v_D\} \quad (7)$$

is a terminating segment concluding with destination view site $v_D$ located close to the ROI.

In various instances, a trivial airway guidance route of the form $r=\{s\}$ made up only of a segment s is possible. Such a route would be appropriate, for example, for a station 2 lymph node, but it would not occur for a peripheral nodule.

As with the paths (2), all routes begin with the airway tree's tracheal branch $b_1$.

Per (3), the final final view site of branch $b_j$, namely $v_{j,\omega_j}$, also equals the first view site $v_{j+1,1}$ of $b_{j+1}$. Thus, $v_{1,\omega_1}=v_{2,1}$, $v_{2,\omega_2}=v_{3,1}$, etc., in (6).

Route r by convention consists of a complete branches $b_j \in B$ and a partial $(a+1)^{th}$ "branch" specified by (7).

(6) highlights route r's a endpoints $$v_{j,\omega_j} \equiv v_{j+1,1}, j = 1, 2, \ldots, a \quad (8)$$

which prove to be key points in constructing alternate (back-up) guidance routes toward the ROI, as discussed in greater detail herein.

A major point to realize is that many possible airway guidance routes r traversing different airway branches could conceivably be feasible, depending on the criteria used to define a destination view site $v_D$.

The terminating segment s is a vital element of the final localization process for optimal ROI examination. As the route computation process elaborates on more below, the first several view sites constituting terminating segment s of (7) will likely be in set V; e.g., the first v view sites of s up to view site $v_{a+1,v}$ in (7) may be view sites constituting the initial portion of some branch $b \in B$. The concluding series of view sites—e.g., view sites $v_{a+1, v+1}$ through $v_D$ in (7)—however, are computed so that they enable the bronchoscope and possibly a biopsy needle or ancillary device such as an rEBUS probe to fit within the local confines of the airway tree and also enable optimal ROI examination. Hence, these view sites are unlikely to be in set V.

Navigation through the airways of the CT-based virtual space is accomplished by a virtual bronchoscope (VB), or virtual camera, where the virtual bronchoscope produces CT-based VB views $I_{CT}^\Theta$ ("virtual video" views) at each pose $\Theta$ along the guidance route. When following a preplanned airway guidance route r of the form (6), the pose $\Theta$ is defined by a constituent view site $v \in r$. As is standard in the field of computer vision, a pose $\Theta$ is given by a six-parameter vector defining the pose's 3D spatial (x, y, z) position and Euler angles ($\alpha$, $\mu$, $\gamma$). When $\Theta$ is defined by a view site $v=(x, d)$, $\Theta$'s specifications are given by (x, d).

Analogously, during live bronchoscopy, the physician attempts to navigate through the subject's airways (real space) toward the ROI by following the guidance offered by the assisted bronchoscopy system. In particular, the physician navigates the bronchoscope through the real airway tree by observing real bronchoscopic video camera images $I_V^\Theta$ of the subject's airway tree endoluminal, or interior, structure at various poses $\Theta$ imaged by the bronchoscope as it is maneuvered through the subject's airways. That is, $I_V^\Theta$ is a 2D video frame in the bronchoscope's live video stream at pose $\Theta$ in real space.

Given the definitions above, the goal of an assisted bronchoscopy system is to assist the physician in navigating the real bronchoscope through the subject's airway tree so that they follow the preplanned airway route r defined in virtual space. A vital underpinning of assisted bronchoscopy systems is that guidance is accomplished by aligning the positions of the virtual and real bronchoscopes as they proceed along the guidance route toward the ROI in their respective spaces. This suggests that as the virtual bronchoscope moves along route r the real bronchoscope should be maneuvered so that it appears to be at the same location. In other words, during the live procedure, the bronchoscope's video stream should appear to stay approximately synchronized, or registered, with the virtual bronchoscope's VB view sequence along r, at certain view sites/poses $\Theta_j$ along the guidance route; i.e., $$I_V^{\Theta'_j} \approx I_{CT}^{\Theta_j}, j = 1, 2, \ldots \quad (9)$$

where
$I_{CT}^{\Theta_j}$ is a VB view
$\Theta_j \triangleq$ virtual space pose of a view site on route r
$I_V^{\Theta'_j}$ is a frame in the bronchoscope's video stream
$\Theta'_j \triangleq$ real space pose approximately corresponding to the same viewpoint as $\Theta_j$.

Figure 7A:
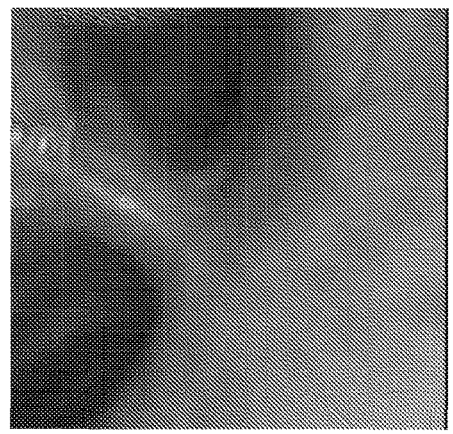
FIG. 7A is a still-image captured from a live bronchoscopic video frame $I_V^{\Theta_j}$ according to one or more aspects shown and described herein.
Figure 7B:
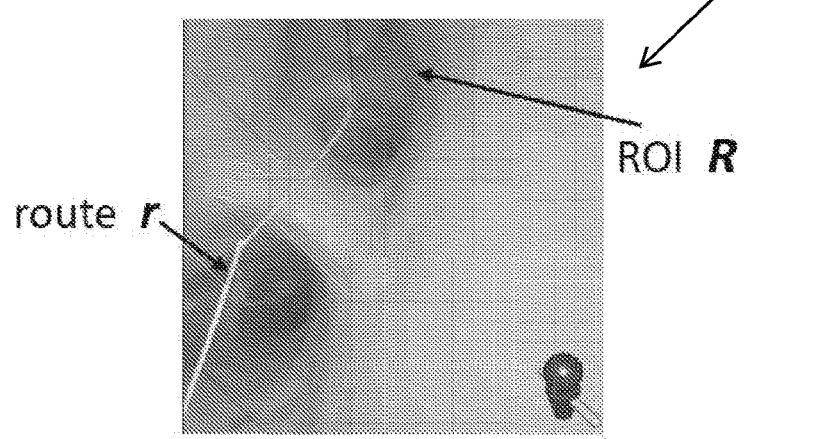
FIG. 7B is a VB view $I_{CT}^{\Theta_j}$ generated at a virtual space pose $\Theta_j$ for a view site on a predetermined route according to one or more aspects shown and described herein.
Figure 7C:
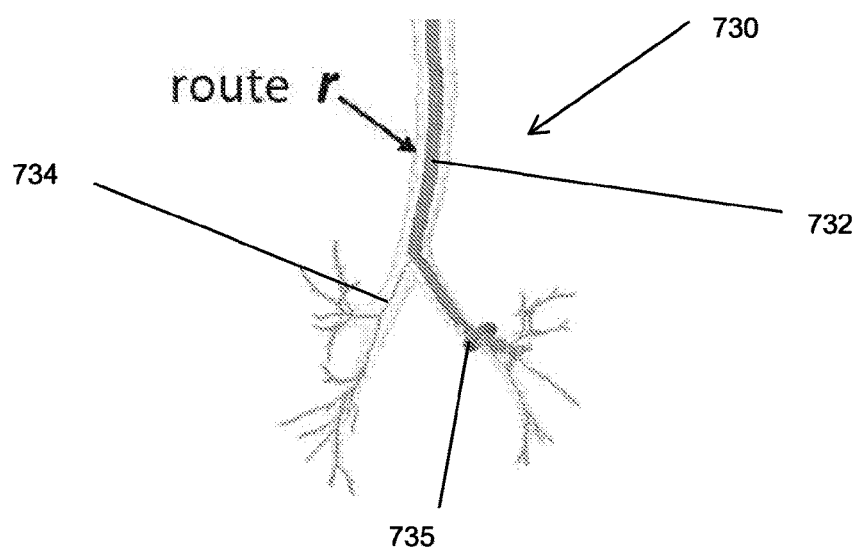
FIG. 7C is a 3D CT-based airway tree showing the predetermined route to a particular region of interest (ROI) according to one or more aspects shown and described herein.

Importantly, at the conclusion of guidance during final confirmation and/or localization, the bronchoscope and VB are registered at the destination view site $v_D$. FIGS. 7A-7C illustrate many of the concepts discussed above for assisted bronchoscopy. More specifically FIGS. 7A-7C illustrate examples of virtual and real space poses registered at a view site of a guidance route. FIG. 7A depicts a still image 710 captured from a live bronchoscopic video frame $I_V^{\Theta'_j}$. FIG. 7B depicts a VB view 720, $I_{CT}^{\Theta_j}$, generated at virtual space pose $\Theta_j$ for a view site on route r. FIG. 7C depicts a 3D CT-based airway tree showing the preplanned guidance route r 732 to ROI R and centerlines 734. The cylindrical icon 735 indicate a current virtual space pose $\Theta_j$ of the virtual bronchoscope.

Returning to the planning process portion of the method, the method continues as a 3D transformation T is now computed that specifies how each point $I_{TLC}(x, y, z)$ maps to a corresponding point $I_{FRC}(x, y, z)$. By deriving transformation T, the means is available for relating the high-quality reference-standard TLC planning data to the potentially less complete data observed at FRC.

The following discussion assumes CT scan $I_{FRC}$ is derived from a whole-body PET/CT study. Hence, 3D digital image $I_{FRC}$ resides in the domain $\Omega_{FRC}^{body} \subseteq R^3$, which delineates the 3D CT-based virtual space relative to the FRC scan.

Figure 8:
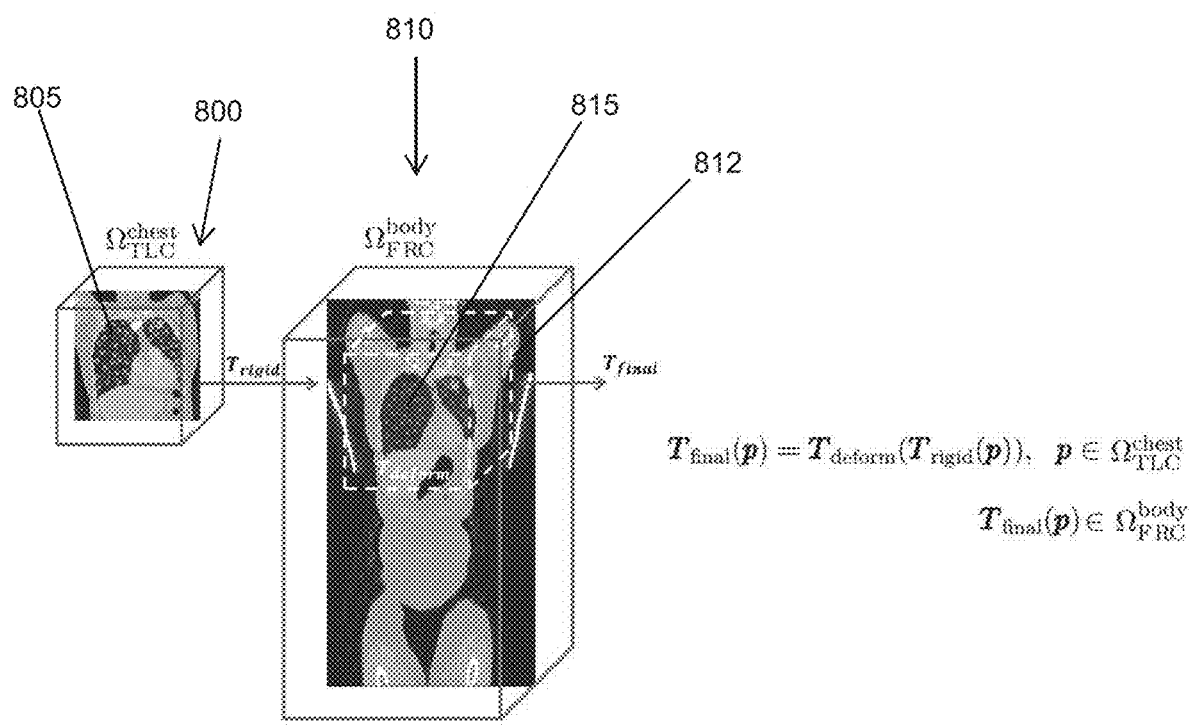
FIG. 8 is a schematic showing a chest space and a whole-body space for transformation according to one or more aspects shown and described herein.

Likewise, 3D digital image $I_{TLC}$ resides in the domain $\Omega_{TLC}^{chest} \subseteq R^3$, which delineates the 3D CT-based virtual space relative to the TLC scan. FIG. 8 depicts these two spaces and coordinate systems. Note that the 3D spatial resolution of the two CT scans shown in FIGS. 8A and 8B differ in ($\Delta x$, $\Delta y$, $\Delta z$). In addition, the origins O of the two scans in their respective spaces differ.

Despite these differences, it is straightforward to establish point correspondences between the two spaces via deformable image registration. The basic approach has been applied to registering inflated and deflated 3D cone beam CT images and to the deformable registration of whole-body 3D PET scans to 3D chest CT scans. Notably, if CT scans, $I_{TLC}$ and $I_{FRC}$, were collected with the same high-resolution chest CT scanner, then the spatial resolutions of the two CT scans would be the same and only their origins would differ. Hence, the transformation process for this simpler situation readily follows from the current discussion.

Computation of the desired 3D transformation T involves finding the optimal transformation $T=T_O$ that enables alignment of $I_{TLC}$ and $I_{FRC}$. It requires solving the optimization problem $$T_o = \arg\left\{\min_T C(I_{TLC}(p)), I_{FRC}(T(p))\right\}, \forall p \in \Omega_{TLC}^{chest}. \quad (10)$$

where $C(\cdot, \cdot)$ is a cost function and $T(\cdot)$ is a transformation that maps each point $p=(x, y, z) \in \Omega_{TLC}^{chest}$. Thus for each point $p \in \Omega_{TLC}^{chest}$, $$\hat{p} = T_o(p).$$

where $\hat{p} \in {}_{FRC}^{body}$ and
$I_{TLC}(p)$ corresponds to $I_{FRC}(\hat{p})$.

Two well-known approaches exist for solving problem (10).

The first approach entails a traditional two-step optimization process that seeks to derive a transformation of the form $$T_{final} = T_{deform}(T_{rigid}) \quad (11)$$

where Trigid and Tdeform are rigid and deformable transformations, respectively, i.e., for each $p \in \Omega_{TLC}^{chest}$, $$\hat{p} = T_{final}(p) = T_{deform}(T_{rigid}(p))$$

where $\hat{p} \in \Omega_{FRC}^{body}$.

FIG. 8 gives a schematic diagram of the transformation $T_{final}$ between $\Omega_{TLC}^{chest}$ and $\Omega_{FRC}^{body}$. More specifically, FIG. 8 depicts a chest space 800, $\Omega_{TLC}^{chest}$, and a whole-body space 810, $\Omega_{FRC}^{body}$, for 3D transformation. The TLC-based space 800, $\Omega_{TLC}^{chest}$ is mapped into the FRC-based space 810, $\Omega_{FRC}^{body}$, represented as dotted cube 812, through transformation $T_{final}$. Points, or dots, 805 in $\Omega_{TLC}^{chest}$ are mapped to corresponding points, or dots, 815 in $\Omega_{FRC}^{body}$. Deriving $T_{final}$ involves two steps: (1) initial alignment; and (2) deformable registration.

The first step of initial alignment derives the requisite rigid transformation $T_{rigid}$ that performs a simple 3D translation and rotation to roughly align $I_{TLC}$ with $I_{FRC}$. It exploits the idea that the trachea and the left and right main bronchi are essentially bony rigid structures whose shapes do not change from TLC to FRC. In particular, by finding the transformation $T_{rigid}$ that aligns these major airway structures in the two CT scans, the desired $T_{rigid}$ can be obtained. The method for finding $T_{rigid}$ involves the following three steps.

Figure 9A:
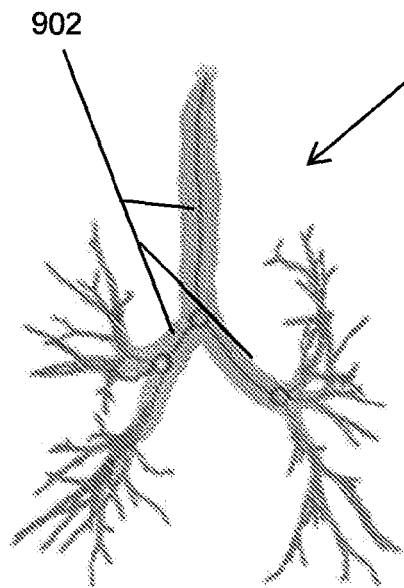
FIG. 9A is a segmented airway tree based off of a subject's TLC CT scan according to one or more aspects shown and described herein.
Figure 9B:
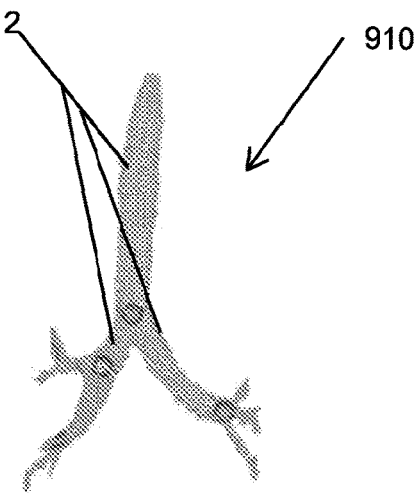
FIG. 9B is a segmented airway tree based off of a subject's FRC CT scan according to one or more aspects shown and described herein.
Figure 9C:
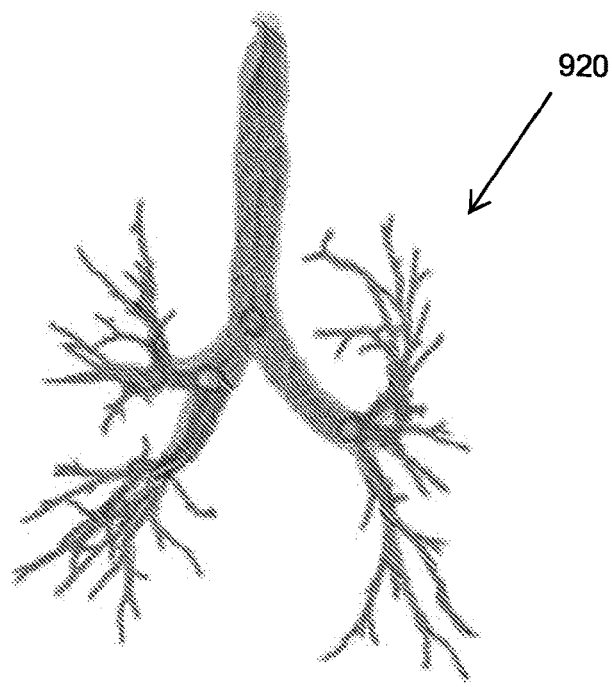
FIG. 9C is a rigid alignment of the segmented airway trees of FIGS. 9A and 9B after applying a transformation according to one or more aspects shown and described herein.

First, using the previously computed segmented airway trees associated with the two CT scans, the trachea $b_{trachea}$ and left and right main bronchi, $b_{left}$ and $b_{right}$, are identified while omitting other airway branches. This gives $M^{chest}$ and $M^{body}$, which represent the main-branch airway tree surface points of $I^{chest}$ and $I^{body}$, respectively. FIGS. 9A and 9B depict example trees found for an example CT scan pair. More specifically, FIGS. 9A and 9C depict a registration of TLC- and FRC-based airway trees. FIG. 9A depicts a segmented airway tree 900 and centerlines 900 from $I_{TLC}$. Three main airway branches 902, trachea $b_{trachea}$, left main bronchus $b_{left}$, and right main bronchus $b_{right}$, are highlighted. FIG. 9B depicts the segmented airway tree 910 and centerlines from $I_{FRC}$. The three main airway branches 912 are once again highlighted.

Second, one thousand (1000) points are randomly selected from FRC surface $M^{body}$. However, in various instances, more or less than 1000 points can be selected. Next, for each selected FRC point, an iterative closest point registration method is applied to find the closes point in $M^{chest}$ corresponding to the FRC point.

Thirdly, given the corresponding point pairs, the least-squares fitting is used to estimate a desired rigid transformation $T_{rigid}$.

FIG. 9C depicts the result 920 of applying the derived $T_{rigid}$ to align the two trees 900, 910, while FIG. 2 depicts results after applying $T_{rigid}$ to $I_{TLC}$. While the initial alignment provided by $T_{rigid}$ makes much progress in the transformation process, substantial errors still exist between $I_{TLC}(p)$ and $I_{FRC}(T_{rigid}(p))$ at many points $p \in \Omega_{TLC}^{chest}$. Notably, even though the lower-resolution $I_{FRC}$ provide a substantially reduced tree as compared to $I_{TLC}$, more than sufficient surface information exists for performing the initial coarse alignment.

The second step of deriving $T_{final}$ involves deformable registration that alleviates much of the remaining error. Deformable registration involves a 3D intensity-based optimization process involving two images: (1) a fixed image $I_{fixed}(p)=I_{FRC}(p)$; and (2) a moving image $Imoving(p)=I_{TLC}(T_{rigid}(p))$, $\forall p \in \Omega_{TLC}^{chest}$. The goal is to find a spatially varying transformation function $T_{deform}=T_\mu$ that gives the best match between $I_{fixed}(p)$ and $I_{moving}(T_\mu(p))$ for all points $p \in \Omega_{TLC}^{chest}$. To find this transformation, a B-spline-based deformation model is employed constituting the Elastix optimization framework. This entails solving the optimization problem $$\mu *= \arg\left\{\min_\mu C(I_{fixed}(p), I_{moving}(T_\mu(p)))\right\}, \forall p \in \Omega_{TLC}^{chest}, \quad (12)$$

where $T\mu$ is a 3D parametric transformation function defined by parameter set $\mu^*$ and C is a cost function that measures the intensity similarity between two images. Here, a lower value indicates a greater similarity. In practice, to give more pertinent results in the region that matters—namely, the thoracic cavity—the space considered in (12) is reduced to points $p \in \Omega_{TLC}^{thoracic}$, where $\Omega_{TLC}^{thoracic}$ is the restriction of space $\Omega_{TLC}^{chest}$ to points inside the segmented thoracic cavity.

Figure 10A:
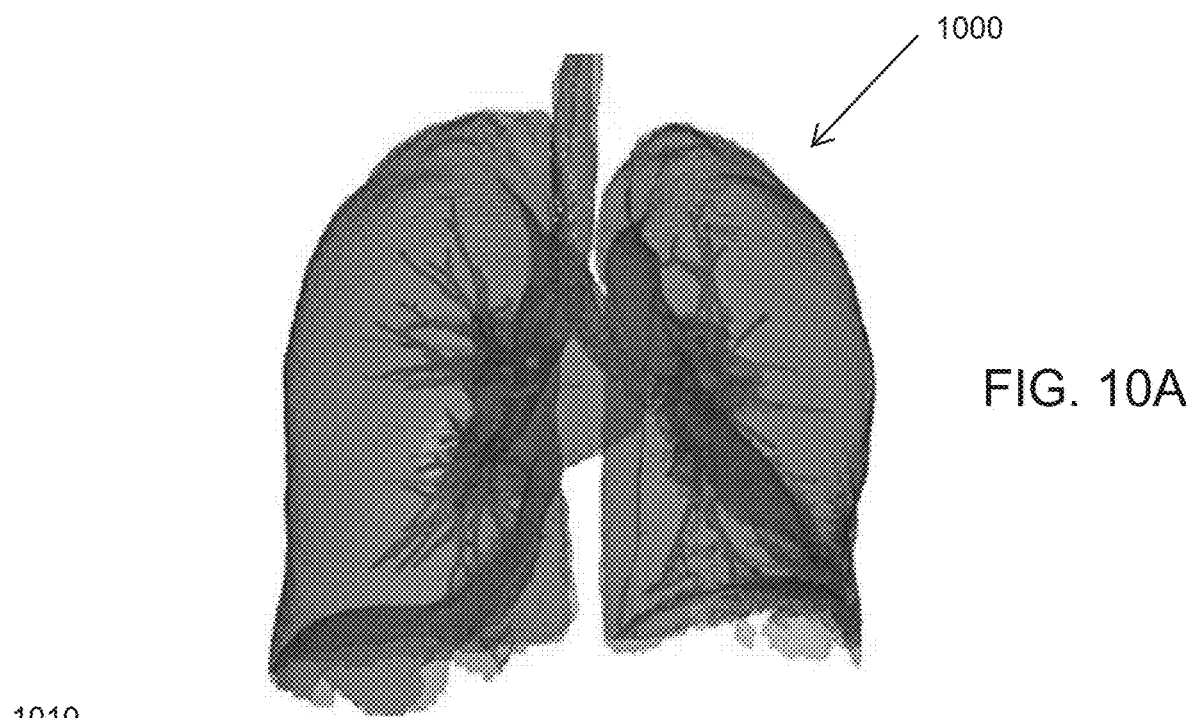
FIG. 10A is a fully registered volume rendering of a subject's organs for a TLC volume according to one or more aspects shown and described herein.
Figure 10B:
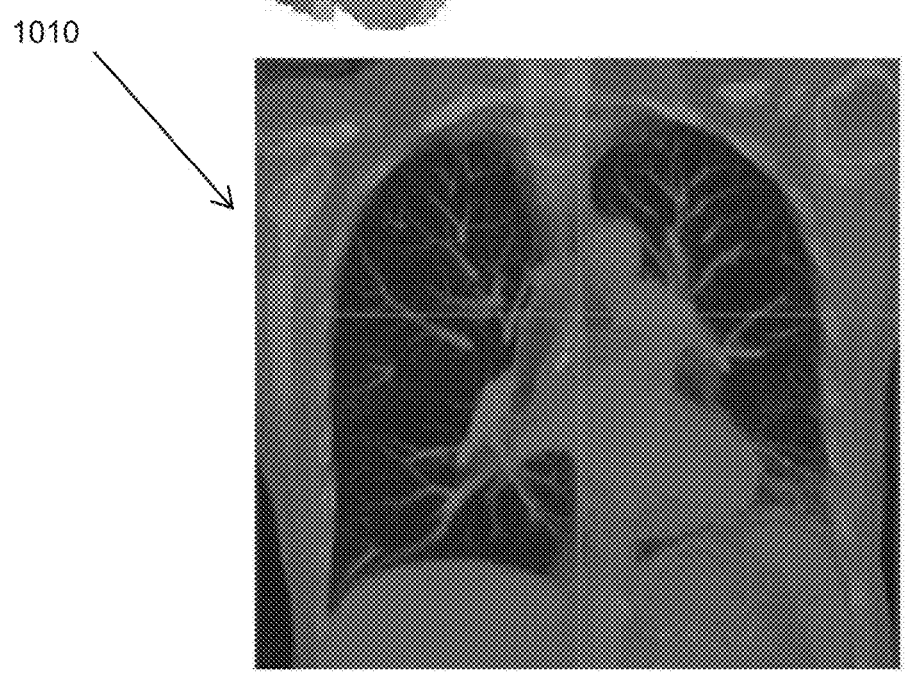
FIG. 10B is a coronal front-to-back slab view depicting volume differences between a fully registered TLC volume and an FRC volume derived from FIG. 10A according to one or more aspects shown and described herein.

FIGS. 10A and 10B depict results of applying the complete transformation Tfinal after applying Tdeform to the result of FIG. 2. FIGS. 10A and 10B depict the results after rigid alignment and deformable registration. FIG. 10A depicts fully registered volume renderings 1000 of the organs for a TLC volume and an FRC volume. FIG. 10B depicts a coronal front-to-back slab view 1010 depicting the volume differences between the fully-registered TLC volume and FRC volume. Also, derived transformation T is used to map all TLC-based components of the anatomical chest model (segmented airway tree, endoluminal surfaces, center-lines, ROI R, etc.) into FRC-based virtual space.

An alternative approach for solving optimization problem (10) to find 3D transformation T involves using deep learning techniques. Such methods have been applied to image registration in many domains, including the registration of CT image volumes to cone beam CT and the registration of 3D CT cardiac volumes at different time points. For chest CT, unsupervised learning methods for deformable registration of 3D volumetric images at different time points in the breathing cycle have been proposed. For these methods, the inputs are again a fixed image $I_{fixed}$ and a moving image $I_{moving}$, which pass through a deep learning framework to derive the 3D displacement field T which relates the correspondences between the two images. Results show that the methods perform successfully, particularly in relation to known packages such as Elastix. An added advantage of these methods is that they tend to be extremely fast computationally.

After deriving 3D transformation T, the planning process of the method proceeds by deriving a TLC-based primary guidance route $r_p$, an FRC-based final guidance route $r_f$, and associated guidance cues for each route.

To begin, using CT scan $I_{TLC}$, primary guidance route $r_p$ is computed. The route computation method draws on the following inputs: (1) bronchoscope specifications ($d_B$, $\lambda_B$, $\Delta_B$), where $d_B$ and $\lambda_B$ indicate the diameter and length of the bronchoscope tip, respectively, and $\Delta_B$ denotes the maximum bending angle of the bronchoscope tip when it is articulated; (2) biopsy needle, or rEBUS probe, length $\lambda_N$, which also indicates the maximum distance that the supplemental device can be extended out of the bronchoscope tip; (3) a 3D cone, whose axis is the needle/probe and whose radius is defined by angle $\theta_{cone}$, given by $$\sin \theta \text{cone} = \frac{r}{\lambda}$$

where $\lambda \leq \lambda_N$ is the length in mm that the needle/probe is extended from the bronchoscope tip and r is the resulting cone radius. A feasible airway guidance route terminates with a destination site $v_D$ that avoids occluding blood vessels. This condition is met by a route if the cone's 3D volume does not intersect nearby vessels when location is reached $v_D$. The cone also guards against the uncertainty in accuracy that the needle, or probe, can be positioned, any imperfections in the definition of ROI R, and/or image resolution approximations; and/or (4) anatomical chest model quantities (a) airway branch lengths $l_{b_j}$ and diameters $d_{b_j}$ for all $b_j \in B$ and branch angles between successive branches, (b) airway surface data (c), ROIs corresponding to occluding obstacles, including possibly the aorta, pulmonary artery, lungs, and/or other vasculatures, and/or (d) ROI R.

The goal is to derive a primary route $r_p$ of the form (6) that is both feasible and optimal with respect to two feasibility constraints and one optimality constraint. The first feasibility constraint is defined as the bronchoscope can fit within the airways constituting route $r_p$, relative to the constraints imposed by the bronchoscope and needle/probe specifications ($d_B$, $\lambda_B$, $\Delta_B$, $\lambda_N$) and/or known airway branch measurements and surface data, obstacle locations and shapes, and ROI R. The second feasibility constraint is defined as the device either does not puncture occluding anatomical structures (needle used) or does not have its view of the ROI obscured (probe used), relative to the constraints imposed by the cone and/or locations and/or shapes of the known obstacles, such as the aorta, etc., for example. The optimality constraint is defined as the destination pose $v_D$ enables a maximal tissue sample relative to other possible poses.

The above requires a search for the optimal route $r_p = r_o$ within tree structure T that enables either the maximum tissue sample of R (if a needle is used) or maximal 1-D cross-sectional view of R (if a probe is used) per the relation:

$$r_o = \arg \left\{ \max_{r \in S_f} E_r \left( D(d_B, \lambda_B, \Delta_B, \lambda_N) \right) \right\}, \quad (13)$$

where $S_f$ is the set of feasible routes per the feasibility constraints and $D(\cdot)$ is a function denoting ROI tissue sample size (needle used) or 1-D ROI cross-section width (probe used). Lastly, $E(D(\cdot))$ is a function that recognizes that sampling at the location x of $v_D$ will entail some uncertainty into how closely the physician/robot will be able to position the needle/probe in direction d. An efficient implementation of optimization problem (13) can be performed on a computer.

For the purposes of this disclosure, the final derived primary guidance route $r_p$ takes the following modified form of (5-6):

$$r_p = \{b_1, b_2, \ldots, b_j, \ldots, b_{N-1}, b_N, s\} \quad (14)$$

$$= \{v_1, \ldots, v_{1,\omega_1}, v_{2,2}, \ldots, v_{2,\omega_2}, v_{3,2}, \ldots, v_{3,\omega_2}, \ldots, \quad (15)$$

$$\underbrace{v_{N-1,\omega_{N-1}}, v_{N,2}, \ldots, v_{N,\omega_N}}_{b_N}, v_{N+1,2}, \ldots, v_D\}$$

$$= \{v_1, \ldots, v_{1,\omega_1}, v_{2,2}, \ldots, v_{2,\omega_2}, v_{3,2}, \ldots, v_{3,\omega_2}, \ldots, \quad (16)$$

$$\underbrace{v_L, v_{N,2}, \ldots, v_{N,\omega_N}}_{b_N}, \underbrace{v_{N+1,2}, \ldots, v_D}_{s}\}.$$

Relation (16) highlights a major added novel element in the designation of a localization site $v_L$, which is also the endpoint $v_{N-1, \omega_{N-1}}$ of branch $b_{N-1}$ and the first view site $v_{N, 1}$ of branch $b_N$. (Recall that $v_{N, 1} = v_{N-1, \omega_{N-1}}$). The localization view site $v_L$ serves as the bridge for creating the final guidance route $r_f$ residing in FRC-based virtual space. In particular, it signifies when guidance shifts from the primary guidance route $r_p$ to the final guidance route $r_f$—for this point onward, any remaining navigation followed by final ROI confirmation/localization is done relative to FRC-based virtual space.

In practice for this disclosure, $v_L$ is designated as the branch endpoint in $r_p$ closest to destination site $v_D$ whose cumulative Euclidean distance to $v_D$ is $\geq d_L$ mm, where $d_L$ is a user-selected parameter in the 2 to 4 cm range for bronchoscopy. Most importantly, $d_L$ is selected so that $v_L$ is the endpoint of a branch that is also definitely visible in FRC-based virtual space. Note, without loss of generality, that (16) assumes that $v_L$ ends branch $b_{N-1}$, but it can be any branch $b_b$, $b \leq N$, depending on $d_L$. The definition of $r_f$ provided herein will clarify this point.

Given primary guidance route $r_p$, it is a simple matter to derive associate guidance cues. The purpose of these cues is to direct the clinician and/or robot on how to maneuver and deploy the bronchoscope and/or supplemental device along a given route during a live procedure. Cues can be derived for each phase of bronchoscopy guidance.

Figure 11:
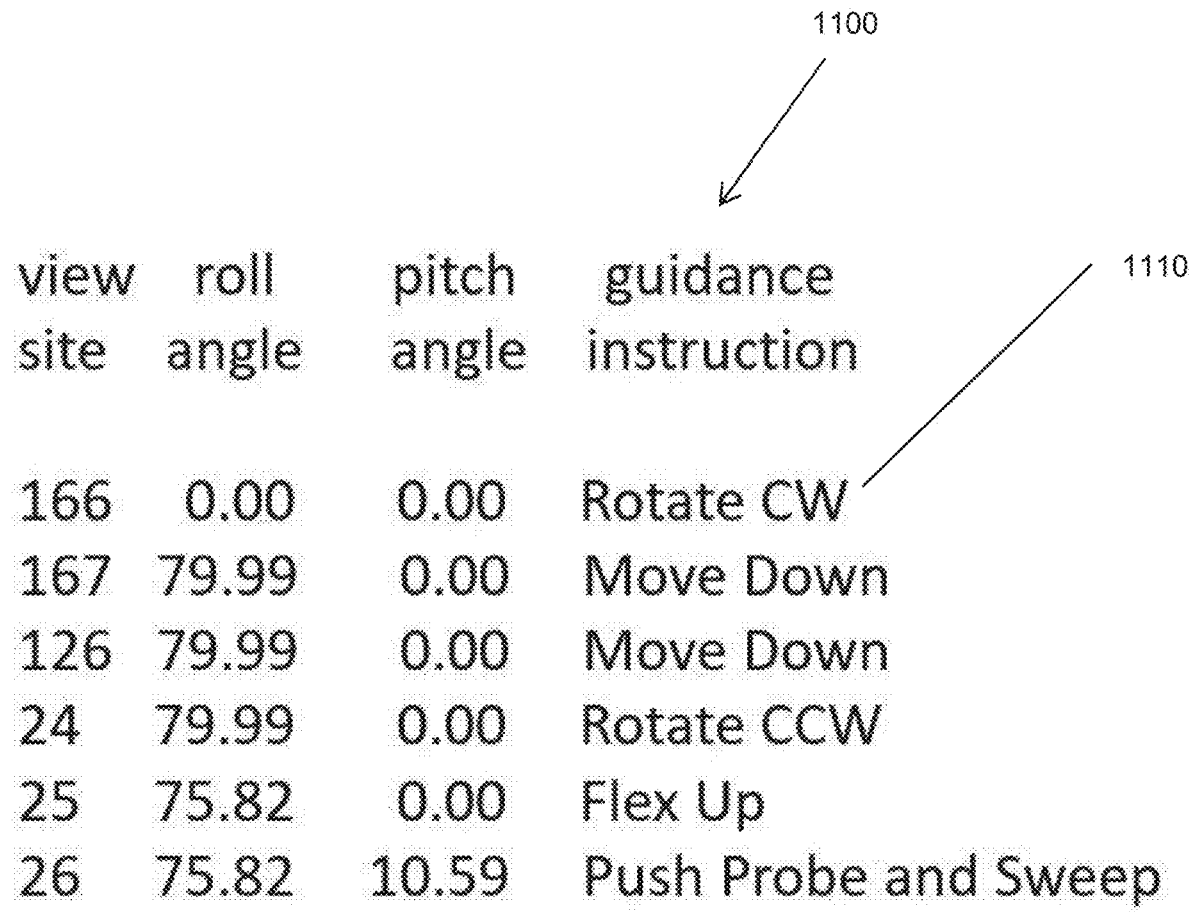
FIG. 11 is an excerpt for a guidance instruction cue set according to one or more aspects shown and described herein.

For the navigation phase (view sites of $r_p > d_{local}$ mm from $v_D$), a cue is derived at each airway bifurcation, which suggests that the bronchoscope either be moved up or down or rotated clockwise or counterclockwise. For the confirmation and/or localization phase (view sites of $r_p < d_{local}$ mm from $v_D$), the remaining cues suggest how to deploy the supplemental device. These cues can include a final bronchoscope movement and rotation, to position the bronchoscope for device deployment, and cues for using the device (e.g., push probe and sweep). Note that the planning process automatically determines distance $d_{local}$, based on the previously discussed feasibility and optimality constraints. Also, $d_{local} \leq d_L$. FIG. 11 provides an example excerpt 1100 of a series of cues 1110 derived for a guided rEBUS procedure.

Final guidance route $r_f$ residing in FRC-based virtual space is now derived. To do this, 3D transformation T is applied to map all view sites constituting $r_p$ from (16) into the space delineated by $I_{FRC}$. It is important to ensure all transformed view sites are forced to be within the confines of the transformed FRC-based segmented airway tree and surfaces. This is accomplished by moving mapped view sites slightly such that they stay within the airway tree's endoluminal surface. Lastly, all mapped view sites including the destination site abides by the feasibility and optimality constraints observed by $r_p$. Because these constraints may make it overly difficult to find a route sufficiently close to ROI r, a secondary option for $r_f$ that relaxes these constraints can also be derived. Overall, this gives $$r_f = \{\hat{b}_1, \hat{b}_2, \ldots, \hat{b}_j, \ldots, \hat{b}_{b-1}, \hat{b}_b, \hat{s}\} \quad (17)$$

$$= \{\hat{v}_1, \ldots, \hat{v}_{1,\omega 1}, \hat{v}_{2,2}, \ldots, \hat{v}_{2,\omega 2}, \hat{v}_{3,2}, \ldots, \hat{v}_{3,\omega 3}, \ldots, \quad (18)$$

$$\underbrace{\hat{v}_{b,1}, \hat{v}_{b,2}, \ldots, \hat{v}_{b,\omega_b}}_{\hat{b}_b}, \underbrace{\hat{v}_{b+1,2}, \ldots, \hat{v}_D}_{\hat{s}}\}.$$

where branches $\hat{b}$ and view sites $\hat{v}$ are situated in FRC-based virtual space. Note that the view sites $v$ and $\hat{v}$ constituting $r_p$ and $r_f$ respectively, all differ in general as they reside in different spaces. Also, comparing (16) and (18), the number of complete airway branches N constituting $r_p$ differs in general from the number of complete branches b constituting $r_f$. In particular, $b \leq N$. This is exemplified by FIG. 4. This situation arises because smaller terminal airways may become closed or excessively narrowed when the lungs are at FRC—these airways, however, still exist in the physical lungs at FRC. Notably, $v_L$ of $r_p$ can be the endpoint of a branch $b_j$ in (14) visited before branch $b_N$; i.e., $v_L \notin b_N$ as suggested by (16), but instead is an element of $b_j$, $j < N$.

Elaborating on the observations above, because the intrinsic hierarchy of the airway tree's branching structure is maintained whether the lungs are at TLC or FRC, the following branch correspondences between $r_p$ and $r_f$ exist:

$$\begin{aligned} b_1 &\to \hat{b}_1 \\ b_2 &\to \hat{b}_2 \\ \vdots &\to \vdots \\ b_b &\to \hat{b}_b \end{aligned} \quad (19)$$

Also, per (19), TLC-to-FRC correspondences exist between all view sites constituting the first b branches of the two routes, i.e., $$v_{a,\omega_2} \to \hat{v}_{a,\omega_j} \quad (20)$$

for all view-site indices a arising for a particular branch pair $(b_j, \hat{b}_j)$, $j = 1, \ldots, b$.

In addition, a special correspondence between the location of localization site $v_L \in r_p$ and the corresponding view site in $r_f$ is noted; i.e., $$v_L \to \hat{v}_{c,\omega_c} \equiv \hat{v}_L \quad (21)$$

for some branch $\hat{b}_c \in r_f$, $c \leq b$, having branch endpoint $\hat{v}_{c,\omega_c}$. Correspondence (21) is pivotal during later live guidance, as it signals when to switch guidance from $r_p$ to the final guidance route $r_f$. Notably, $r_f$ does not employ a localization view site $v_L$ per se as required by $r_p$.

Figure 12A:
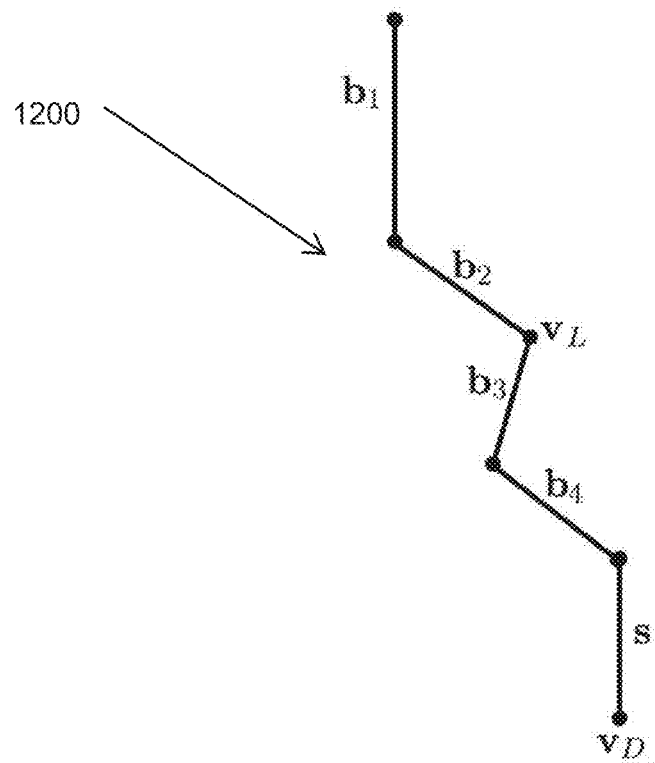
FIG. 12A is a schematic of a primary guidance route according to one or more aspects shown and described herein.
Figure 12B:
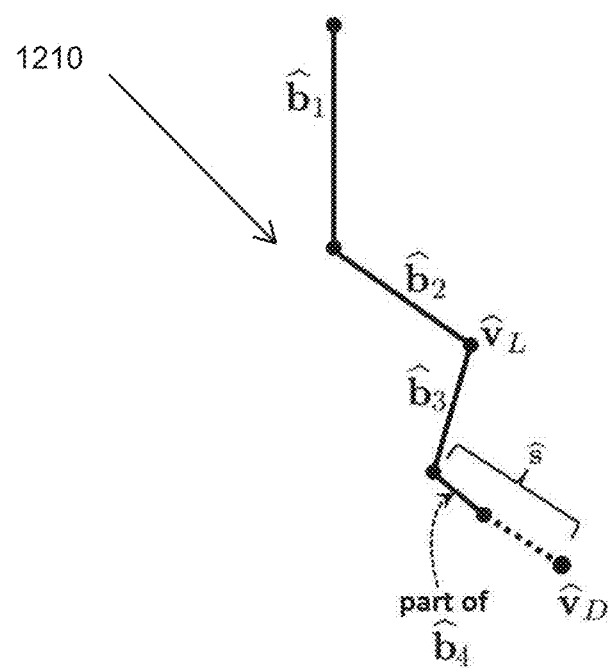
FIG. 12B is a schematic of a final guidance route according to one or more aspects shown and described herein.

FIGS. 12A and 12B schematically compare the structures of $r_p$ and $r_f$. Stated another way, FIGS. 12A and 12B schematically compare the possible routes $r_p$ and $r_f$. FIG. 12A represents an example primary guidance route $r_p$ 1200 while FIG. 12B represents an example final guidance route $r_f$ 1210. In the depicted example, TLC-based branches $b_1$, $b_2$, and $b_3$ correspond to FRC-based branches $\hat{b}_1$, $\hat{b}_2$, and $\hat{b}_3$, respectively, per (19), while poses $v_L$ and $\hat{v}_L$ correspond to the branch endpoints of the second branches of each route. Lastly, destination poses $v_D$ and $\hat{v}_D$ are at different locations in general.

Per FIGS. 12A and 12B and the discussion herein, route $r_f$ will in general omit a concluding part of route $r_p$ but have a view site (and corresponding branch) corresponding to $v_L$ per (21). Also, the final destination $v_D$ for $r_f$, will differ as a rule from the TLC-based $v_D$. Related to this point, route $r_f$ will generally be shorter than $r_p$ and terminate at a final destination further from the ROI than $r_p$. Note again, however, that the airway branches of $r_p$ that are not members of $r_f$ still exist in the real airway tree.

As a final planning operation, guidance cues for the navigation and confirmation/localization phases are derived for $r_f$, as completed earlier for $r_p$.

Notably, the CT scan and planning data used for FRC-based virtual space is the TLC-to-FRC transformed version of $I_{TL}C$, not $I_{FRC}$. As FIGS. 3A-3C show, the TLC CT scan gives the most extensive airway tree, with the TLC CT scan mapped to FRC space giving a more extensive tree than the raw input FRC-based CT scan. In terms of lung ventilation level, the TLC-to-FRC transformed CT scan and the raw FRC CT scan are mapped to the same 3D FRC-based space, yet the TLC-to-FRC is able to show more airway tree structure, which can prove to be very useful during live guidance—hence, the planning/guidance operations are based on this scan. As discussed herein, the raw FRC scan is also available during guided bronchoscopy for reference.

Picking up from the discussion of FIGS. 12A and 12B, note that as the lung state changes from TLC to FRC, certain airway branches further from $v_D$ than branch $b_N \in r_p$ in (16) could become excessively compressed or blocked, including those before the $b^{th}$ branch constituting final guidance route $r_f$ in (18). In fact, phenomena such as mucus or atelectasis could also make this happen at the time of the live procedure regardless of the chest's state. Hence, in such circumstances, (19) will not hold up to branch index b and $r_f$ as given by (18) will not be feasible. This could halt guidance well before reaching the destination. A solution for circumventing this situation would be to call for a real-time change during the procedure in the airway guidance route before reaching localization site $v_L \in b_N$ of $r_p$. This requires more available alternative routes reaching ROI R than just route $r_f$.

Figure 13:
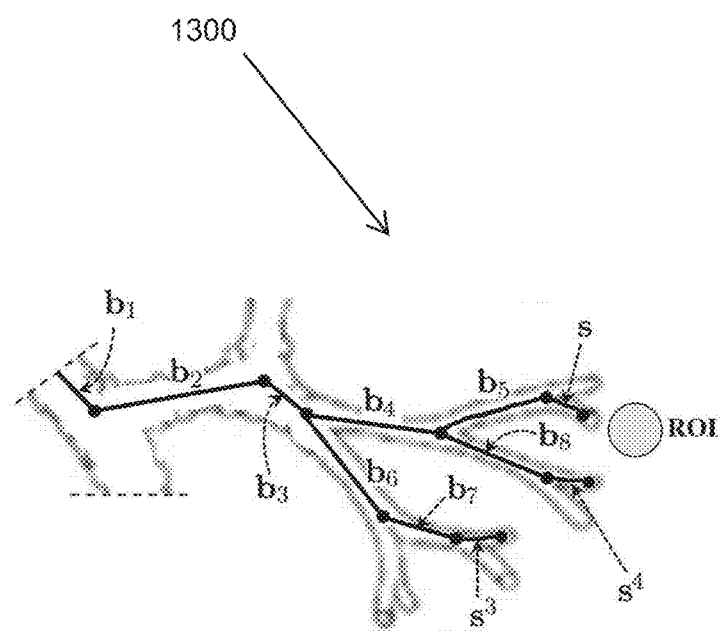
FIG. 13 is a schematic of one or more predetermined back-up routes according to one or more aspects shown and described herein.

In various instances, or alternative methods, this flexibility is provided by incorporating the concept of back-up guidance routes. A series of up to $n \leq N$ back-up guidance routes $r^n$, $n=1, \ldots N$, residing in TLC space of the form $$r^n = \underbrace{\{b_1, \ldots, b_n, \underbrace{b'_{n+1}, \ldots, b'_d, s'\}}_{\text{new portion}}} \tag{22}$$

$$= \begin{Bmatrix} v_1, \ldots, v_{n,\omega_n}, v'_{n+1,2}, \ldots, v^n_L, \ldots, \\ v'_{d,\omega_d}, v'_{d+1,2}, \ldots, v^n_D \end{Bmatrix} \tag{23}$$

$$= \begin{Bmatrix} v_1, \ldots, \underbrace{v'_{n+1,1}, v'_{n+1,2}, \ldots, v^n_L, \ldots, v'_{d,\omega_d}}_{\text{new branches}}, \\ \underbrace{v'_{d+1,2}, \ldots, v^n_D}_{s'} \end{Bmatrix}.$$

including the first n branches of primary guidance route $r_p$ of (14) along with new branches $b'_{n+1}$ through $b'_d$ in B, new localization site $v_L^n$, new destination site $v_D^n$, and new segment s'. The value of d can differ for each back up guidance route. FIG. 13 depicts a schematic 1300 of exemplary back-up guidance routes. For the pictured ROI and nearby airway tree section, derived primary guidance route $r_p$ and back-up routes, $r^3$ and $r^4$, are depicted. Following (22), branches $b_6$ and $b_7$ of back-up route $r^3$ correspond to branches $b'_4$ and $b'_d$, respectively, while branch $b_8$ of back-up route $r^4$ corresponds to branch $b'_d$. Also, the segments $s^3$ and $s^4$ correspond to segment s' for back-up routes $r^3$ and $r^4$, respectively.

Relation (17) for $r_p$, however, indicates that only back-up routes up to branch index $n=b$, $b \leq N$, at most will be needed; i.e., only back-up routes $r^n$, $n=1, \ldots b$, need actually be computed. These routes are computed via the same optimization process used to derive $r_p$ with the added constraint that the $(n+1)^{th}$ branch $b'_{n+1}$ constituting $r^n$ cannot equal $b_{n+1} \in r_p$.

Next, each back-up route $r^n$ requires an associated final back-up route $r_f^n$ in FRC-based virtual space, similar to how primary guidance route $r_p$ has an associated FRC-based final guidance route $r_f$ per (17-18). The final back-up routes are again computed as before, with final back-up route $r_f^n$ taking the form $$r_f^n = \{\hat{b}_1, \ldots, \hat{b}_{c-1}, \hat{b}_c, \hat{s}\} \tag{24}$$

$$= \{\hat{v}_1, \ldots, \underbrace{\hat{v}'_{e,1}, \ldots, \hat{v}'_{e,\omega_a}}_{\hat{b}'_n}, \underbrace{v'_{e+1,2}, \ldots, v_D}_{s'}, ,$$

where once again branches $\hat{b}$ and view sites $\hat{v}$ are situated in FRC-based virtual space. Also, the number of complete airway branches d constituting back-up route $r^n$ differs in general from the number of complete branches e constituting $r_f^n$; i.e., $e \leq d$. In addition, a special correspondence between the location of localization site $v_L^n \in r^n$ and a corresponding view site in $r_f^n$ exists; i.e., $$v_L^n \to \hat{v}_{f,\omega_f} \tag{25}$$

for some branch $\hat{b}_f \in r_f^n$, $f \leq e$, having branch endpoint $\hat{v}_{f,\omega_f}$. Correspondence (25) is again pivotal during later live guidance, as it suggests when to switch from back-up route $r^n$ to FRC-based route $r_f^n$. If a view site $\hat{v}_{f,\omega_f}$ satisfying (25) cannot be found, the final back-up guidance route $r_f^n$ cannot be defined. This in turn implies that back-up route $r^n$ does not admit a feasible path to ROI R in FRC-based space. Hence, $r^n$ is eliminated from the set of back-up routes retained for later guided bronchoscopy and no back-up option will exist for the $n^{th}$ branch along primary guidance route $r_p$. Conversely, additional back-up guidance routes arising at a bifurcation $\bar{n} > n$ for a given back-up route $r^n$ can also be derived. However, few such additional back-up routes are likely feasible, given the finite branching complexity of the airway tree.

As another consideration, it is possible that for some $n_1$ in the range $1 \leq n_1 \leq b$, no candidate back-up route $r^{n-1}$ satisfies the constraints required by the optimization process; e.g., any existing child branch of $b_{n_1-1} \in r_p$ that is not equal to $b_{n_1} \in r_p$ ends in a "dead end" not leading to ROI R. Such situations also reduce the total number of back-up routes available for later bronchoscopy.

Analogous to (19) and (21), correspondence between branches for back-up route $r^n$ and associated final back-up route $r_f^n$ exist as follows:

$$\begin{aligned} b_1 &\to \hat{b}_1 \\ \vdots &\to \vdots \\ b_e &\to \hat{b}_e \end{aligned} \tag{26}$$

Also, TLC-to-FRC correspondences exist between all view sites constituting the first e branches of the two routes; i.e., $$v_{\alpha,\omega_j} \to \hat{v}_{\alpha,\omega_j} \tag{27}$$

for all view-site indices $\alpha$ arising for a particular branch pair $(b_j, \hat{b}_j)$, $j=1, \ldots e$.

Notably, the one-to-one TLC-to-FRC correspondences as specified by (19-21) and/or (26-27), which exploit the invariant 3D topology and hierarchy of the airway tree, are a major part of the procedure plan.

Lastly, as done earlier for $r_p$ and $r_f$, guidance cues are derived and associated with each back-up guidance route and final back-up guidance route. In addition, supplemental guidance cues are created to help signal the need for switching to a back-up guidance route at any bifurcation where a route $r''$ is available. This can be signaled by the general instruction: "Alternate route is available at this juncture." Alternatively, if the system determined earlier during preplanning that the FRC-based shape of the airways will become excessively narrow during the live procedure, the following instruction can be issued: "Next airway on route is predicted to be too narrow; alternate route suggested." Additional cues can also be produced to point out the distance that a destination pose is from ROI R, such as: "Guidance route can only get within 33 mm of the ROI."

After deriving the procedure plan, the method continues by a performance of a live guided bronchoscopy. Such a guided bronchoscopy can now take place in an operating room using the assisted bronchoscopy system's guidance computer. Initial set-up in the operating, or other suitable procedure, room includes the following steps.

Firstly, the procedure plan is loaded into the guidance computer, including all CT scan data, anatomical chest model data, preplanned routes, and associated guidance cues. The bronchoscope hardware is then interfaced to the system. In particular, bronchoscope video outputs, including video from supplemental devices (e.g., rEBUS) are interfaced with the system. The guidance computer's display is then initialized for ROI R. Such initialization includes at least (1) a 3D surface rendering of the airway tree, airway centerlines, active guidance route, and ROI R; (2) an endoluminal VB view, with airway centerlines, active guidance route, and ROI R; (3) live bronchoscope video stream views; and/or (4) a display for text-based guidance cues and distance measurements.

FIGS. 14A-14D depict examples of the basic elements of the guidance computer's display for assisted bronchoscopy. FIG. 14A depicts a 3D surface rendering 1410 of an airway tree 1412 of the subject with centerlines 1414, an active guidance route 1416, and an ROI 1418. FIG. 14B depicts an integrated viewer 1420 depicting a live bronchoscopic video 1422, a VB view 1424 for the guidance system's current view site depicting the guidance route and ROI, a remaining distance 1426 to navigate toward the ROI, and a guidance cue 1428. FIG. 14C depicts a 2D axial-plane CT section 1430, and FIG. 14D depicts a coronal slab rendering 1440. All views are synchronized to the current guidance system's current view site along the guidance route. For FIGS. 14C and 14D, the view side is indicated by cross hairs 1435, 1445, respectively.

In various instances, the display can additionally and/or alternatively include other 2D or 3D graphical visualization tools, adapted from previously developed multimodal assisted bronchoscopy systems, such as 2D PET/CT section viewers (axial, coronal, sagittal orientations), sliding thin-slab visualizations, tube viewer, airway plot tool, 2D CT-based projection tools, and/or video analysis tools.

After system initialization, the clinician now performs the guided bronchoscopy procedure, with a goal of maneuvering the bronchoscope to a final destination pose sufficiently close to R. When the pose is reached, the clinician can perform a desired examination.

To begin, the clinician inserts the bronchoscope to a reference point, typically near the main carina. Next, the system's active guidance route is initialized to the preplanned primary guidance route $r_p$. The guidance system then initializes the scope insertion depth to $d_{ID}=0$. It also initializes the remaining distance to the ROI $d_{ROI}$, based on route $r_p$.

During the guided procedure, either the clinician or robot (under clinician control) maneuvers the bronchoscope through the airways, based on the cues and graphical views provided by the guidance computer.

With the system and clinician synchronized at the initial reference point, live guidance toward ROI R now follows a three-stage protocol including: (1) navigating toward the ROI; (2) optionally switching to a back-up guidance route; and (3) finally confirming and/or localizing the ROI.

Navigation toward the ROI is guided by the principle that the guidance system's CT-based virtual space position and the bronchoscope's location in the chest should correspond to approximately the same physical 3D chest position at all times during the live procedure per (9). During navigation, the clinician and/or robot maneuvers the bronchoscope through the larger airways suggested by the active guidance route. The system provides guidance by the cues suggested at each juncture along the route and by the displayed visual views. In particular, the clinician can execute the suggested cues, such as "Move Up," "Rotate Clockwise," etc., in an attempt to position the bronchoscope at the same apparent position shown currently by the VB viewer. In addition, periodic precise registrations between the bronchoscope and guidance system virtual bronchoscope can be performed.

During navigation all display views can stay synchronized to the current view site and/or are constantly, or otherwise routinely, updated, with progress along the route noted on the 3D surface viewer. Also, the scope insertion depth $d_{ID}$ and distance to ROI $d_{ROI}$ can give continuous, or otherwise routine, updates on progress of the procedure. The clinician can monitor all system information to note progress. Notably, linked TLC-space and FRC-space versions of all graphical viewers can be available by either toggling the guidance space (TLC or FRC) or a particular viewer, with all active plan information given in the current active space.

FIGS. 15-17D illustrate an example of this capability. A system, which integrates the methodologies described herein can be interfaced to an image-guided or robotics-assisted endoscopy system. The guidance system includes graphical tools that aide in deciding when to switch guidance routes as needed, signal an expected feasibility of moving forward on an active guidance route, and/or offer flexibility in visualizing the changing state of the airways during a live procedure.

In addition, system can also features the capability of switching between viewing graphical information in three synchronized spaces: 1) TLC-based graphical information, which embodies the ideal and most complete information on the airway tree anatomy; 2) TLC-to-FRC-based graphical information, which depicts the local airway tree anatomy in a way that is closer to the reality at the time of the live procedure; and/or 3) FRC-based graphical information, which depicts the original FRC-based CT data. For this purpose, graphical and software-control tools are available to enable simultaneous augmented reality viewing in these various 3D spaces.

Figure 15:
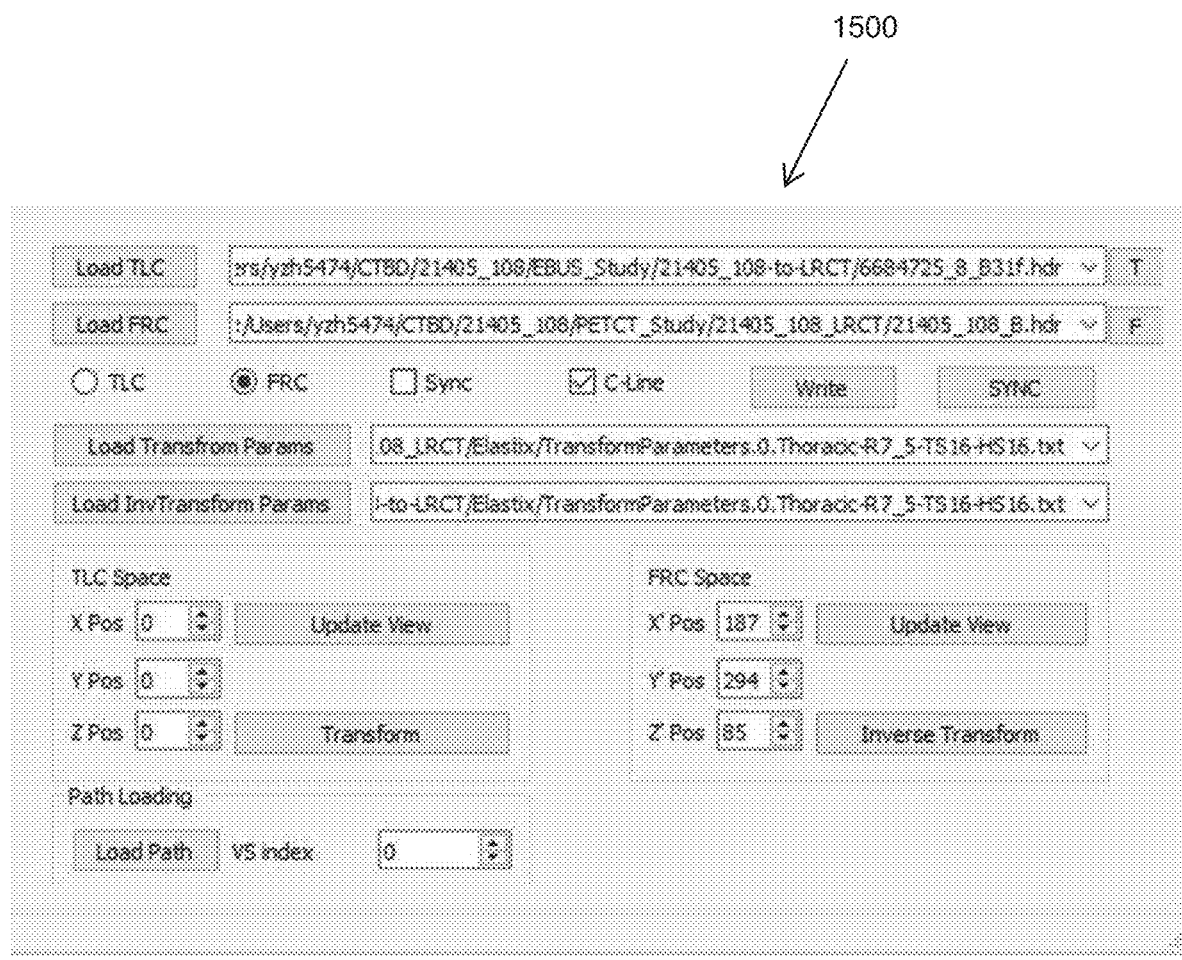
FIG. 15 is a schematic representing a volume management tool configured to coordinate synchronized views between TLC-space and FRC-space views according to one or more aspects shown and described herein.
Figure 16A:
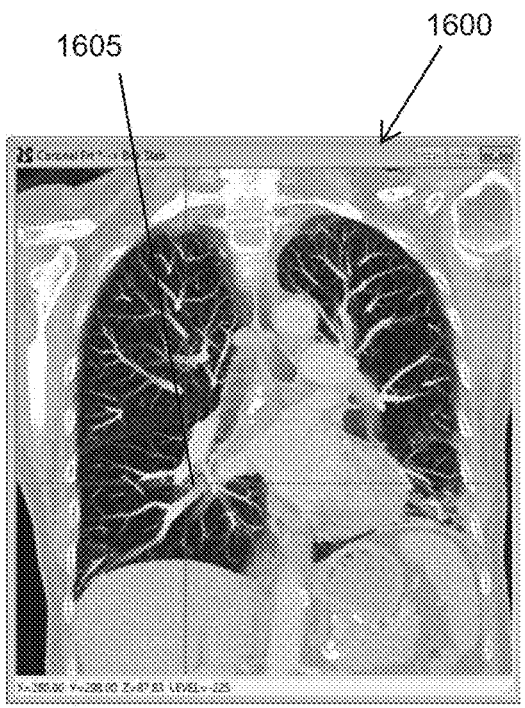
FIG. 16A is a coronal depth-weighted slab view of a chest cavity in TLC space according to one or more aspects shown and described herein.
Figure 16B:
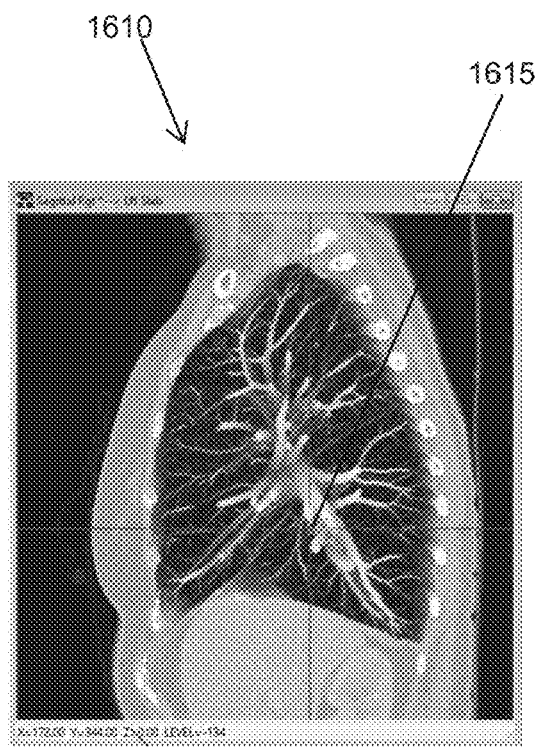
FIG. 16B is a sagittal slab view of the chest cavity in the TLC space of FIG. 16A according to one or more aspects shown and described herein.
Figure 16C:
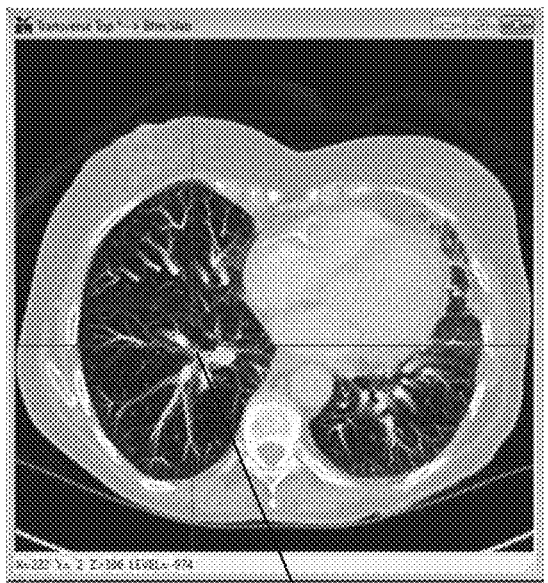
FIG. 16C is a transverse slab view of the chest cavity in the TLC space of FIG. 16A according to one or more aspects shown and described herein.
Figure 16D:
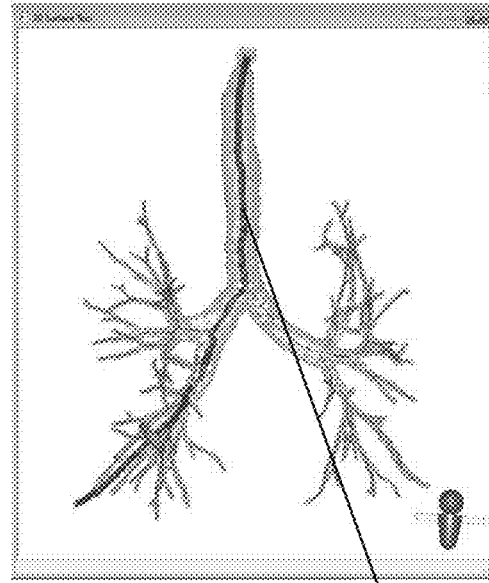
FIG. 16D is a 3D surface rendered airway tree with a path extending therethrough in the TLC space of FIG. 16A according to one or more aspects shown and described herein.

More specifically, FIG. 15 depicts a screen shot 1500 of a volume management tool of the system. The volume management tool is configured to coordinate synchronized views between the TLC-space and FRC-space views of FIGS. 16A-17D. FIGS. 16A-16D depict an example of live linkage of TLC-space and FRC-space views. The views draw on a high-resolution chest CT scan having dimensions 512×512×647, with voxel resolutions $\Delta x=\Delta y=0.6$ mm and Δz=0.5 mm. All views shown in FIGS. 16A-16D are in TLC space and synchronized to a view site at location (x, y, z)=(172, 298, 386) of path 14 which terminates in the right lower lobe of the subject lung. More specifically, FIG. 16A depicts a coronal depth-weighted slab view 1600 with cross hairs 1605 indicating the current view site. FIG. 16B depicts a sagittal depth-weighted slab view 1610 with cross hairs 1615 indicating the current view site. FIG. 16C depicts a transverse depth-weighted slab view 1620 with cross hairs 1625 indicating the current view site. FIG. 16D depicts a 3D surface rendered airway tree 1630 with a highlighted desired path 1635.

Figure 17A:
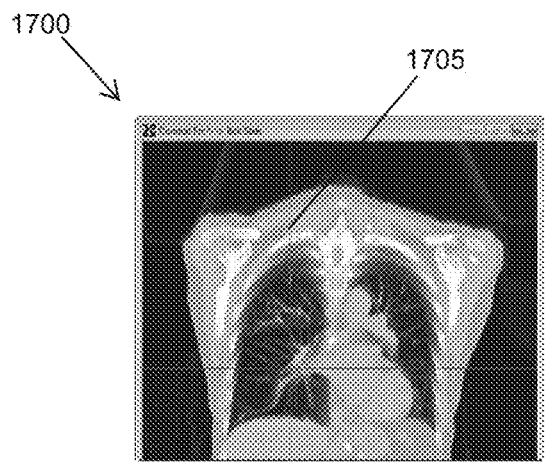
FIG. 17A is a coronal depth-weighted slab view of a chest cavity in FRC space according to one or more aspects shown and described herein.
Figure 17B:
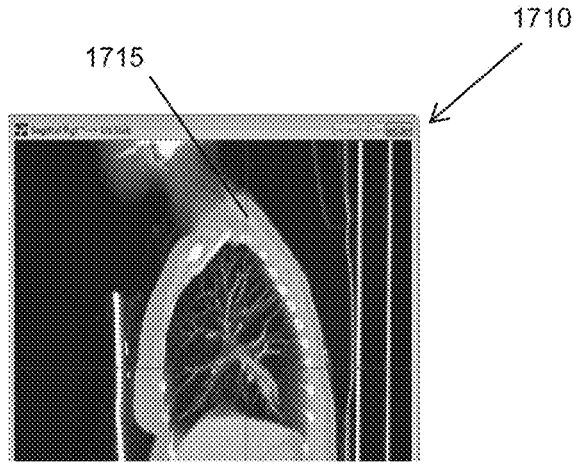
FIG. 17B is a sagittal slab view of the chest cavity in the FRC space of FIG. 17A according to one or more aspects shown and described herein.
Figure 17C:
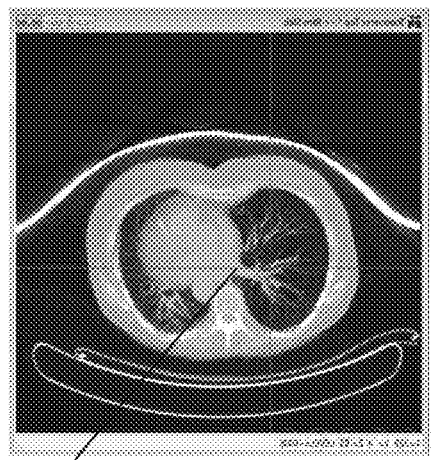
FIG. 17C is a transverse slab view of the chest cavity in the FRC space of FIG. 17A according to one or more aspects shown and described herein.
Figure 17D:
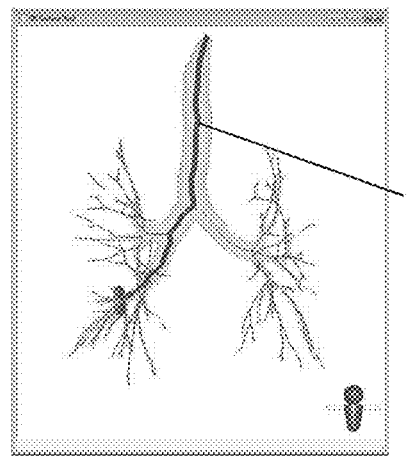
FIG. 17D is a 3D surface rendered airway tree depicting a version of the TLC-space path of FIG. 16D mapped into the FRC space of FIG. 17A according to one or more aspects shown and described herein.

FIGS. 17A-17D depict an example of live linkage of TLC-space and FRC-space views. All views shown in FIGS. 17A-17D are in FRC space and synchronized to the view site shown in FIGS. 16A-16D. The views draw on a whole-body free-breathing CT scan, taken as part of a PET/CT study, having dimensions 512×512×279, with voxel resolutions Δx=Δy=0.88 mm and Δz=3.0 mm. More specifically, FIG. 17A depicts a coronal depth-weighted slab view 1700 with cross hairs 1705 indicating the current view site. FIG. 17B depicts a sagittal depth-weighted slab view 1710 with cross hairs 1715 indicating the current view site. FIG. 17C depicts a transverse depth-weighted slab view 1720 with cross hairs 1725 indicating the current view site. FIG. 17D depicts a 3D surface rendered airway tree 1730, depicting a version of TLC-space path 14 1735 mapped into FRC space.

FIGS. 16A-17D arise out of a subject study that included a high resolution breath-hold chest CT scan and a whole-body PET/CT study, where the PET/CT study supplies a lower-resolution free-breathing whole-body CT scan. For the example, an airway path was derived, as shown in FIG. 16D, that travels from the trachea to the terminus of a right lower lobe airway using the TLC-space chest CT scan. The path was mapped into FRC space, using the FRC-space whole-body CT scan as shown in FIG. 17D. To do this mapping, scope and airway diameter dimensions were disregarded; i.e., every view site of the TLC path was mapped into FRC space.

Referring back to FIG. 15, the depicted Volume Management Tool facilitates and manages the mapping and synchronization of all image data and path/route information between the TLC and FRC spaces. The tool illustrates how one can focus on TLC or FRC space, per the radio buttons, while the sync button enables synchronization of both spaces. In the example, the selected view site in TLC space at location (x, y, z)=(172,298,386) (FIGS. 16A-16D) maps to a corresponding view site in FRC space at location (x, y, z)=(187,294,85). Through the use of this volume synchronization and visualization feature, the clinician can notice how the airways and local anatomy change in shape between the initial TLC-planned procedure and the current free-breathing FRC live situation.

As navigation progresses from one airway branch to the next—i.e., without loss of generality, from airway branch $b_{n-1}$ to airway branch $b_n$—the system can optionally supply an alert for a possible alternate back-up route $r''$, if available, to the ROI. As part of these alerts, the system may warn that an upcoming airway on the active guidance route is likely to be too narrow for bronchoscope passage and that it is advisable to switch navigation to back-up route $r''$. Alternatively, the system may merely indicate that an alternate route exists.

The clinician is free to continue on the currently active guidance route or switch to a back-up route at any time. In various instances, the clinician may note that an upcoming airway $b_{n+1}$ shown by the guidance display in reality appears to be blocked or narrowed in the live bronchoscopy video feed—for this situation, the clinician can switch the active guidance route to the available back-up route $r''$, regardless of the guidance system's recommendation. All system display components can adjust to this change in route. In such instances, $d_{ID}$ remains unchanged, but $d_{ROI}$ updates based on $r''$. Navigation then proceeds as before.

When the guidance system reaches the active guidance route's localization pose $v_L$, usually 2 to 4 cm from the final destination and typically well into the periphery of the airway tree, the stage of the procedure is reached, whereby the impact of CTBD can become substantial. To help mitigate this issue, the system now switches the active guidance route to the complementary final guidance route situated in FRC-based virtual space. The final guidance route can be $r_f$ or $r_f''$ depending on if the active guidance route is $r_p$ or a back-up route $r''$, respectively.

Upon making all system display components and distance $d_{ROI}$ become updated within FRC-based space. The switch to FRC-based space will give a truer picture of the expected anatomy during tidal breathing and will provide a more accurate path to the target ROI.

Typically, upon transitioning to this stage, some remaining navigation is required, where $d_{ROI} > d_{local}$. The remaining navigation operations proceed as in the navigation stage. At last, the final cues, geared toward maneuvering the bronchoscope to its final position and then toward deploying the supplemental device are issued (bronchoscope≤$d_{local}$ mm from the ROI). These cues enable the clinician and/or robot to localize the endoscope at the final destination pose $v_D$ near the ROI, until the 3D positions of the virtual bronchoscope and real bronchoscope are synchronized near the optimal pose for examining the ROI. Also, at any time during final confirmation/localization, the reference TLC-based virtual space data is available and synchronized to whichever route is currently the active guidance route. Such information could be useful for example for visualizing an airway that is unexpectedly open or for noting a bronchus sign near the ROI.

Notably, it could be advantageous to navigate with certain displays in TLC space, such as the VB viewer and 3D Airway Tree Renderer. The airway tree's intrinsic geometry remains unchanged regardless of the breathing state and that the airway tree is known to be torsionally rigid. Thus, as the real and virtual bronchoscopes move through their respective spaces with consistent roll angles and intra-branch rotations, then the relative airway bifurcations (and their orientations) observed by the two bronchoscopes will be the same, even though their shapes and sizes can differ somewhat. By this idea, navigation with the "ideal" information could help during the live procedure.

Additionally, supplemental viewers geared toward confirmation/localization supply useful guidance information for confirming an ROI and for deploying a supplemental device, such as an rEBUS probe. For example, FIGS. 18A-18F illustrate several concepts relevant to confirmation and/or localization including: a) a local peripheral renderer that depicts the bronchoscope tip and rEBUS scan plane in relation to the ROI; b) a CT-based simulated rEBUS view at the final destination; and c) a depth-of-sample view of the ROI in the VB view indicating the quality of the viewing location for the ROI to highlight the maximum ROI viewing location. FIGS. 18A-18F also illustrate All views depicted in FIGS. 18A-18F are synchronized at a final destination. Generally, FIGS. 18A-18F illustrate a final "Push probe and sweep" cue at this optimal pose. The location of the real rEBUS probe is clearly synchronized to a virtual rEBUS probe at the proper airway site—leading to an immediate correct confirmation of the ROI with the real rEBUS probe. Such supplemental viewers could obviate the need for local cone beam CT scanning (and the extra radiation such a scan requires), as they conceivably provide the same information and also help guide placement of the rEBUS probe. This completes the procedure.

Figure 18A:
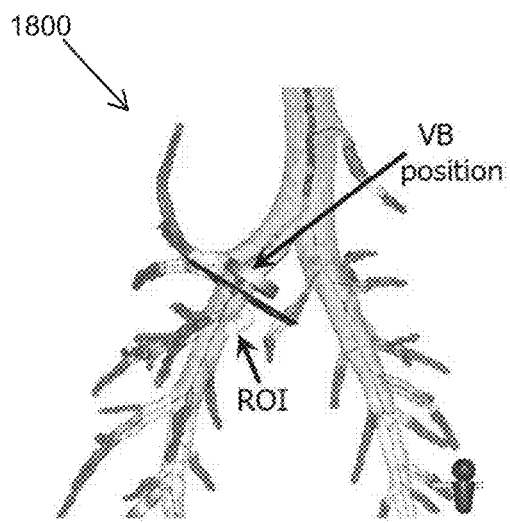
FIG. 18A is a 3D airway tree rendering depicting a model of a bronchoscope tip to model if the bronchoscope tip is expected to fit along a desired route according to one or more aspects shown and described herein.
Figure 18B:
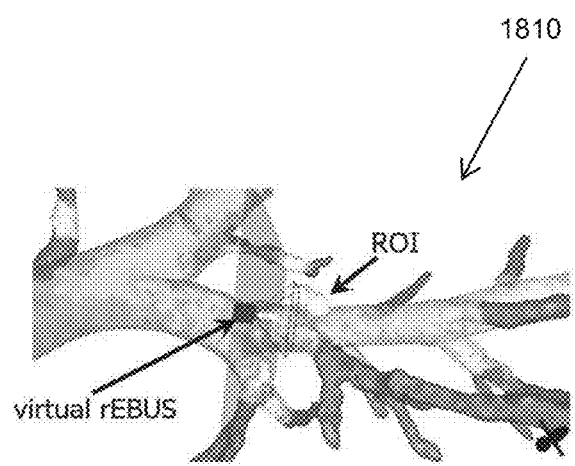
FIG. 18B is a local peripheral renderer depicting a rendering of the airway tree of FIG. 18A, bronchoscope-tip model, and a ROI at a final destination according to one or more aspects shown and described herein.
Figure 18C:
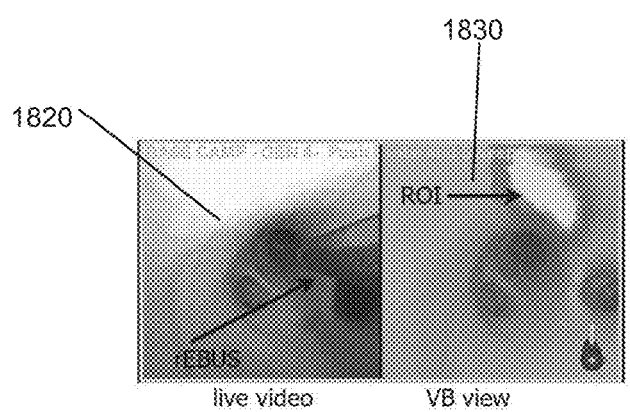
FIG. 18C is a live bronchoscope video with a guidance cue according to one or more aspects shown and described herein.
Figure 18D:
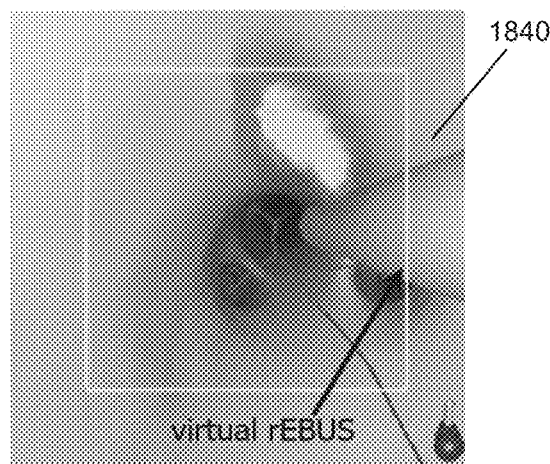
FIG. 18D is a panorama renderer depicting an expanded field-of-view VB view at the final destination of FIG. 18B according to one or more aspects shown and described herein.
Figure 18E:
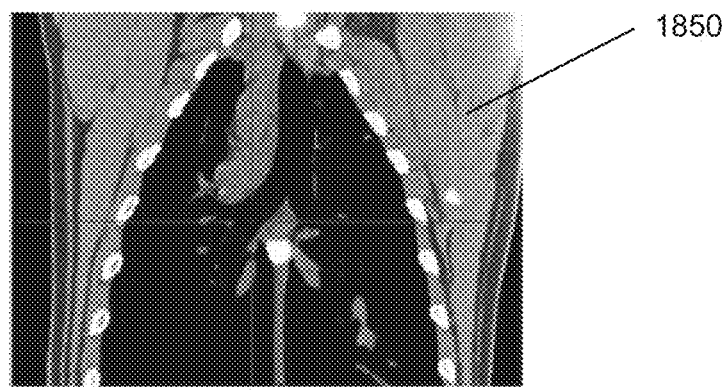
FIG. 18E is a 2D axial-plane CT section according to one or more aspects shown and described herein.
Figure 18F:
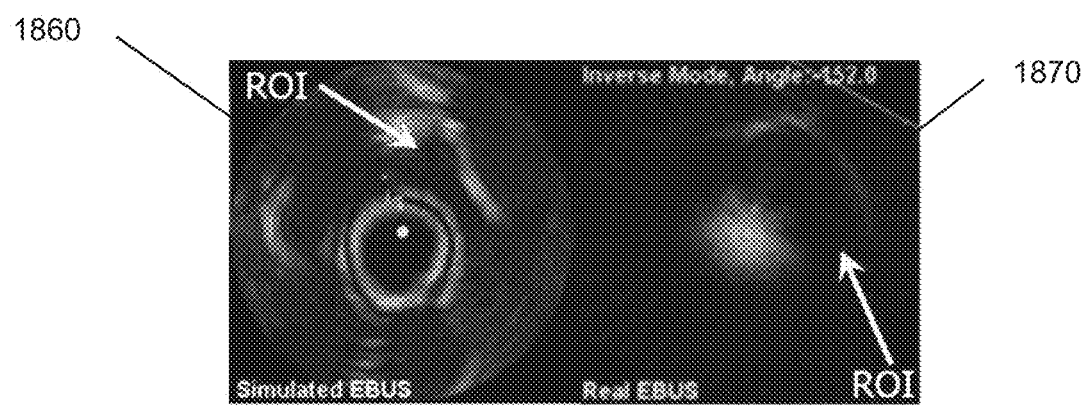
FIG. 18F is a CT-based simulated rEBUS view at the final destination of FIG. 18B and a live rEBUS view after engaging a probe according to one or more aspects shown and described herein.

More specifically, FIG. 18A depicts a 3D airway tree rendering 1800 depicting a model of the bronchoscope tip. The 3D airway tree can be color coded, or otherwise annotated, to reflect if the bronchoscope is able to fit within the airway. For example, green can indicate the bronchoscope will fit, yellow can indicate the bronchoscope will marginally fit, and/or red can indicate the airway is too narrow for the bronchoscope to fit, or otherwise pass through without damaging the airway, for example. FIG. 18B depicts a local peripheral renderer 1810 depicting a rendering of the airway tree, bronchoscope-tip model, and ROI at the final destination. The tip model also shows the rEBUS scan plane. FIG. 18C depicts a live bronchoscope video 1820 depicting real rEBUS probe tip and corresponding VB view 1830 at the final destination with guidance cue. FIG. 18D depicts a panorama renderer 1840 depicting an expanded field-of-view VB view at the final destination, with virtual rEBUS probe tip also shown. FIGS. 18C and 18D depict a depth-of-sample view of the ROI. FIG. 18E depicts a standard 2D axial-plane CT section 1850, and FIG. 18F depicts a CT-based simulated rEBUS view 1860 at the final destination and a live rEBUS view 1870 after engaging the probe.

FIGS. 19A-22B illustrate various concepts discussed herein and point out out the impact of CTBD during navigation. The example follows the navigation toward the periphery of the left upper lobe (LUL) for a human subject.

Figure 19A:
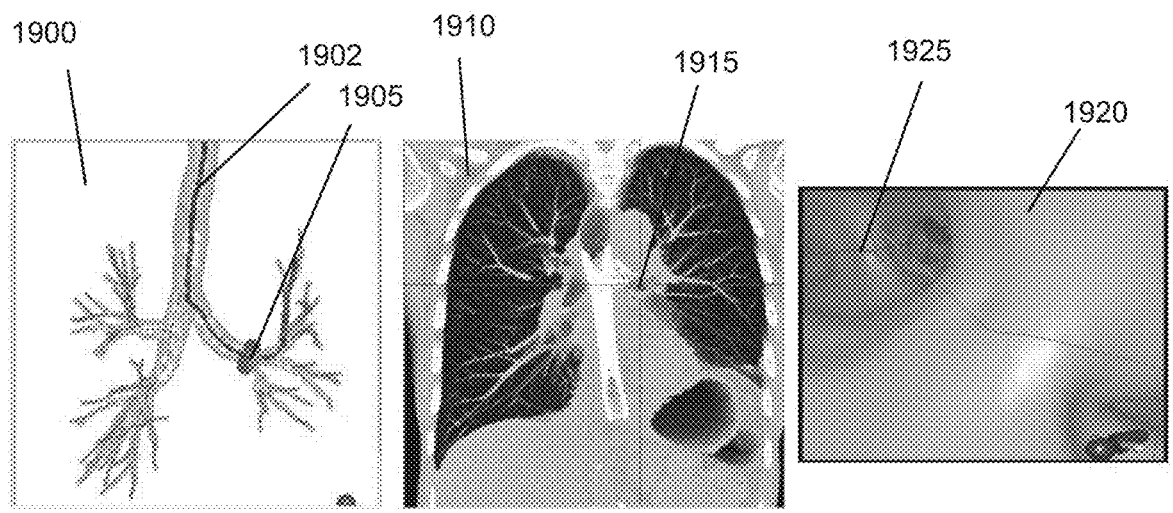
FIG. 19A is a 3D rendered airway tree highlighting an active guidance route and current view site, a coronal front-to-back CT slab rendering, and a VB view and guidance route in a TLC space according to one or more aspects shown and described herein.
Figure 19B:
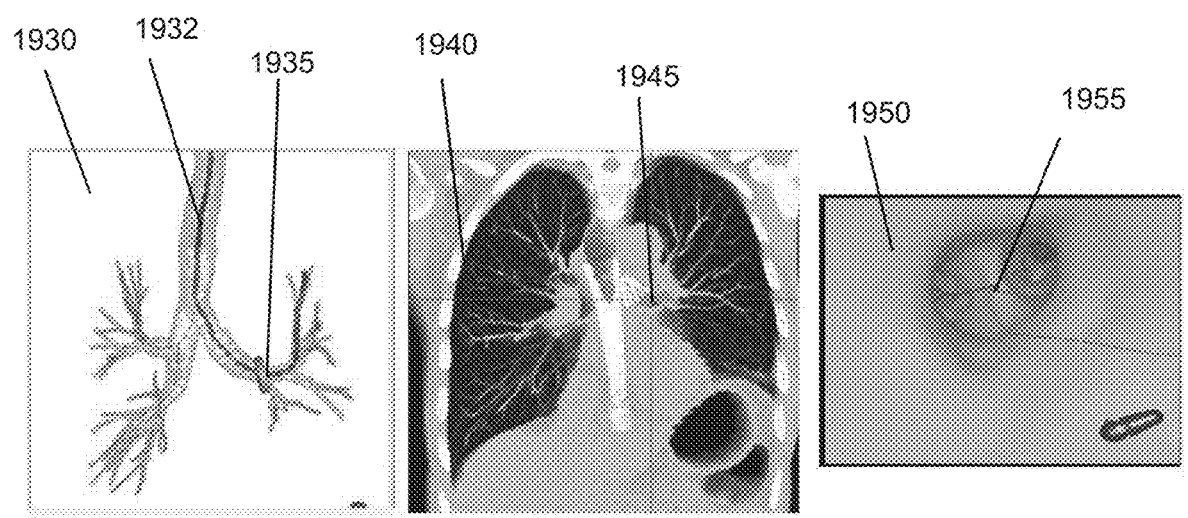
FIG. 19B is a 3D rendered airway tree highlighting an active guidance route and current view site, a coronal front-to-back CT slab rendering, and a VB view and guidance route in an FRC space according to one or more aspects shown and described herein.

FIGS. 19A and 19B show guidance system views that could be observed while navigating in TLC space or FRC space at the endpoint of the generation-2 branch (left main bronchus). While the VB views, for example, aren't identical, it is clear that both paths are essentially at the same physical location within the airway tree. The differences between the pose depicted in FIG. 19A and the pose depicted in FIG. 19B at this view site essentially entail a rotation difference and an indication that the upcoming child airways will be getting smaller in the FRC view more quickly than in the TLC view. More specifically, FIG. 19A depicts a result in TLC space. A 3D rendered airway tree 1900 highlights an active guidance route 1902 and current view site 1905. A coronal front-to-back CT slab rendering 1910 is also shown depicting the current view site by cross hairs 1915. A VB view 1920 depicts a guidance route 1925. FIG. 19B depicts a result in FRC space. Similarly to FIG. 19A, a 3D rendered airway tree 1930 highlights an active guidance route 1932 and current view site 1935 in FIG. 19B. Likewise, a coronal front-to-back CT slab rendering 1940 is shown depicting the current view site by cross hairs 1945 and a VB view 1950 depicts a guidance route 1955.

Figure 20A:
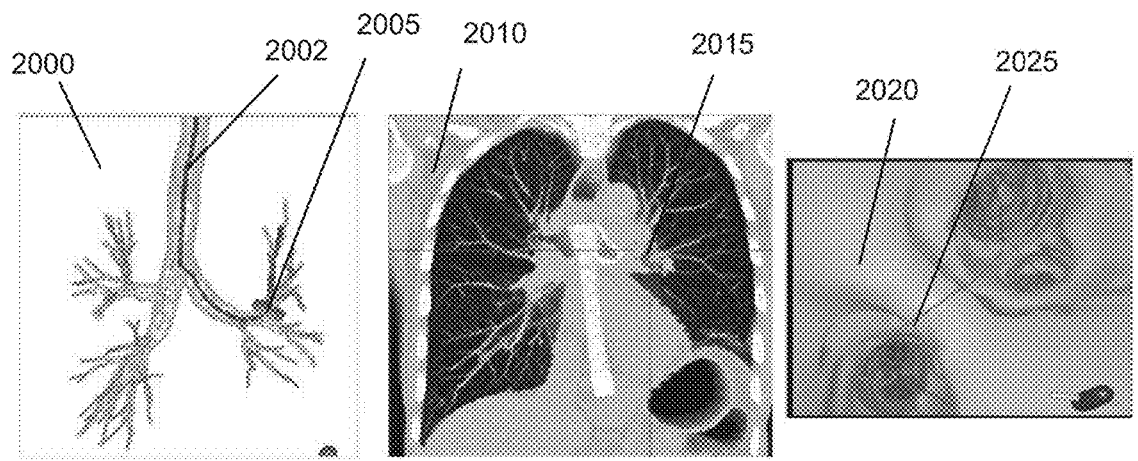
FIG. 20A is a 3D rendered airway tree highlighting an active guidance route and current view site, a coronal front-to-back CT slab rendering, and a VB view and guidance route in a TLC space according to one or more aspects shown and described herein.
Figure 20B:
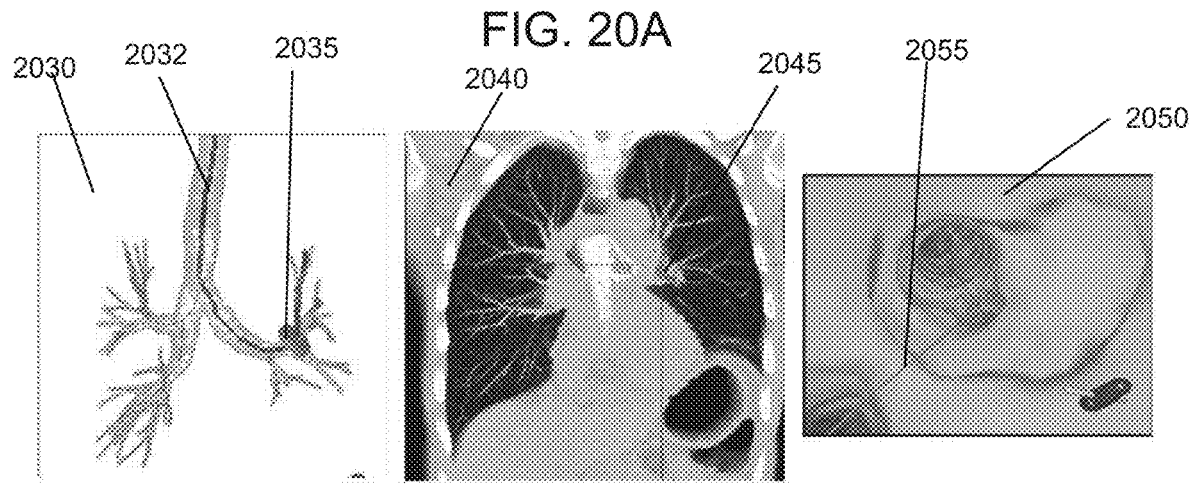
FIG. 20B is is a 3D rendered airway tree highlighting an active guidance route and current view site, a coronal front-to-back CT slab rendering, and a VB view and guidance route in an FRC space according to one or more aspects shown and described herein.

Similar to FIGS. 19A and 19B, the same observations can be observed at the endpoint of the generation-4 branch, as shown in FIGS. 20A and 20B. Making comparisons at the structurally/topologically same locations (the bifurcation point at the end of branch 4) in TLC and FRC reveals clear synchrony in the navigation. More specifically, FIG. 20A depicts a result in TLC space. A 3D rendered airway tree 2000 highlights an active guidance route 2002 and current view site 2005. A coronal front-to-back CT slab rendering 2010 is also shown depicting the current view site by cross hairs 2015. A VB view 2020 depicts a guidance route 2025. FIG. 20B depicts a result in FRC space. Similarly to FIG. 20A, a 3D rendered airway tree 2030 highlights an active guidance route 2032 and current view site 2035 in FIG. 20B. Likewise, a coronal front-to-back CT slab rendering 2040 is shown depicting the current view site by cross hairs 2045 and a VB view 2050 depicts a guidance route 2055.

FIGS. 21A-21D provide a more detailed view of this clear synchrony between the two spaces when reaching the end of the generation-6 branch. The 2D local horizontal CT cross-section views at these locations in TLC and FRC add reassurance that both routes are in synchrony. This location could also serve as an example of when the guidance can switch from navigation with the primary guidance route $r_p$ in TLC space to the final guidance route $r_f$ in FRC space; i.e., the end point signifies localization pose $\hat{v}_L \in r_p$, and, per (19), $b_1 \in r_p$ corresponds to $\hat{b}_1 \in r_f$, $b_2 \in r_p$ corresponds to $\hat{b}_2 \in r_f$, ..., $b_\theta \in r_p$ corresponds to $\hat{b}_\theta \in r_f$. FIGS. 21A-21D give confidences that the guidance system is still in the same airway when switching to FRC space for final confirmation/localization.

Figure 21A:
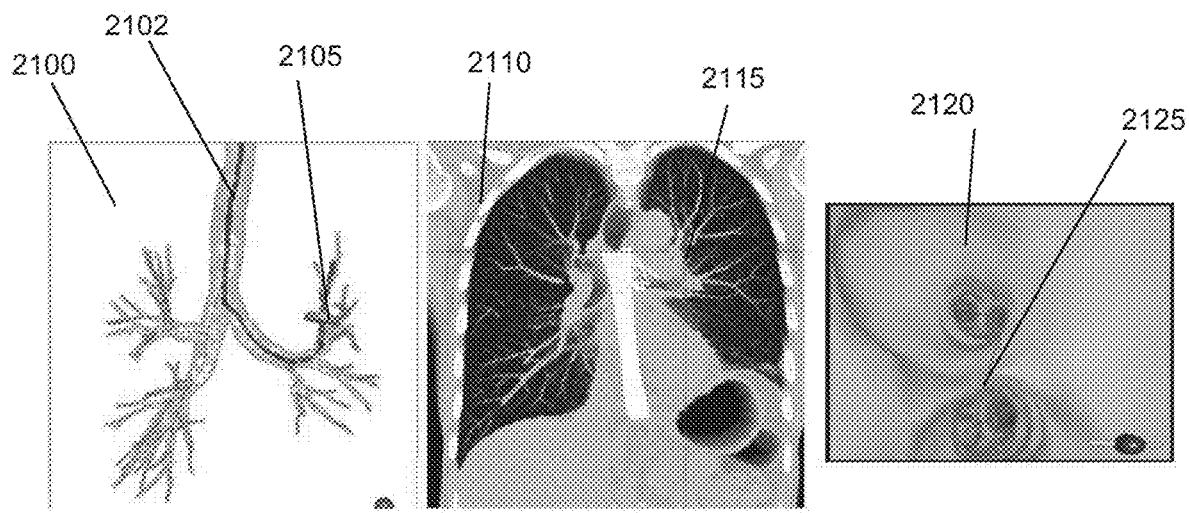
FIG. 21A is a 3D rendered airway tree highlighting an active guidance route and current view site, a coronal front-to-back CT slab rendering, and a VB view and guidance route in a TLC space according to one or more aspects shown and described herein.
Figure 21B:
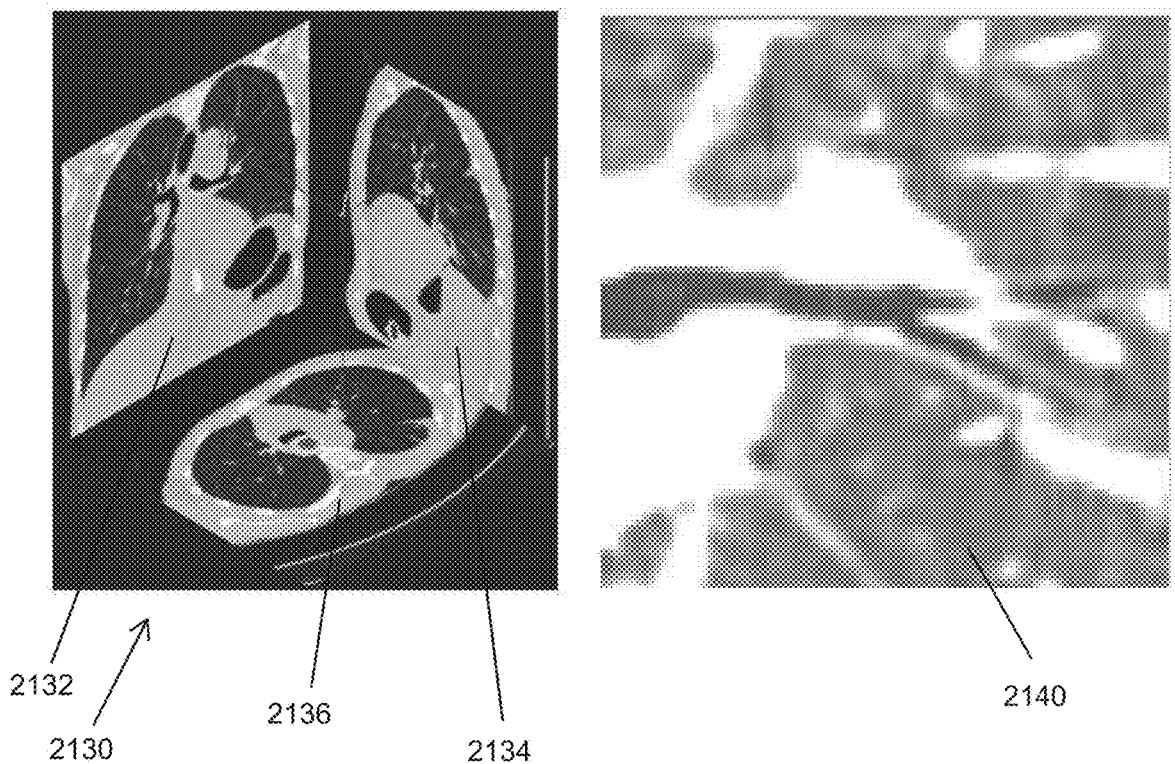
FIG. 21B is a cube view of a 2D coronal, sagittal, and axial plane CT sections at a current view site and a local horizontal 2D CT cross-section centered about the current view site, wherein all views are shown in the TLC space of FIG. 21A according to one or more aspects shown and described herein.
Figure 21C:
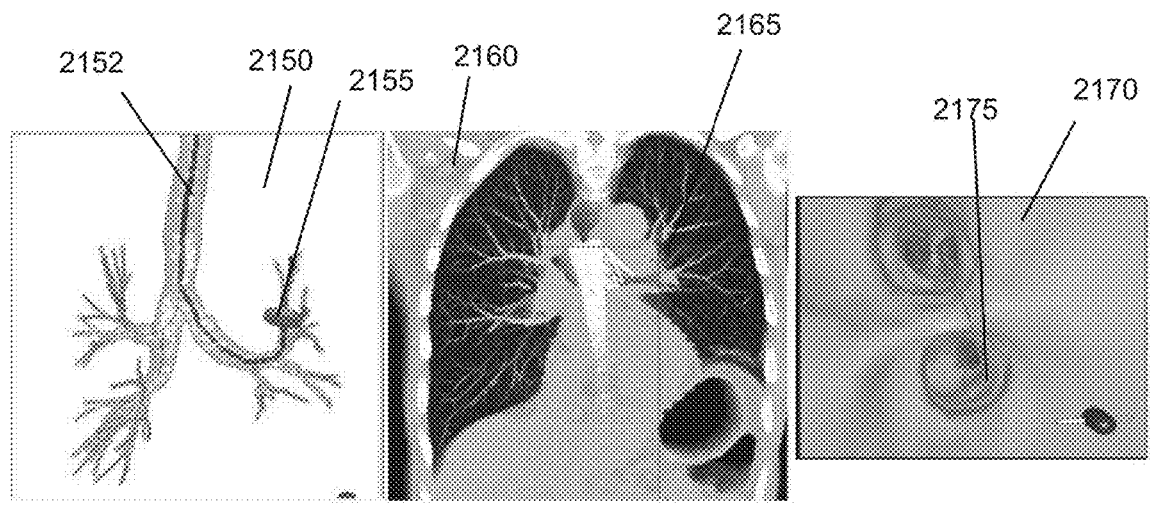
FIG. 21C is a 3D rendered airway tree highlighting an active guidance route and current view site, a coronal front-to-back CT slab rendering, and a VB view and guidance route in an FRC space according to one or more aspects shown and described herein.
Figure 21D:
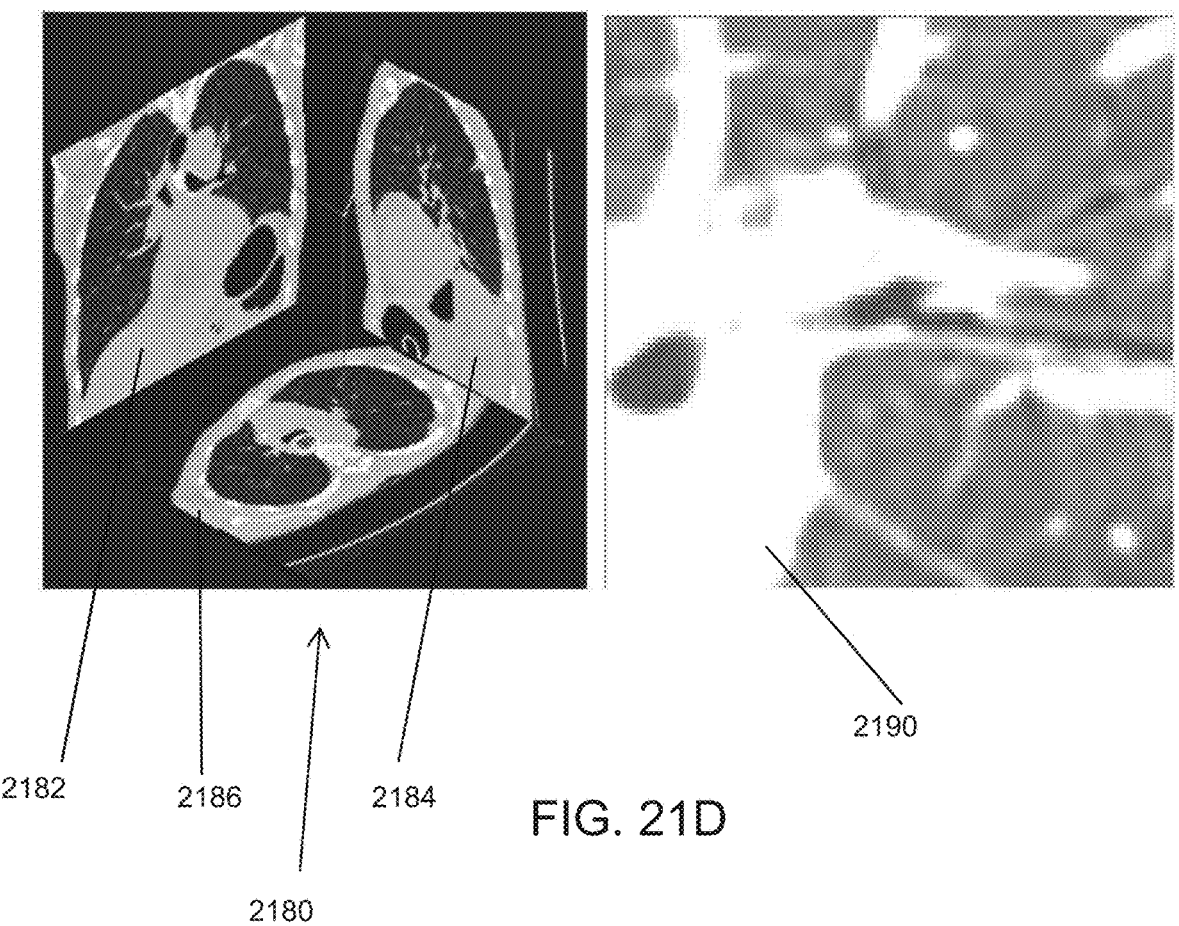
FIG. 21D is a cube view of a 2D coronal, sagittal, and axial plane CT sections at a current view site and a local horizontal 2D CT cross-section centered about the current view site, wherein all views are shown in the FRC space of FIG. 21B according to one or more aspects shown and described herein.

FIGS. 21A-21D show guidance system views that could be observed while navigating in TLC space or FRC space at the endpoint of the generation-6 branch. FIG. 21A depicts a result in TLC space. A 3D rendered airway tree 2100 highlights an active guidance route 2102 and current view site 2105. A coronal front-to-back CT slab rendering 2110 is also shown depicting the current view site by cross hairs 2115. A VB view 2120 depicts a guidance route 2125. FIG. 21B depicts a "cube" view 2130 of the 2D coronal 2132, sagittal 2134, and axial 2136 plane CT sections at the current view site. FIG. 21B further depicts a local horizontal 2D CT cross-section 2140 centered about the current view site. FIG. 21C depicts a result in FRC space. Similarly to FIG. 21A, a 3D rendered airway tree 2150 highlights an active guidance route 2152 and current view site 2155 in FIG. 21C. Likewise, a coronal front-to-back CT slab rendering 2160 is shown depicting the current view site by cross hairs 2165 and a VB view 2170 depicts a guidance route 2175. Similarly to FIG. 21B, FIG. 21D depicts a "cube" view 2180 of the 2D coronal 2182, sagittal 2184, and axial 2186 plane CT sections at the current view site. FIG. 21D further depicts a local horizontal 2D CT cross-section 2190 centered about the current view site.

Figure 22A:
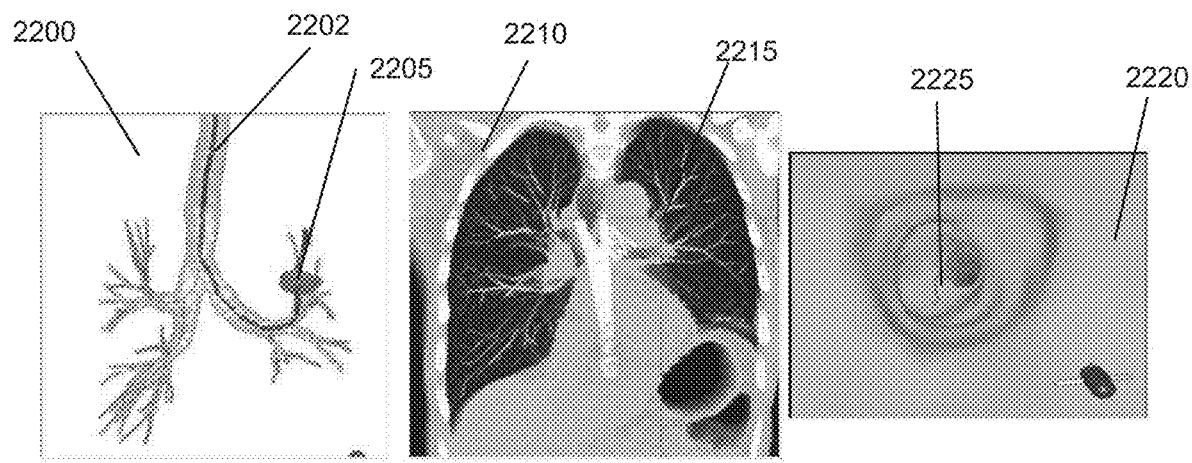
FIG. 22A is a 3D rendered airway tree highlighting an active guidance route and current view site, a coronal front-to-back CT slab rendering, and a VB view and guidance route in an FRC space according to one or more aspects shown and described herein.
Figure 22B:
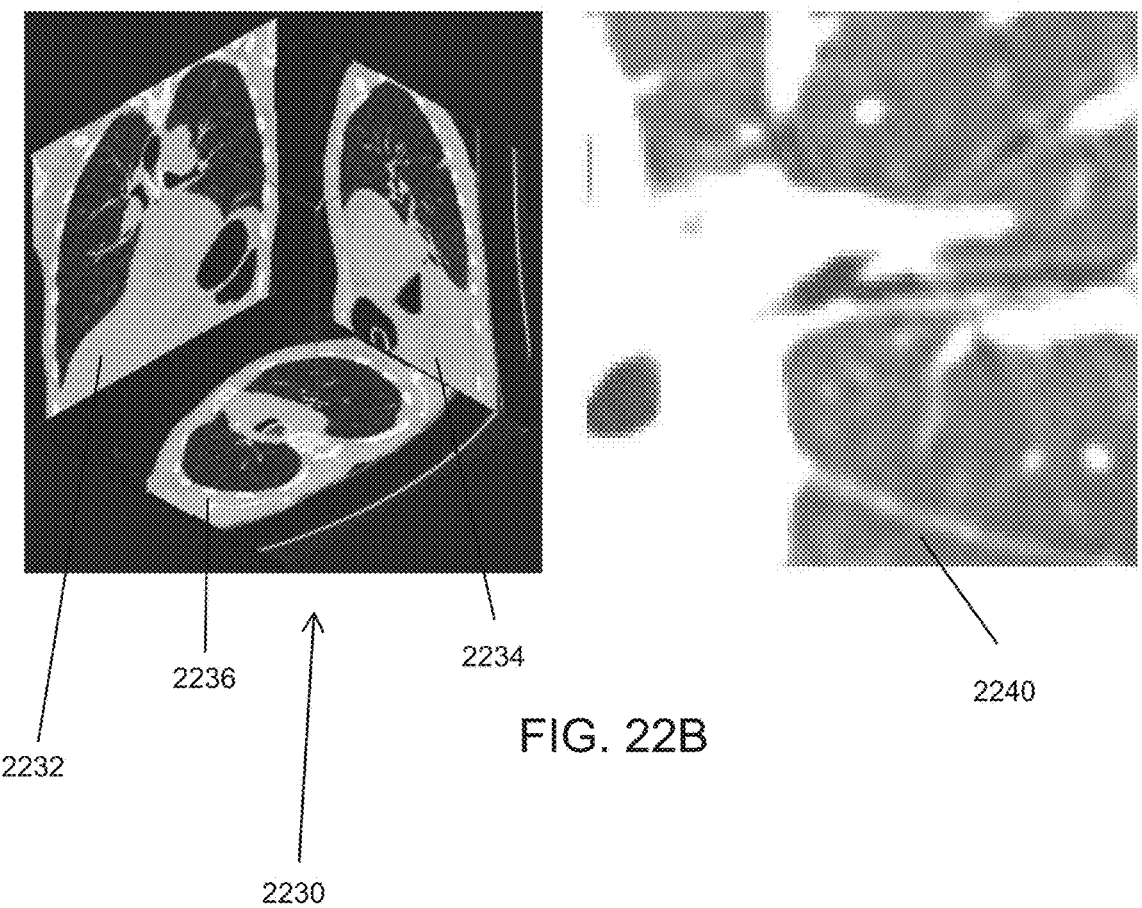
FIG. 22B is a cube view of a 2D coronal, sagittal, and axial plane CT sections at a current view site and a local horizontal 2D CT cross-section centered about the current view site, wherein all views are shown in the FRC space of FIG. 22A according to one or more aspects shown and described herein.

Lastly, FIGS. 22A and 22B depict a result if CTBD is disregarded. For this example, the system traveled a total of 143 view sites in TLC space and 129 view sites in FRC space when navigating from the end point of generation 2 to the end point of generation 6. The view sites are approximately equally spaced 0.6 mm apart. It is assumed the FRC-based space corresponds to the reality during the live procedure. If distance only is used to depict where the system is during navigation and navigation is done only in TLC space, then the guidance system's display will show the results of FIGS. 21A and 21B at the end of the generation-6 airway—14 more view sites will have been navigated than necessary in FRC space (the distance traveled is logged by the scope insertion depth $d_{in}$). Unfortunately, in reality, in FRC space, the system would in fact be at the FRC location shown in FIGS. 22A and 22B, which is part way into the generation 7 airway, approximately 8-9 mm further down stream. The present disclosure, by virtue of the way it maps routes from TLC space to FRC space, would not present this issue.

More specifically, FIG. 22A depicts a result in FRC space. A 3D rendered airway tree 2200 highlights an active guidance route 2202 and a current view site 2205. A coronal front-to-back CT slab rendering 2210 is shown depicting the current view site by cross hairs 2215 and a VB view 2220 depicts a guidance route 2225. FIG. 22B depicts a "cube" view 2230 of the 2D coronal 2232, sagittal 2234, and axial 2236 plane CT sections at the current view site. FIG. 22B further depicts a local horizontal 2D CT cross-section 2240 centered about the current view site.

Figure 23A:
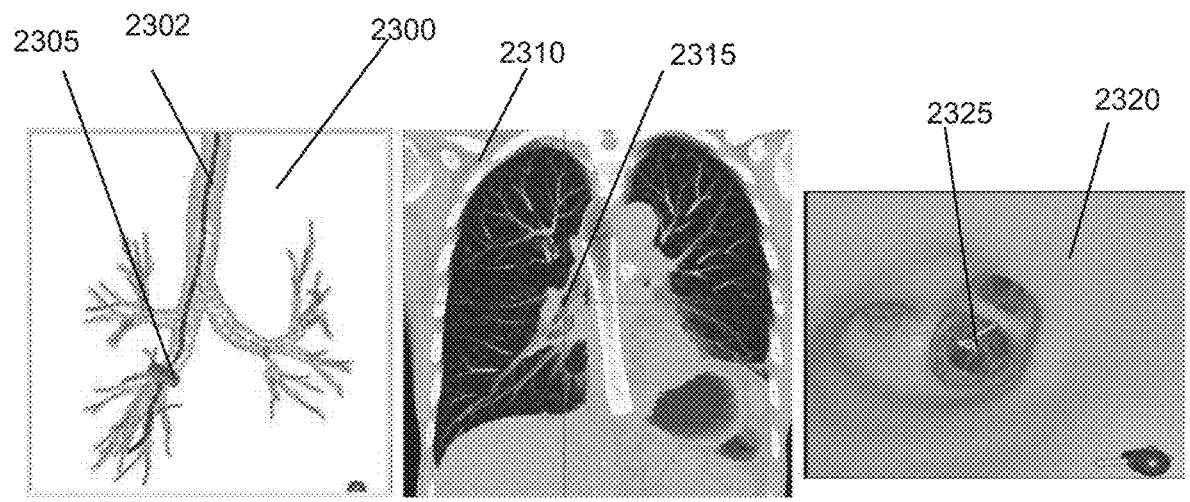
FIG. 23A is a 3D rendered airway tree highlighting an active guidance route and current view site, a coronal front-to-back CT slab rendering, and a VB view and guidance route in a TLC space according to one or more aspects shown and described herein.
Figure 23B:
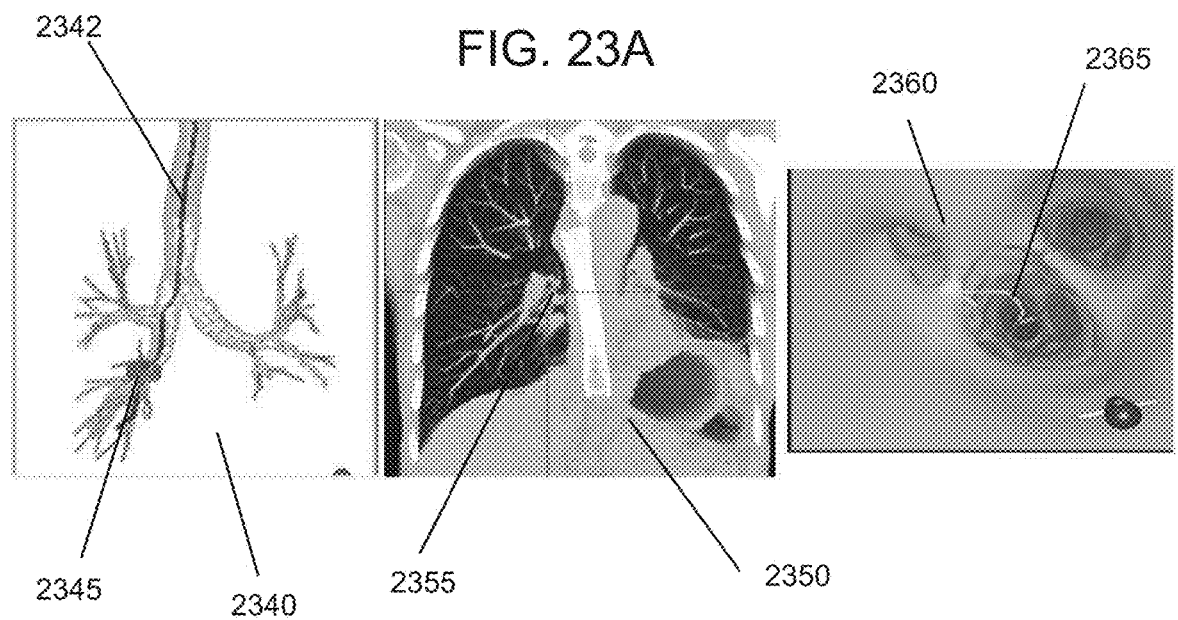
FIG. 23B is a 3D rendered airway tree highlighting an active guidance route and current view site, a coronal front-to-back CT slab rendering, and a VB view and guidance route in an FRC space according to one or more aspects shown and described herein.
Figure 24:
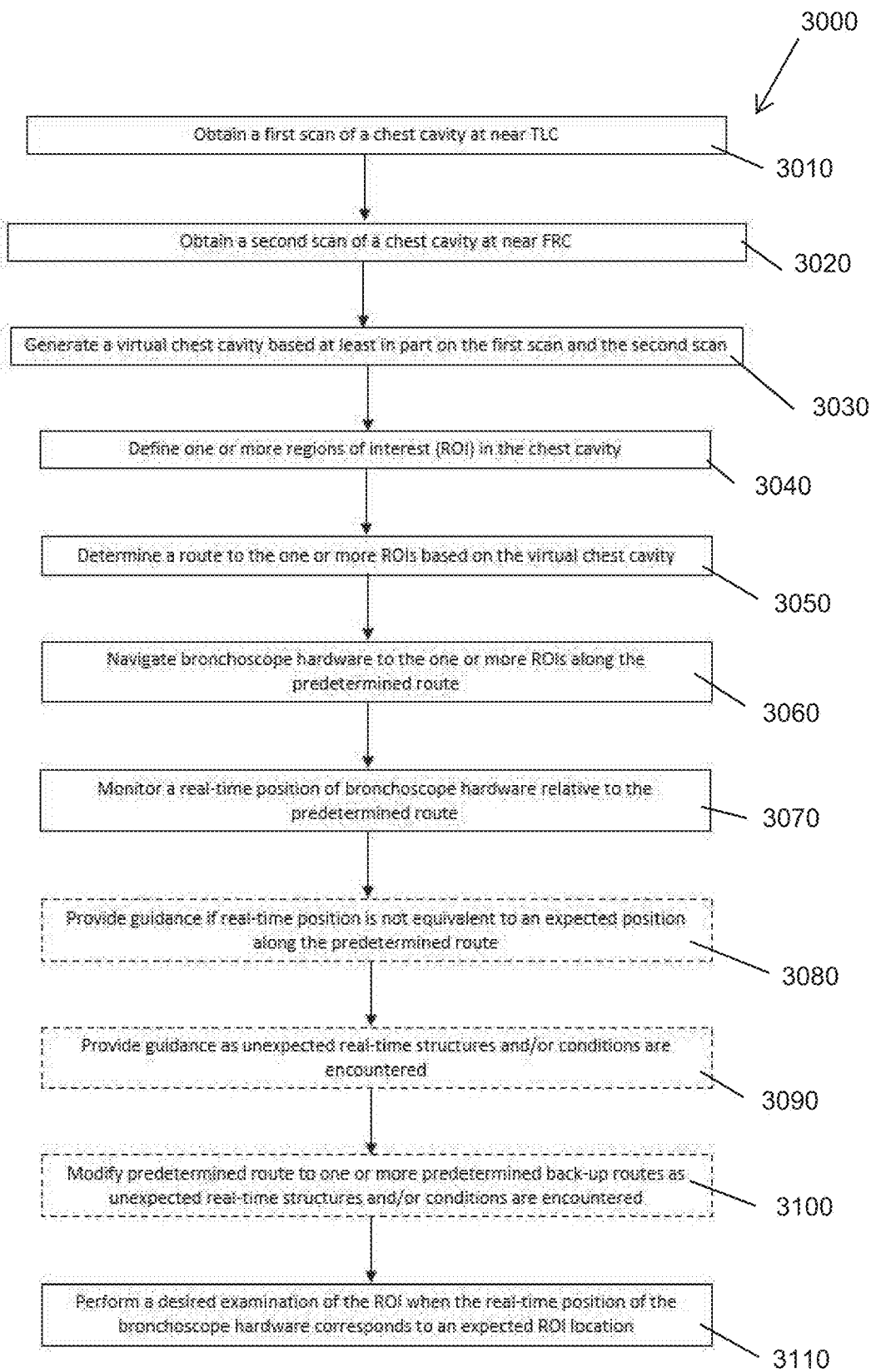
Figure 25:
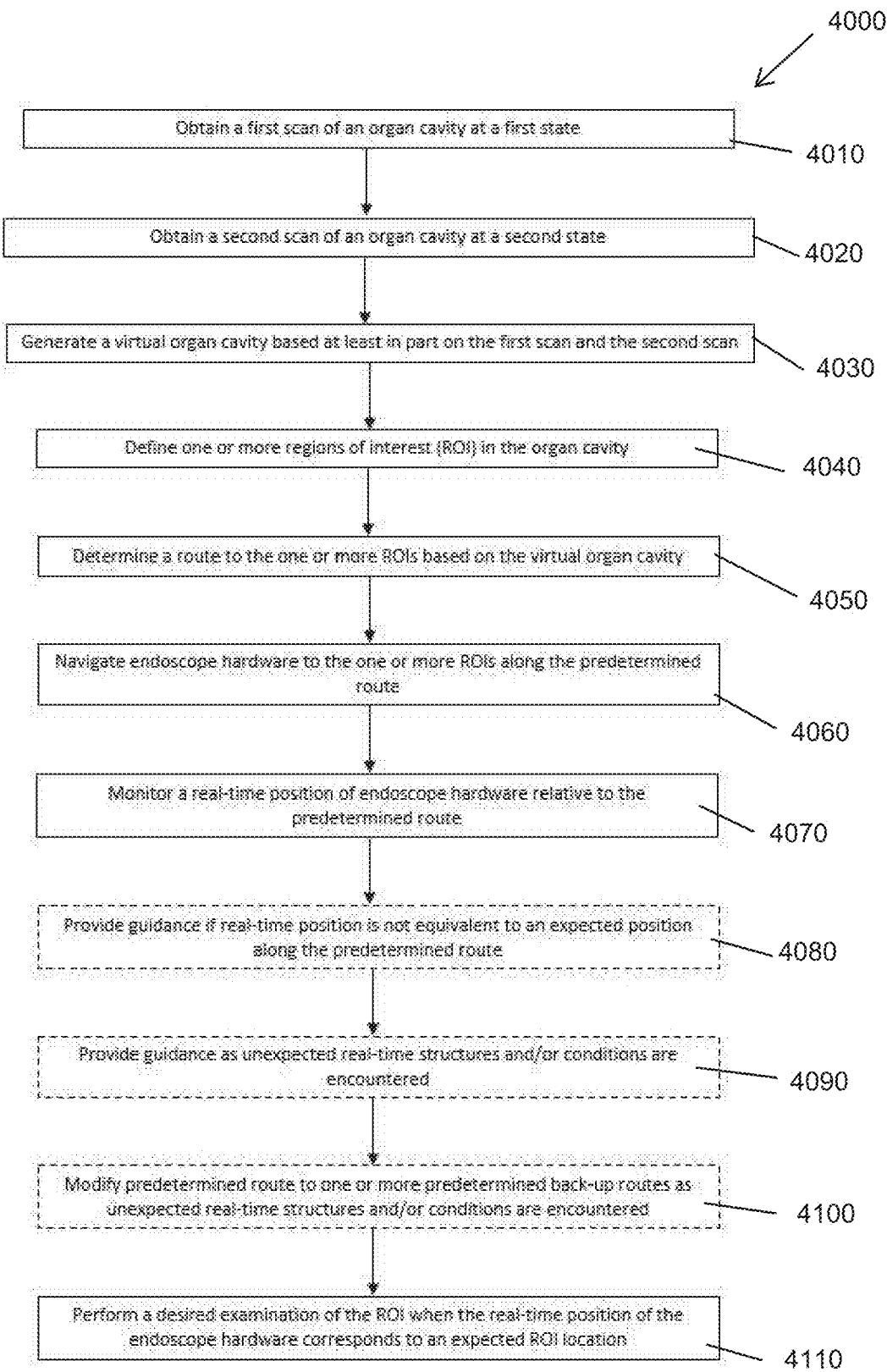

As a second example, FIGS. 23A and 23B illustrate what happens when a clinician starts at the end of the generation-2 airway for a guidance route traveling to the periphery of the right lower lobe. Navigation is then performed in both the TLC- and FRC-based spaces for 150 additional view sites, with no regard to the branch endpoints being passed. In principle, the system views for both cases travel the same distance. Yet, the views in FIGS. 23A and 23B clearly differ. In fact, for the TLC view shown in FIG. 23A, the system is situated at the beginning of the generation-5 airway branch, whereas the FRC view shown in FIG. 23B is much further down the generation-5 branch. It is clear that if the TLC space is used exclusively for navigation, with no regard for the topology of the airway tree, then error arising from CTBD will accumulate.

More specifically, FIG. 23A depicts a result in TLC space. A 3D rendered airway tree 2300 highlights an active guidance route 2302 and a current view site 2305. A coronal front-to-back CT slab rendering 2310 is shown depicting the current view site by cross hairs 2315 and a VB view 2320 depicts a guidance route 2325. FIG. 23B depicts a result in FRC space. A 3D rendered airway tree 2340 highlights an active guidance route 2342 and a current view site 2345. A coronal front-to-back CT slab rendering 2350 is shown depicting the current view site by cross hairs 2355 and a VB view 2360 depicts a guidance route 2365.

Notably, the planning methodologies detailed herein are also applicable to robotics-assisted bronchoscopy systems. Robotics assisted bronchoscopy systems have special hardware to provide automated movement of the bronchoscope during navigation. The robotics system can glean navigation information either from an electromagnetic sensor-based synchronization mechanism that ascertains scope tip location or a shape-sensing sensor driven by a fiber-optic shape sensor that measures the complete shape of the device during the live procedure. For robotics-assisted bronchoscopy systems, initial set-up in the operating room entails essentially the same steps, as described above, except that a robotics-assisted bronchoscopy system drawing upon shape sensing is now used during the live procedure. The procedure plan is loaded and video output from the bronchoscope is made available. In addition, the guidance system's display is initialized for ROI R, as performed above.

With the active guidance route initialized to the preplanned final guidance route $r_p$, the clinician uses the robotic system to initialize the bronchoscope near the main carina. Also, the scope insertion depth is initialized to $d_{in}=0$ mm, and the corresponding remaining distance to the ROI $d_{ROI}$ is initialized based on route $r_p$. Live guidance again follows a three-stage protocol toward R: (1) navigating toward the ROI; (2) optionally switching to a back-up guidance route; and (3) finally confirming and/or localizing the ROI. As before, linked TLC-space and FRC-space versions of all graphical viewers are available by toggling the guidance space.

Navigation proceeds with the robotic system following the active guidance route and associated guidance cues to maneuver the bronchoscope. As before, based on the display information, the clinician can redirect the robotic system to any available back-up guidance route $r''$, as deemed necessary. During the procedure, $d_{in}$ and $d_{ROI}$ can receive constant, or otherwise routine, updates. In addition, $d_{ROI}$ stays synchronized to the currently active guidance route, regardless of which route is active. The robotic system maintains the current pose information for the bronchoscope tip, as it is maneuvered; i.e., the tip's 3D position, Euler angles, and/or up vector are constantly, or otherwise routinely, updated, based on the shape sensing technology. Notably, because $d_{in}$ is an absolute measure independent of the guidance route and navigation space (TLC-based or FRC-based), $d_{in}$ does not change when the active guidance changes.

When the guidance system reaches the active guidance route's localization pose $v_L$ (again, typically 2 to 4 cm from the final destination), the system switches the active guidance route to the complementary final guidance route, be it $r_f$ or $r_f''$, situated in FRD-based CT virtual space. This causes $d_{ROI}$ to be updated to FRC-based virtual space, while $d_{ID}$ remains unchanged as the bronchoscope has not moved.

Because of CTBD between the TLC and FRC spaces, it is important to note that when the route switch is made, the displayed live bronchoscope video and the corresponding displayed VB view can differ significantly. To adjust for this disparity, two operations are performed. First, the view site $\hat{v}_{\beta,j}$ on the active guidance route situated $d_{ID}$ mm from the beginning of the route is set to be the guidance system's current view site, where $\hat{v}_{\beta,j}$ is the $\beta^{th}$ view site of branch $\hat{b}_j$ of the active guidance route. Notably, $d_{ID}$ corresponds to the total distance navigated thus far by the bronchoscope toward ROI R. This places the guidance system's virtual bronchoscope, now situated in FRC-based virtual space at a pose $\Theta_{\beta,j}$, closer to the current pose $\Theta$ of the real bronchoscope situated in real chest space. To reduce the remaining disparity between the virtual-space pose $\Theta_{\beta,j}$ and real-space pose $\Theta$, an image-based registration of VB view $I_{CT}^{\Theta_{\beta,j}}$ to the current live video bronchoscope view $I_V^{\Theta}$ is performed. The view site on the active guidance route that is closest to the derived optimal virtual-space pose $\Theta_O$ is now ascertained, with the direction information from $\Theta_O$ also retained. This completes the synchronization of the two spaces. The remaining bronchoscope maneuvers are now performed using the robotics system until the bronchoscope reaches the preplanned optimal destination pose. As before, TLC-based information is available and synchronized to the current active guidance route.

As described above, derivation and/or utilization of back-up routes is an optional attribute of the disclosed methods.

EXAMPLES

Example 1—A method for planning and guiding an endoscopic procedure taking place in a hollow tubular structure inside a subject's multi-organ cavity that requires an endoscope, the method including the steps of: receiving two 3D pre-operative imaging scans of the subject depicting the multi-organ cavity, with the first pre-operative imaging scan depicting the multi-organ cavity at a different state from the second pre-operative imaging scan; computing an anatomical model for each 3D pre-operative imaging scan, with each model including the definition and centerlines of the hollow tubular structure and the definitions of the organs inside the multi-organ cavity; identifying and defining a region of interest (ROI) inside the multi-organ cavity in the first 3D pre-operative imaging scan; deriving a 3D transformation that maps each point in the first 3D preoperative imaging scan to a corresponding point in the second 3D pre-operative imaging scan, based on the two 3D pre-operative imaging scans and anatomical models; and deriving a procedure plan based on the first 3D preoperative imaging scan and its anatomical model, the ROI, and endoscope device characteristics, the procedure plan including an initial guidance route inside the hollow tubular structure leading to a localization pose and then terminating at an initial destination pose near the ROI and guidance cues indicating how to maneuver the endoscope along the initial guidance route toward the initial destination pose. The method further includes mapping one or more points of the initial guidance route into corresponding points in the second 3D pre-operative imaging scan, based on the 3D transformation, thereby providing a preliminary final guidance route based on the second 3D pre-operative imaging scan; deriving a final guidance route inside the hollow tubular structure leading to a final destination pose near the ROI and guidance cues indicating how to maneuver the endoscope along the final guidance route toward the final destination pose, based on the second 3D pre-operative imaging scan and its anatomical model, the ROI, endoscope device characteristics, and the preliminary final guidance route; and performing a live two-stage guidance protocol. The live two-stage guidance protocol includes providing guidance information which enables the endoscope operator to navigate, or otherwise direct, the endoscope to a preplanned destination pose near the ROI, which includes the steps of updating the active guidance route to the preplanned initial guidance route, providing simulated virtual video views of the hollow tubular structure along the active guidance route from a virtual endoscope defined within a 3D virtual space and constructed based on the first 3D pre-operative imaging scan and its anatomical model and the ROI and also providing the preplanned guidance cues, which enable the endoscope operator to navigate the endoscope toward the active guidance route's preplanned destination pose near the ROI, initializing the endoscope's position within the subject's hollow tubular structure and distance to the preplanned destination pose, based on the simulated virtual video views of the hollow tubular structure and the active guidance route, providing updates of the distance to the preplanned destination pose as the virtual endoscope advances along the active guidance route toward the preplanned destination pose, and updating the endoscope's position within the subject's hollow tubular structure, based on 1) the simulated virtual video views of the hollow tubular structure, 2) the active guidance route and 3) the preplanned guidance cues. The live two-stage guidance protocol further includes upon reaching the active guidance route's preplanned localization pose, providing guidance information which enables the endoscope operator to localize the endoscope at the preplanned final guidance route's destination pose near the ROI, which includes the steps of updating the active guidance route the final guidance route, updating the endoscope's position within the subject's hollow tubular structure and distance to the preplanned destination pose, based on the simulated virtual video views of the hollow tubular structure and the active guidance route, providing simulated virtual video views of the hollow tubular structure along the active guidance route from a virtual endoscope defined within a 3D virtual space and constructed based on the second 3D pre-operative imaging scan and its anatomical model and the ROI and also providing the preplanned guidance cues which enable the endoscope operator to maneuver the endoscope toward the active guidance route's preplanned destination pose, providing updates of the distance to the preplanned destination pose as the virtual endoscope advances along the active guidance route toward the preplanned destination pose, updating the endoscope's position within the subject's hollow tubular structure, based on the simulated virtual video views of the hollow tubular structure, the active guidance route and the preplanned guidance cues, and upon reaching the preplanned destination pose, providing guidance information which enables the endoscope operator to localize the endoscope at the preplanned destination pose. The 3D positions of the virtual endoscope and real endoscope are synchronized at a final destination pose for examining the ROI.

Example 2—The method of Example 1, wherein the method receives endoscope tip location and insertion depth information from a robotics assisted endoscopy system during the live two-stage guidance protocol for the purpose of updating the endoscope's position within the subject's hollow tubular structure.

Example 3—A system for pre-operative planning and live guidance of an endoscopic procedure taking place in a hollow tubular structure inside a multi-organ cavity that requires an endoscope, drawing on the methods of any of Examples 1 and 2.

Example 4—A method for planning and guiding an endoscopic procedure taking place in a hollow tubular structure inside a subject's multi-organ cavity that requires an endoscope is disclosed. The method includes receiving two 3D pre-operative imaging scans of the subject depicting the multi-organ cavity, with the first pre-operative imaging scan depicting the multi-organ cavity at a different state from the second pre-operative imaging scan; computing an anatomical model for each 3D pre-operative imaging scan, with each model consisting of 1) the definition and centerlines of the hollow tubular structure, where the centerlines consist of a series of connected ordered branches, and 2) the definitions of the organs inside the multi-organ cavity; identifying and defining a region of interest (ROI) inside the multi-organ cavity in the first 3D pre-operative imaging scan; deriving a 3D transformation that maps each point in the first 3D preoperative imaging scan to a corresponding point in the second 3D pre-operative imaging scan, based on the two 3D pre-operative imaging scans and anatomical models; and deriving a procedure plan based on 1) the first 3D preoperative imaging scan and its anatomical model, 2) the ROI and 3) endoscope device characteristics, the procedure plan including 1) an primary guidance route, which consists of a series of N≥0 connected ordered branches concatenated with a termination segment, inside the hollow tubular structure leading to a localization pose and then terminating at a destination pose near the ROI and 2) guidance cues indicating how to maneuver the endoscope along the primary guidance route toward the destination pose. The method further includes deriving a series of back-up procedure plans, which includes for each n less than or equal to N starting at n=1, constructing a partial guidance route, if possible, defined by the first n branches constituting the primary guidance route and for each n less than or equal to N starting at n=1, deriving a back-up procedure plan, if possible, based on 1) the first 3D preoperative imaging scan and its anatomical model, 2) the ROI and 3) endoscope device characteristics, the back-up procedure plan including 1) a back-up guidance route inside the hollow tubular structure, where the back-up guidance route consists of the n-branch partial guidance route concatenated with other connected ordered branches and a terminating segment leading to a back-up localization pose and then terminating at a back-up destination pose near the ROI, and 2) guidance cues indicating how to maneuver the endoscope along the back-up guidance route toward the back-up destination pose. The method further includes mapping one or more points of the primary guidance route into corresponding points in the second 3D pre-operative imaging scan, based on the 3D transformation, thereby providing a preliminary final guidance route based on the second 3D pre-operative imaging scan, mapping one or more points in each of the back-up guidance routes into corresponding points in the second 3D pre-operative imaging scan, based on the 3D transformation, thereby providing a set of preliminary back-up guidance routes based on the second 3D pre-operative imaging scan, deriving a final guidance route inside the hollow tubular structure leading to a final destination pose near the ROI, and guidance cues indicating how to maneuver the endoscope along final guidance route toward the final destination pose based on the second 3D pre-operative imaging scan and its anatomical model, the ROI, endoscope device characteristics, and the preliminary final guidance route; and deriving a set of final back-up guidance routes inside the hollow tubular structure, each route leading to an associated final back-up destination pose near the ROI, and guidance cues indicating how to maneuver the endoscope along each final back-up guidance route toward its respective final back-up destination pose based on 1) the second 3D pre-operative imaging scan and its anatomical model, 2) the ROI, 3) endoscope device characteristics and 4) the set of preliminary back-up guidance routes. The method further includes performing a live three-stage guidance protocol including the steps of providing guidance information which enables the endoscope operator to navigate the endo-scope to a preplanned destination pose near the ROI which includes the steps of updating the active guidance route to the preplanned primary guidance route, providing simulated virtual video views of the hollow tubular structure along the active guidance route from a virtual endoscope defined within a 3D virtual space and constructed based on 1) the first 3D pre-operative imaging scan and its anatomical model and 2) the ROI and also providing the preplanned guidance cues, which enable the endoscope operator to maneuver the endoscope toward the active guidance route's preplanned destination pose near the ROI, initializing the endoscope's position within the subject's hollow tubular structure and distance to the preplanned destination pose, based on the simulated virtual video views of the hollow tubular structure and the active guidance route, providing updates of the distance to the preplanned destination pose as the virtual endoscope advances along the active guidance route toward the preplanned destination pose, and updating the endoscope's position within the subject's hollow tubular structure, based on 1) the simulated virtual video views of the hollow tubular structure, 2) the active guidance route and 3) the preplanned guidance cues. The live three-stage guidance protocol further includes for each n less than or equal to N starting at n=1, if possible, providing guidance information which enables the endoscope operator to switch the active guidance route to a preplanned back-up guidance route and continue navigating the endoscope to the preplanned back-up guidance route's back-up destination pose near the ROI, which includes the steps of upon reaching the end of branch n of the active guidance route, signaling the endoscope operator that a preplanned back-up guidance route is available for reaching the ROI, updating the active guidance route to the preplanned back-up guidance route, updating the endoscope's position within the subject's hollow tubular structure and distance to the preplanned destination pose, based on the simulated virtual video views of the hollow tubular structure and the active guidance route, providing simulated virtual video views of the hollow tubular structure along the active guidance route from a virtual endoscope defined within a 3D virtual space and constructed based on 1) the first 3D pre-operative imaging scan and its anatomical model and 2) the ROI and also providing the corresponding preplanned guidance cues, which enable the endoscope operator to maneuver the endoscope toward the active guidance route's preplanned destination pose, providing updates of the distance to the preplanned destination pose as the virtual endoscope advances along the active guidance route toward the preplanned destination pose, and updating the endoscope's position within the subject's hollow tubular structure, based on 1) the simulated virtual video views of the hollow tubular structure, 2) the active guidance route and 3) the preplanned guidance cues. The three-stage guidance protocol further includes upon reaching the active guidance route's localization pose, providing guidance information which enables the endoscope operator to localize the endoscope at the final destination pose near the ROI of the active guidance route's associated final guidance route (primary or back-up), which includes the steps of updating the active guidance route to the active guidance route's associated final guidance route, updating the endoscope's position within the subject's hollow tubular structure and distance to the preplanned destination pose, based on the simulated virtual video views of the hollow tubular structure and the active guidance route, providing simulated virtual video views of the hollow tubular structure along the active guidance route from a virtual endoscope defined within a 3D virtual space and constructed based on 1) the second 3D pre-operative imaging scan and its anatomical model and 2) the ROI and also providing the preplanned guidance cues which enable the endoscope operator to maneuver the endoscope toward the active guidance route's preplanned destination pose, updating the endoscope's position within the subject's hollow tubular structure and distance to the preplanned destination pose, based on the active guidance route, providing updates of the distance to the preplanned destination pose as the virtual endoscope advances along the active guidance route toward the preplanned destination pose, and upon reaching the preplanned destination pose, providing guidance information which enables the endoscope operator to localize the endoscope at the preplanned destination pose near the ROI. The 3D positions of the virtual endoscope and real endoscope are synchronized at a final destination pose for examining the ROI.

Example 5—The method of Example 4, wherein the method receives endoscope tip location and insertion depth information from a robotics assisted endoscopy system during the live three-stage guidance protocol for the purpose of updating the endoscope's position within the subject's hollow tubular structure.

Example 6—A system for pre-operative planning and live guidance of an endoscopic procedure taking place in a hollow tubular structure inside a multi-organ cavity that requires an endoscope, drawing on the methods of any of Examples 4 and 5.

Example 7—A method for planning and guiding an endoscopic procedure is disclosed. The method includes obtaining a first scan of a chest cavity at a near total lung capacity, obtaining a second scan of the chest cavity at a near functional residual capacity, generating a virtual chest cavity based at least in part on the first scan and the second scan, defining one or more regions of interest (ROI) in the virtual chest cavity, and determining a route to the one or more ROIs based on the virtual chest cavity. The method further includes directing endoscope hardware through an airway to the one or more ROIs along the predetermined route, monitoring, by a processor, a real-time position of the endoscope hardware relative to an expected position along the predetermined route, and performing an examination of the one or more ROIs when the real-time position of the endoscope hardware corresponds to an expected ROI location.

Example 8—The method of Example 7, further including providing a guidance to a user when the real-time position does not correspond to the expected position along the predetermined route.

Example 9—The method of any of Examples 7-8, further including providing a guidance to a user as one or more unexpected structures are encountered along the predetermined route.

Example 10—The method of Example 9, further including modifying the predetermined route to one or more predetermined back-up routes as the one or more unexpected structures are encountered along the predetermined route.

Example 11—The method of any of Examples 7-10, further including providing a guidance to a user as one or more unexpected conditions are encountered along the predetermined route.

Example 12—The method of Example 11, further including modifying the predetermined route to one or more predetermined back-up routes as the one or more unexpected conditions are encountered along the predetermined route.

Example 13—The method of Example 12, further including overriding the guidance and continuing to direct the endoscope hardware to the one or more ROIs along the predetermined route.

Example 14—The method of any of Examples 7-13, wherein the step of generating a virtual chest cavity includes computing a 3D transformation indicating how a first point in the first scan maps to a corresponding point in the second scan.

Example 15—The method of any of Examples 7-14, further including determining one or more back-up routes prior to the step of directing the endoscope hardware through the airway.

Example 16—A method of planning and guiding an endoscopic procedure is disclosed. The method includes obtaining a first scan of an organ cavity at a first state, obtaining a second scan of the organ cavity at a second state, wherein the first state is different than the second state, generating a virtual organ cavity based at least in part on the first scan and the second scan, defining one or more regions of interest (ROI) in the virtual organ cavity, and determining a route to the one or more ROIs based on the virtual organ cavity. The method further includes directing endoscope hardware along a pathway to the one or more ROIs along the predetermined route, monitoring, by a processor, a real-time position of the endoscope hardware relative to an expected position along the predetermined route, and performing an examination of the one or more ROIs when the real-time position of the endoscope hardware corresponds to an expected ROI location.

Example 16—The method of Example 15, further including providing a guidance to a user if the real-time position does not correspond to the expected position along the predetermined route.

Example 17—The method of any of Examples 15-16, further including providing a guidance to a user as one or more unexpected structures are encountered along the predetermined route.

Example 18—The method of Example 17, further including modifying the predetermined route to one or more predetermined back-up routes as the one or more unexpected structures are encountered along the predetermined route.

Example 19—The method of any of Examples 15-18, further including providing a guidance to a user as one or more unexpected conditions are encountered along the predetermined route.

Example 20—The method of Example 19, further including modifying the predetermined route to one or more predetermined back-up routes as the one or more unexpected conditions are encountered along the predetermined route.

Example 21—The method of Example 20, further including overriding the guidance and continuing to direct the endoscope hardware to the one or more ROIs along the predetermined route.

Example 22—The method of any of Examples 15-21, wherein the step of generating a virtual organ cavity includes computing a 3D transformation indicating how a first point in the first scan maps to a corresponding point in the second scan.

Example 23—The method of any of Examples 15-22, further including determining one or more back-up routes prior to the step of directing the endoscope hardware along the pathway.

Example 24—A method of planning and guiding an endoscopic procedure is disclosed. The method includes obtaining a first scan of an organ cavity at a first state, obtaining a second scan of the organ cavity at a second state, wherein the first state is different than the second state, computing an anatomical model for each of the first scan and the second scan, defining one or more regions of interest (ROI) in the organ cavity, deriving a 3D transformation that maps each point in the first scan to each corresponding point in the second scan, and deriving a procedure plan including a primary route to the one or more ROIs. The method further includes directing endoscope hardware along a pathway to the one or more ROIs, wherein the pathway extends along the primary route, monitoring, by a processor, a real-time position of the endoscope hardware relative to an expected position along the primary route, and performing a desired examination of the one or more ROIs when the real-time position of the endoscope hardware corresponds to an expected ROI location.

Example 25—The method of Example 24, further including deriving one or more back-up routes prior to the step of directing the endoscope hardware along the pathway.

It should now be understood that the present disclosure relates to both systems and/or methods for planning and guiding an endoscopic procedure that assist a clinician in navigating, or otherwise directing, an endoscope through hollow regions situated inside an organ cavity, where the objective of the endoscopic procedure is to examine a preplanned target ROI. Because the organ cavity may change in shape over time, the methods and/or systems compensate for the image-to-body differences that can arise between how the organ cavity appears in imaging scans used to plan the procedure and how the same organ cavity appears during the live endoscopic procedure.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A method for planning and guiding an endoscopic procedure taking place in a hollow structure inside of a multi-organ cavity, where the method compensates for image-to-body divergence, the method comprising the steps of:
  precomputing a procedure plan comprising the steps of:
  a. receiving two 3D pre-operative imaging scans ($I_1$ and $I_2$) of the multi-organ cavity, wherein each scan depicts the multi-organ cavity at different states as a 3D space of $I_1$ and $I_2$ respectively;
  b. computing anatomical models for each scan, with each model consisting of the shape and centerlines of the hollow structure and the shapes of organs inside the multi-organ cavity, wherein the centerlines consist of a series of connected ordered branches;
  c. defining a region of interest (ROI) R in the 3D space of $I_1$;
  d. computing a guidance route $r_1$, which consists of a series of $N \geq 0$ connected ordered branches and a terminating segment, in the 3D space of $I_1$ inside the hollow structure to the ROI R leading to a localization pose, which instructs when to transition from endoscope navigation toward the ROI R to endoscope localization near the ROI R, and then terminating at a destination pose inside the hollow structure near the ROI R;
  e. deriving guidance cues that instruct how to maneuver the endoscope along the guidance route $r_1$ toward the ROI R in the 3D space of $I_1$;
  f. computing a 3D transformation T that maps points in the 3D space of $I_1$ to corresponding points in the 3D space of $I_2$;
  g. using the 3D transformation T to convert the guidance route $r_1$ into a corresponding route $r_2$ in the 3D space of $I_2$;
  h. deriving guidance cues for scan $I_2$ that instruct how to maneuver the endoscope along the route $r_2$ toward a destination pose near the ROI R in the 3D space of $I_2$;
  performing a guidance protocol for guiding the endoscopic procedure comprising the steps of:
  a. assigning the guidance route $r_1$ as an active guidance route $r_a$ in the 3D space of $I_1$;
  b. presenting preplanned guidance cues and virtual endoscope views along the active guidance route $r_a$ in the 3D space of $I_1$, which instruct the endoscope operator on how to maneuver the real endoscope along the active guidance route $r_a$ through the hollow structure toward the predefined ROI R;
  c. repeating step b) a plurality of times until reaching the preplanned localization pose;
  d. switching the active guidance route $r_a$ to the route $r_2$;
  e. presenting preplanned guidance cues and virtual endoscope views along the active guidance route $r_a$ in the 3D space of $I_2$, which instruct the endoscope operator on how to make final real endoscope maneuvers along the active guidance route $r_a$ through the hollow structure to reach the preplanned destination pose near the ROI R;
  f. repeating step e) a plurality of times until reaching the preplanned destination pose; whereby the 3D poses of the real endoscope and virtual endoscope are synchronized at a final destination pose for examining the ROI R.

2. The method of claim 1, wherein the precomputation of the procedure plan further comprises:
  deriving a set of back-up procedure plans, which comprises the steps of:
  a. constructing a partial guidance route $\hat{r}_1''$ for each $n \leq N$, if possible, starting at n=1, defined by the first n branches of the guidance route $r_1$;
  b. deriving a back-up procedure plan for each $n \leq N$, if possible, starting at n=1, the back-up procedure plan including: 1) a back-up guidance route $r_1''$ inside the hollow structure, wherein the back-up guidance route $r_1''$ consists of partial guidance route $\hat{r}_1''$ concatenated with other connected order branches and a terminating segment leading to a localization pose, which instructs when to transition from endoscope navigation toward the ROI R to endoscope localization near the ROI R, and terminating at a destination pose inside the hollow structure near the ROI R; and 2) guidance cues, which instruct how to maneuver the endoscope along the back-up guidance route $r_1''$;
  c. computing a back-up guidance route $r_2''$ for each $n \leq N$, if possible, starting at n=1, in the 3D space of $I_2$ by using the transformation T to map the back-up guidance route $r_1''$ into the 3D space of $I_2$;
  d. modifying the back-up guidance route $r_2''$ for each $n \leq N$, if possible, starting at n=1, such that it terminates at a destination pose inside the hollow structure near the ROI R in the 3D space of $I_2$;
  e. deriving guidance cues in the 3D space of $I_2$ indicating how to maneuver the endoscope along the back-up guidance route $r_2''$ for each $n \leq N$, if possible, starting at n=1, toward the destination pose; and
  wherein the step of performing the guidance protocol further comprises:
    providing guidance information that enables the endoscope operator to switch the active guidance route $r_a$ to the back-up guidance route $r_1''$ upon reaching the end of the $n^{th}$ branch of $r_a$, n<N, if available, and continue navigating the endoscope to the destination pose of the back-up guidance route $r_1''$ near the ROI R, which comprises the steps of:
    i. signaling the endoscope operator that the back-up guidance route $r_1''$ is available;
    ii. when the endoscope operator chooses to switch to the back-up guidance route $r_1''$, assigning the back-up guidance route $r_1''$ as the active guidance route $r_a$, updating the endoscope's position and distance to the destination pose, based on the active guidance route $r_a$, and providing guidance cues associated with the active guidance route $r_a$.

3. The method of claim 1, wherein the multi-organ cavity is a thoracic cavity, including the mediastinum, an abdominal cavity, a pelvic cavity, or a cranial cavity.

4. The method of claim 1, wherein the hollow structure is the lung airways, colon, stomach, vasculature of the heart, or any other hollow regions situated inside of a multi-organ cavity.

5. The method of claim 1, wherein the endoscope is bronchoscope, laparoscope, colonoscope, cystoscope, or cardiac catheter.

6. The method of claim 1, wherein the method receives endoscope tip location and insertion depth information from a robotics assisted system during the live endoscopic procedure for the purpose of updating the distance of the virtual endoscope to the destination pose.

7. The method of claim 1, wherein the 3D pre-operative imaging scan $I_1$ is a CT scan or MRI scan.

8. The method of claim 1, wherein the 3D pre-operative imaging scan $I_2$ is a CT scan, a CT scan derived from a PET/CT study, an MRI scan, or a simulated scan generated from $I_1$.

9. The method of claim 1, wherein the ROI R is a suspect tumor, cancer nodule, suspicious airway wall site, or an anatomical location of interest for general visual examination, tissue biopsy, or treatment delivery.

10. The method of claim 1, wherein examination of the ROI R involves collecting anatomical tissue from the ROI R, performing a visual assessment of the ROI R, or delivering treatment to the ROI R.

11. The method of claim 1, wherein the endoscope operator is a physician or a robot.

12. The method of claim 1, wherein, when the guidance protocol provides guidance information that enables the endoscope operator to localize the endoscope at a destination pose near ROI R in the 3D space of $I_2$, the guidance protocol continues to display guidance information in both spaces simultaneously as guidance progresses.

13. A system for planning and guiding an endoscopic procedure taking place in a hollow structure inside a patient's multi-organ cavity, where the system compensates for image-to-body divergence, the system comprising:
   a processing device; and
   a non-transitory, processor-readable storage medium comprising one or more programming instructions stored thereon that, when executed, cause the processing device to:
   precompute a procedure plan comprising:
   a. receive two 3D pre-operative imaging scans ($I_1$ and $I_2$) of the multi-organ cavity, wherein each scan depicts the multi-organ cavity at different states as a 3D space of $I_1$ and $I_2$ respectively;
   b. compute anatomical models for each scan, with each model consisting of the shape and centerlines of the hollow structure and the shapes of organs inside the multi-organ cavity, wherein the centerlines consist of a series of connected ordered branches;
   c. define a region of interest (ROI) R in the 3D space of $I_1$;
   d. compute a guidance route $r_1$, which consists of a series of N≥0 connected ordered branches and a terminating segment, in the 3D space of $I_1$ inside the hollow structure to the ROI R leading to a localization pose, which instructs when to transition from endoscope navigation toward the ROI R to endoscope localization near the ROI R, and then terminating at a destination pose inside the hollow structure near the ROI R;
   e. derive guidance cues that instruct how to maneuver the endoscope along the guidance route $r_1$ toward the ROI R in the 3D space of $I_1$;
   f. compute a 3D transformation T that maps points in the 3D space of $I_1$ to corresponding points in the 3D space of $I_2$;
   g. use the 3D transformation T to convert the guidance route $r_1$ into a corresponding route $r_2$ in the 3D space of $I_2$;
   h. derive guidance cues for scan $I_2$ that instruct how to maneuver the endoscope along the route $r_2$ toward a destination pose near the ROI R in the 3D space of $I_2$; and
   perform a guidance protocol for guiding the endoscopic procedure comprising:
   a. assign the guidance route $r_1$ as an active guidance route $r_a$ in the 3D space of $I_1$;
   b. present preplanned guidance cues and virtual endoscope views along the active guidance route $r_a$ in the 3D space of $I_1$, which instruct the endoscope operator on how to maneuver the real endoscope along the active guidance route $r_a$ through the hollow structure toward the predefined ROI R;
   c. repeat step b) a plurality of times until reaching the preplanned localization pose;
   d. switch the active guidance route $r_a$ to the route $r_2$;
   e. present preplanned guidance cues and virtual endoscope views along the active guidance route $r_a$ in the 3D space of $I_2$, which instruct the endoscope operator on how to make final real endoscope maneuvers along the active guidance route $r_a$ through the hollow structure to reach the preplanned destination pose near the ROI R;
   f. repeat step e) a plurality of times until reaching the preplanned destination pose; whereby the 3D poses of the real endoscope and virtual endoscope are synchronized at a final destination pose for examining the ROI R.

14. The system according to claim 13, wherein the one or more programming instructions stored thereon, when executed, further cause the processing device to:
   further precompute the procedure plan including:
   derive a set of back-up procedure plans, which comprises the steps of:
   a. constructing a partial guidance route $\hat{r}_1^n$ for each n≤N, if possible, starting at n=1, defined by the first n branches of the guidance route $r_1$;
   b. deriving a back-up procedure plan for each n≤N, if possible, starting at n=1, the back-up procedure plan including: 1) a back-up guidance route $r_1^n$ inside the hollow structure, wherein the back-up guidance route $r_1^n$ consists of partial guidance route $\hat{r}_1^n$ concatenated with other connected order branches and a terminating segment leading to a localization pose, which instructs when to transition from endoscope navigation toward the ROI R to endoscope localization near the ROI R, and terminating at a destination pose inside the hollow structure near the ROI R; and 2) guidance cues, which instruct how to maneuver the endoscope along the guidance route $r_1^n$;
   c. computing a back-up guidance route $r_2^n$ for each n≤N, if possible, starting at n=1, in the 3D space of $I_2$ by using the transformation T to map the back-up guidance route $r_1^n$ into the 3D space of $I_2$;
   d. modifying the back-up route $r_2^n$ for each n≤N, if possible, starting at n=1, such that it terminates at a destination pose inside the hollow structure near the ROI R in the 3D space of $I_2$;
   e. deriving guidance cues in the 3D space of $I_2$ indicating how to maneuver the endoscope along the back-up guidance route $r_2^n$ for each n≤N, if possible, starting at n=1, toward the destination pose; and
   perform the guidance protocol further including:
   provide guidance information that enables the endoscope operator to switch the active guidance route $r_a$ to the back-up guidance route $r_1^n$ upon reaching the end of the $n^{th}$ branch of the active guidance route $r_a$, n≤N, if available, and continue navigating the endoscope to the destination pose of route $r_1^n$ near the ROI R, which comprises the steps of:
   i. signal the endoscope operator that the back-up guidance route $r_1^n$ is available;
   ii. when the endoscope operator chooses to switch to the back-up guidance route $r_1^n$, assign the back-up guidance route $r_1^n$ as the active guidance route $r_a$, update the endoscope's position and distance to the destination pose, based on the active guidance route $r_a$, and provide guidance cues associated with the active guidance route $r_a$.

15. The system of claim 13, wherein the multi-organ cavity is a thoracic cavity, including the mediastinum, an abdominal cavity, a pelvic cavity, or a cranial cavity.

16. The system of claim 13, wherein the hollow structure is the lung airways, colon, stomach, vasculature of the heart, or any other hollow regions situated inside of a multi-organ cavity.

17. The system of claim 13, wherein the endoscope is bronchoscope, laparoscope, colonoscope, cystoscope, or cardiac catheter.

18. The system of claim 13, wherein the method receives endoscope tip location and insertion depth information from a robotics assisted system during the live endoscopic procedure for the purpose of updating the distance of the virtual endoscope to the destination pose.

19. The system of claim 13, wherein the 3D pre-operative imaging scan $I_1$ is a CT scan or MRI scan.

20. The system of claim 13, wherein the 3D pre-operative imaging scan $I_2$ is a CT scan, a CT scan derived from a PET/CT study, an MRI scan, or a simulated scan generated from $I_1$.

21. The system of claim 13, wherein the ROI R is a suspect tumor, cancer nodule, suspicious airway wall site, or an anatomical location of interest for general visual examination, tissue biopsy, or treatment delivery.

22. The system of claim 13, wherein examination of the ROI R involves collecting anatomical tissue from the ROI R, performing a visual assessment of the ROI R, or delivering treatment to the ROI R.

23. The system of claim 13, wherein the endoscope operator is a physician or a robot.

24. The system of claim 13, wherein, when the guidance protocol provides guidance information that enables the endoscope operator to localize the endoscope at a destination pose near ROI R in the 3D space of $I_2$, the guidance protocol continues to display guidance information in both spaces simultaneously as guidance progresses.

* * * * *